United States Patent
Brickley et al.

(10) Patent No.: US 10,377,196 B2
(45) Date of Patent: *Aug. 13, 2019

(54) COMMUNICATION DEVICE, SYSTEM, AND METHOD FOR ACTIVE CONTROL OF EXTERNAL VEHICLE COMPONENTS

(71) Applicant: HORIZON GLOBAL AMERICAS INC., Plymouth, MI (US)

(72) Inventors: Fred Brickley, Novi, MI (US); Chandrakumar D. Kulkarni, Battle Creek, MI (US); Francis Bernart, North Canton, OH (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,729

(22) Filed: Aug. 21, 2017

(65) Prior Publication Data

US 2017/0368897 A1    Dec. 28, 2017

Related U.S. Application Data

(63) Continuation of application No. 15/261,312, filed on Sep. 9, 2016, now Pat. No. 9,738,125.

(Continued)

(51) Int. Cl.
*B60D 1/26* (2006.01)
*B60W 50/00* (2006.01)
(Continued)

(52) U.S. Cl.
CPC ............. *B60D 1/26* (2013.01); *B60D 1/62* (2013.01); *B60W 50/0098* (2013.01);
(Continued)

(58) Field of Classification Search
CPC .. B60W 50/00; B60W 50/0098; B60W 50/14; B60W 30/02; B60W 2510/182;
(Continued)

(56) References Cited

U.S. PATENT DOCUMENTS 8,160,806 B2    4/2012    Salaka
8,463,519 B2    6/2013    Mccann
(Continued)

FOREIGN PATENT DOCUMENTS

DE    102012016234    2/2014

OTHER PUBLICATIONS

Goggle, "J-TDO App", URL: https://play.google.com/store/apps/details?id=jaltest.jtod [retrieved on Dec. 5, 2016], Oct. 4, 2016.
(Continued)

*Primary Examiner* — Gertrude Arthur Jeanglaude
(74) *Attorney, Agent, or Firm* — McDonald Hopkins LLC

(57) ABSTRACT

The present disclosure includes a system, method, and device related to data collection and communication related to after-market and external vehicle systems, such as towing systems, cargo carrying systems, trailer breakaway systems, brake systems, braking control systems, and the like. Data is sensed, processed, shared, and further leveraged throughout the discrete components of the system, and possibly via internet and other communications' links, to effect various beneficial actions with minimal driver/user interaction or intervention. In the same manner, data from the system may be used for diagnostic reasons, safety controls, and other purposes.

20 Claims, 16 Drawing Sheets

Related U.S. Application Data

(60) Provisional application No. 62/337,692, filed on May 17, 2016.

(51) Int. Cl.
| | |
|---|---|
| *H04L 29/08* | (2006.01) |
| *B60W 50/14* | (2012.01) |
| *B60D 1/62* | (2006.01) |
| *H04W 4/70* | (2018.01) |
| *H04W 4/80* | (2018.01) |
| *B60W 30/02* | (2012.01) |

(52) U.S. Cl.
CPC ............. *B60W 50/14* (2013.01); *H04L 67/12* (2013.01); *H04W 4/70* (2018.02); *B60W 30/02* (2013.01); *B60W 2300/14* (2013.01); *B60W 2422/70* (2013.01); *B60W 2422/95* (2013.01); *B60W 2510/182* (2013.01); *H04W 4/80* (2018.02)

(58) Field of Classification Search
CPC . B60W 2422/95; B60W 2422/70; B60D 1/26; B60D 1/62; G06K 9/00805; H04W 4/70; H04W 4/80; H04L 67/12

USPC ................... 701/29.7, 29.8, 33.4, 36, 48, 70
See application file for complete search history.

(56) References Cited

U.S. PATENT DOCUMENTS

| | | |
|---|---|---|
| 8,890,670 B2 | 11/2014 | Brey |
| 9,327,566 B2 | 5/2016 | Mcallister |
| 9,738,125 B1 * | 8/2017 | Brickley ................. H04W 4/70 |
| 2009/0219148 A1 | 9/2009 | Thomas |
| 2009/0236825 A1 | 9/2009 | Okuda |
| 2012/0237083 A1 | 9/2012 | Lange |
| 2013/0253814 A1 | 9/2013 | Wirthlin |
| 2015/0349977 A1 | 12/2015 | Risse |
| 2016/0023525 A1 | 1/2016 | Lavoie |
| 2016/0245659 A1 | 8/2016 | Ohba |
| 2017/0151935 A1 | 6/2017 | Prohaszka |

OTHER PUBLICATIONS

Tattle-Trail LLC, "Tattle-Trail ", URL: http://www.tattle-trail.com/ [retrieved on Dec. 5, 2016], Jan. 10, 2013.
International Searching Authority European Patent Office, International Search Report and Written Opinion for International Application No. PCT/US2017/032106, dated Sep. 7, 2017.

* cited by examiner

COMMUNICATION DEVICE, SYSTEM, AND METHOD FOR ACTIVE CONTROL OF EXTERNAL VEHICLE COMPONENTS

CROSS-REFERENCE TO RELATED APPLICATION

This application is a continuation of U.S. patent application Ser. No. 15/261,312, filed on Sep. 9, 2016, titled "Communication Device, System and Method for Active Control of External Vehicle Components," which claims the benefit of U.S. Patent Application No. 62/337,692, filed on May 17, 2016, titled "Towing Data Collection and Communication Device, System and Method," which are both hereby incorporated by reference in their entirety.

TECHNICAL FIELD

The present invention relates to a device, system and method for controlling external vehicle components. More specifically, an active system for sensing and responding to data collected by any number of devices associated with a vehicle, for purposes such as towing, brake control, additional cargo carrying, safety systems, and the like, is contemplated.

BACKGROUND

Integrated (i.e., included or provided as part of the original manufacture) diagnostics systems for vehicles, such as cars and trucks, may be used to generate on-board diagnostic or "telematics" information describing the vehicle's location and diagnostic conditions. These diagnostic systems typically operate on a communication protocol that collects diagnostic information from sensors built into the vehicle itself and then processes the information via an on-board computer, and then make it available through a 6- or 9-pin connector or other on board diagnostic (OBD) connector, which is usually located in the vehicle's interior. This information generally relates only to the vehicle itself.

These integrated systems present several limitations. First, except for unique intra-vehicle control functions like antilock brakes and self-parking, they are largely passive in that the information generally relates only to the status of operation of the vehicle itself. Secondly, these integrated systems usually add considerable cost. Third, the systems are deliberately engineered to prevent quick alterations or updates by the end user or unauthorized parties, thereby making the systems difficult to improve or change. As such, these systems effectively operate in a "closed" environment by preventing the end user from accessing or using the data generated for other purposes (such as towing systems and other products described below).

Further, it must be noted that specialized vehicles (i.e., vehicles designed for specific, commercial purposes), such as semi-tractor trailers, buses, and the like, may include towing, braking, and camera systems. However, these vehicles either integrate these systems in their original, manufactured state or accommodate these systems through specialized and often expensive components and features (usually sold by the manufacturer) that are unique to the specialized vehicle and cannot be easily adapted for use on general purpose vehicles. Few—if any—general purpose vehicles (i.e., vehicles designed for mass production and sale without any anticipated, narrow commercial use), such as sedans, station wagons, cross-over vehicles, compact cars, subcompact cars, sport utility vehicles (SUVs), general purpose pick up trucks, mini-vans, and the like, are designed to accommodate specialized systems of this nature or, to the extent that general purpose vehicles may have towing, cargo, and other accessory systems, these systems are integrated and closed as described above.

Finally, many existing systems—whether integrated or after-market—merely provide passive feedback that is specific to that system. For example, tire pressure-monitoring systems (TPMS) on trailers, when sensing a fault condition, might only display a warning light for the driver. To the extent that trailer also has a brake controller and sway module, these systems would not be automatically alerted to the potential tire problem. Instead, they would merely sense additional faults—if any—caused by the tire problem on an individual basis and display separate warnings (or possibly take independent action specific to that system only). Ultimately, the root cause of these disparate warnings would only be realized to the extent the driver/end user recognized that these independent warnings were, in fact, interconnected. Furthermore, and especially to the extent each of the systems merely displays a passive warning indicator, additional driver/end user intervention would be required. In short, after-market systems capable of generating useful data are compartmentalized and restricted to a specific purpose.

In view of the limitations of existing, integrated and/or passive vehicle diagnostic systems, a need exists for systems and methods that collect, process, and further leverage data provided by any number of vehicle accessories selected by the driver/end user to accomplish tasks desired by and more useful to the driver/end user, rather than focusing only on those deemed appropriate by the vehicle manufacturer. Further, a device, method, and system that allows for active communication, interconnection, and control of vehicle accessories systems would be welcome, especially in the area of trailer controls for actions such as braking, controlling unwanted motion, breakaway, and the like. In particular, systems which integrate different components (i.e., discrete, after-market devices or modules dedicated to performing a particular function, such as trailer braking, tire pressure monitoring, cargo carrying, etc.) so that they can communicate with each other and make decisions and verify on collective information (which is not otherwise available, directly or indirectly, to individual components due to their inability to share information) in manner that allows for partially or fully automatic functions would advantageous.

SUMMARY

The present disclosure includes a system, method, and devices related to data collection and communication of the performance of various vehicle accessories and systems. These accessories and systems are described in greater detail below, and any combination of elements and/or methods are contemplated as aspects and embodiments of the overall invention.

One embodiment of the invention comprises a system having any combination of the following features:
- at least one towing accessory device;
- a sensor operatively coupled with the towing accessory device;
- a controller in operative communication with at least one of the sensor and the towing accessory device to receive data with respect to the towing accessory device and wherein the controller processes the data and sends a direction to act to the towing accessory device;

wherein the controller comprises a communication device in operative communication with the sensor to receive and transmit data with respect to the towing accessory device and an electronic storage device in operative communication with at least one of the following: the sensor and the communication device;

wherein the direction to act is sent via the communication device to the towing accessory;

a user interface in operative communication with at least one of the communication device and the electronic storage device;

wherein the user interface includes at least one of a smartphone, tablet, computer, and user interface of a trailer brake controller;

wherein the at least one towing accessory device consists of at least one of the following: brake controller, break away device, trailer signal converter, sway control device, tire pressure monitoring system, camera, trailer brakes, fifth wheel hitch, coupler, gooseneck coupler, hitch bar, hitch ball mount, pin box, weight distribution system, jack, ramp, roof rack, cargo securing system, cargo carrier and winch.

wherein the at least one towing accessory device comprises first and second towing accessory devices whereby the first towing accessory device includes the sensor and the second towing accessory devices includes a second sensor operatively coupled thereto;

wherein the controller receives second data from the second sensor and processes the second data and sends a direction to act to the first towing accessory device; and a second sensor coupled with the towing accessory device.

A separate embodiment is directed to a system having any combination of the following features:

at least one towing accessory device;

a sensor operatively coupled with the at least one towing accessory device;

an electronic storage device in operative communication with the sensor, the electronic storage device receiving data from the sensor wherein the electronic storage device processes the data and sends a direction to act to the at least one accessory device;

a user interface in operative communication with the sensor and the electronic storage device;

a communication device in operative communication with any combination of: the at least one towing accessory device, the sensor, the electronic storage device, the user interface, an internet-based data server, and a private party data server;

wherein the sensor includes a transceiver to send and receive the data and the direction to act;

wherein the sensor, electronic storage device and user interface communicate via a wireless communication platform;

wherein the wireless communication platform includes at least one of Bluetooth and Wi-Fi;

wherein the at least one towing accessory device includes first and second towing accessory devices, the first towing accessory device comprising the sensor and the second towing accessory device comprises a second sensor;

wherein the first sensor generates and sends the data to the electronic storage device and the electronic storage device sends instructions to the second towing device to take a second action;

wherein the second action is to prevent operation of the second towing accessory device;

wherein the second sensor sends second data to the electronic storage device confirming at least one of: the direction to act and the second action is/are complete;

wherein additional data is communicated to the electronic storage device through the user interface; and wherein the user interface comprises a trailer brake controller.

Yet another embodiment contemplates a system having any combination of the following features:

a first towing accessory device comprising a first sensor;

a second towing accessory device comprising a second sensor, the first and second towing accessory devices in operative communication; and a communication device in operative communication with the first and second sensors, wherein data from the first sensor is communicated to the communication device and the communication device sends instructions to the second sensor to generate an action for the second towing accessory device;

wherein the communication device includes at least one of a smartphone, tablet, computer, and device with a processor;

further comprising a user interface in operative communication with the communication device;

wherein the user interface and communication device are a single device; and further comprising a third towing accessory device comprising a third sensing device, wherein the third sensor is in operative communication with the first and second sensors, whereby the communication device sends instructions to the third sensor to generate an action for the third towing accessory device.

A still further embodiment contemplates a system having any combination of the following features:

a first towing accessory device comprising a first sensing device;

a second towing accessory device comprising a second sensing device, the first and second sensing devices in operative communication, wherein the first sensing device provides data to the second sensing device generating an action by the second towing accessory device;

wherein the second sensing device comprises a microprocessor;

wherein the microprocessor includes a wireless transceiver;

further comprising an electronic storage device, wherein the first and second sensing devices send operative data, optionally including data provided by the first sensing device to the second sensing device, wirelessly to the electronic storage device and the electronic storage device sends operative instructions to at least one of the first and second sensing devices to generate at least one act by at least one of the first and second towing accessory devices; and further comprising a user interface wherein the user interface sends user data to the electronic storage device, wherein the user data is used by at least one of the first and second towing accessory devices in performing the at least one act.

The foregoing embodiments are merely exemplary of some of the aspects of the system. Additional features and elements may be contemplated and described herein. Also, features from one of the foregoing embodiments may be combined with features from any of the other foregoing embodiments.

DETAILED DESCRIPTION

Figure 1:
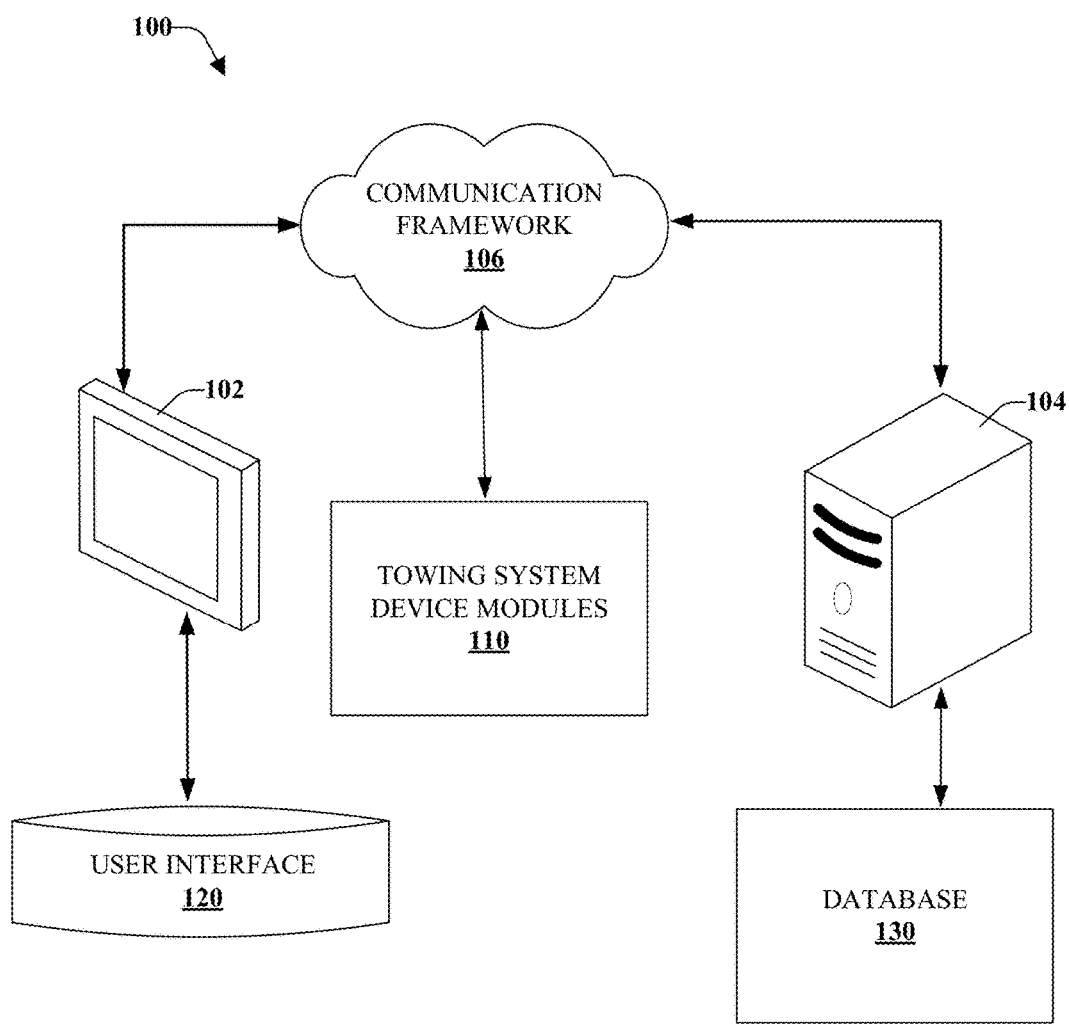
FIG. 1 is a schematic side view of an embodiment of the data collection and communication system of the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Overview

As a preliminary matter, the external components of the invention may be classified as electronics, connection devices, accessory, systems, interface/ancillary systems, and a master control device. These units may constitute individual, add-ons for consumer vehicle installations; however, the components of the present system are necessarily engineered with common features, such as intra-component communication protocols, power systems, standardized inputs and outputs, and the like, to facilitate operation of the system. In the same manner, certain components must sense, generate, or receive data that was not accessible to individual components in past stand-alone installations.

As noted above, individual devices, modules, and units—and particularly those commonly sold as stand-alone, aftermark additions to towing, cargo carrying, and other accessory systems—comprising the present system are referred to as components. Each component includes any appropriate functional hardware (i.e., the physical structure associated with the intended functionality of the component itself; for example, in a hitch bar, the actual structural member that engages the receiver hitch and/or, in a ramp, the planar sheet attaching to the vehicle bed for movement of cargo over it) and a power supply, such as an on-board battery or connector for receiving power from another source. The power supply provides electricity to any sensors and output controls needed by that component, as well as its communications equipment to send and receive data to/from other devices, a cloud or other external information storage, and various computing device, including personal device and/or those associated with the vehicle itself (i.e., its communications bus) via wired or wireless connections, any appropriate functional hardware (i.e., the physical structure associated with the intended functionality of the component itself; for example, in a hitch bar, the actual structural member that engages the receiver hitch and/or, in a ramp, the planar sheet attaching to the vehicle bed for movement of cargo over it), and microcontroller (or other, similar circuitry). Some components may also include an optional user input/interface. Appropriate wiring, dedicated circuitry, and other, similar connections will be provided within the housing of the component to ensure delivery of electricity and signals as appropriate to the component.

Separately, it will be understood that the system may be described according to the functionality and utility it provides. That is, the hardware in the system (without reference to specific components) must be configured to accomplish specific functions. For example, the system must be able to sense data (whether from automated sensors, user-provided inputs, or from external resources such as the internet or cloud storage), to store data, to communicate with components in the system, to communicate with devices external to the system (usually via wireless connectivity to the internet and internet-based services, cloud and other data storage services, and/or directly to third party data servers), to interface with and provide feedback to the end user, to evaluate, process, prioritize, and leverage data, and to coordinate both component and system-wide actions in response to data and inputs by way of outputs. Many of these functions were not previously used or fully leveraged in past vehicle accessory systems. Software, microprocessors, integrated circuitry, programmable logic controllers, and/or the use of other, dedicated devices enable these functions.

In this context, "logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). As such, embodiments may describe a user action may not require human action.

Also, throughout this disclosure, aspects of the invention may be defined according to individual components and/or according to the desired functionality of the system. As noted above, one component may deliver multiple functions and/or several components may redundantly perform and verify certain functions within the system. Therefore, attention should be given to the context of the disclosure with respect to both the components and the functionality of the system to afford this disclosure its broadest reasonable meanings.

Electronics components for use in the system contribute to the active management and control aspects of the system. They may include brake controllers and trailer braking systems, anti-sway attachments, converters, trailer breakaway systems, tire pressure monitoring systems for trailers and other attachments (i.e., separate and distinct from such systems integrated into the on-board electronics of the vehicle itself), and external cameras (i.e., also separate and distinct from on-board systems integrated with the vehicle itself).

Connection devices assist in establishing and maintaining the connection between the towed objects (e.g., vehicle to vehicle, vehicle to trailer, trailer to trailer, etc.). They may include fifth wheel and gooseneck assemblies, pin boxes, coupling systems, weight distribution mechanisms, hitches, and hitch bars.

Accessory systems are a general class of components accomplishing tasks that may not be directly related to towing. This range of devices may include jacks and lifting/support mechanisms, roof top and hitch-based cargo carriers, roof racks, assemblies and systems for securing items to the vehicle, ramps, and winches and other cable/wire dispensing and retracting devices.

Interface and ancillary systems include communication devices, information storage devices, and non-vehicle based batteries and power systems. Generally speaking, all of these items effectively support the functionality of the present system.

A master control or controller may coordinate functioning of the present system. It may include or rely on: a) existing equipment installed by the original manufacturer, b) a separate device specifically designed to integrated the various other components (i.e., one or more of the electrical components, connection devices, accessory systems, and/or interface/ancillary systems), or c) specifically designed features or hardware provided to a plurality of the "various other components" to impart overall control functionality to the present system (i.e., a distributed, networked function provided by a combination of components in the system). The master control may include any number of user interface devices (e.g., touch screen, keyboard and display, voice-activated control including a microphone, audio speakers, functional buttons, etc.), that may be incorporated within the master control unit itself or coupled (e.g., wired or wirelessly) to the control unit as part of a separate component or independent user device (e.g., a mobile phone, tablet, personal computing device, etc.). It is noted that these user interface devices may also be provided separately on any of the other system components.

Inputs provided to the present system may be generated from any of the aforementioned components or by leveraging existent aspects of the vehicle and/or trailer/towed product. Examples of the types of inputs that may be useful in the invention are listed below, although the description for the inputs provided in this section are within the context of the vehicle accessory system field and may be supplemented or otherwise understood to entail additional aspects by those of skill in the art. Any component disclosed in this specification may have any combination of the following inputs:

1) Anti-lock braking system (ABS);
2) Active/inactive;
3) Actuate: indicative of movement of any of the components any direction;
4) Air ride: pin box pressure;
5) Angle (may also be referred to as articulation): the angular measurement between a trailer (or component associated with the trailer) and the tow vehicle itself;
6) Auto dimming;
7) Auto inflate;
8) Biometrics;
9) Boost;
10) Brake intent: quantitative information indicative of the intent or intensity with which the brakes may be applied;
11) Brake output;
12) Charging status;
13) Collision sensor: particularly after any such event;
14) Connect/disconnect;
15) Crash detection: particularly prior to any such event;
16) Current voltage;
17) Deceleration/acceleration;
18) Default: to the extent the component has or may be provided with such a setting;
19) Effort: expressed as a percent of usage for the component in question;
20) Engagement (mechanical);
21) "Electric Over Hydraulic" (EOH)/electric mode: indicative of whether electric or hydraulic systems are employed, particularly with respect to braking;
22) Faults;

23) Gain: setting which limits the output voltage to just below a setting where the wheels would lock;
24) Heat;
25) High pin: as used herein, "high pinning" means that the component is not engaged;
26) Image;
27) Lamp type;
28) Lane change;
29) Level;
30) Load;
31) Location: particularly with respect to the Global Positioning System (GPS);
32) Lube;
33) Noise: both in an audible and electrical context;
34) Operational frequency;
35) Power loss;
36) Pressure: as appropriate to the component, including air pressure and/or hydraulic pressure;
37) Proximity: with respect to one external component's physical location in comparison to another external component (or some other reference point);
38) Pulse Width Modulation (PWM)/multiplex;
39) Second lock/latch: as may be appropriate to certain external components, such as fifth wheel and other connections system components;
40) Status: within the context of a particular variable;
41) Vertical deceleration;
42) Warning;
43) Wear;
44) Wheel speed: as measured by various methods, such as a rotation sensor, direct current voltage generator, a hall sensor, outputting pulses, etc.

Outputs provided by system components are specifically generated by the components based on inputs, sensed or user-provided data (as described herein), or some combination thereof. To the extent a component incorporates certain sensors (e.g., accelerometers, thermistors, thermocouples, pressure transducers, gyroscopes, etc.) or data processors (e.g., microprocessors, dedicated circuitry, etc.), certain information may be created by the component, although this "sensed data" should be treated separately. The outputs may be communicated and utilized within the present system to produce a desired end result (e.g., coordinated warnings to the end user, improved braking function, an overall improvement to the end user's experience, etc.). Thus, the outputs identified below are representative of at least some of the types of information that might be communicated among the components of the present system. The descriptive information noted above for the inputs also applies to the similarly named outputs in the list below. Any component disclosed in this specification may have any combination of the following outputs or various other outputs:

1) Anti-lock braking system (ABS);
2) Active/Inactive;
3) Actuate: movement of the component in question;
4) Air ride: pin box pressure;
5) Angle (may also be referred to as articulation): the angular measurement between a trailer (or component associated with the trailer) and the tow vehicle itself;
6) Auto dimming;
7) Auto inflate;
8) Biometrics;
9) Boost;
10) Brake intent: quantitative information indicative of the intent or intensity with which the brakes may be applied;
11) Brake output;
12) Charging status;
13) Collision sensor: particularly after any such event;
14) Connect/disconnect;
15) Crash detection: particularly prior to any such event;
16) Current voltage;
17) Deceleration/acceleration;
18) Default: to the extent the component has or may be provided with such a setting;
19) Effort: expressed as a percent of usage for the component in question;
20) Engagement (mechanical);
21) "Electric Over Hydraulic" (EOH)/electric mode: indicative of whether electric or hydraulic systems are employed, particularly with respect to braking;
22) Faults;
23) Gain: setting which limits the output voltage to just below a setting where the wheels would lock;
24) Heat;
25) High pin: as used herein, "high pinning" means that the component is not engaged;
26) Image;
27) Lamp type;
28) Lane change;
29) Level;
30) Load;
31) Location: particularly with respect to the Global Positioning System (GPS);
32) Lube;
33) Noise: both in an audible and electrical context;
34) Operational frequency;
35) Power loss;
36) Pressure: as appropriate to the component, including air pressure and/or hydraulic pressure;
37) Proximity: with respect to one external component's physical location in comparison to another external component (or some other reference point);
38) Pulse Width Modulation (PWM)/multiplex;
39) Second lock/latch: as may be appropriate to certain external components, such as fifth wheel and other connections system components;
40) Status: within the context of a particular variable;
41) Vertical deceleration;
42) Warning;
43) Wear;
44) Wheel speed: as measured by various methods, such as a rotation sensor, direct current voltage generator, a hall sensor, outputting pulses, etc.

The inputs and outputs above may comprise data. This data may be generated, recorded, and transmitted according to conventional means, including both digital and analog means. The data may be shared among some or all of the components in the system, either in its original form or after undergoing further processing (e.g., prioritization, selection, calculation of additional variables/values, averaging, etc.). Also, as further described below, the generation of data may be accomplished by a variety of sensors or input mechanisms and the recordation of the data is preferably via electrical or electromechanical means, while its transmission (both within the system and to components outside of it) may be by wire or wireless means. In addition to being classified as inputs or outputs described above, data may also be further classified as sensed data, user input data, and web-based data (which includes data drawn from the internet, remote cloud-based services, third party servers, and/or receipt of previously transmitted data from the present system that has undergone further analysis/processing via computing devices that are external to the system).

Sensed data may be produced by sensors or detectors integrated into any given system component, as well as data created by sensors associated with the vehicle or the towed product. Sensed data may include information that is sensed/detected by a component and/or inputs received from other components that have been further processed. In either case, the sensed data may be stored within a memory unit of the component in question and/or stored with dedicated components within the system. If sensed data effectively acts as an input or output, it may be encompassed by any of the categories and definitions provided above.

Similarly, data provided by a user (e.g., via a graphical user interface on one or more of the system components or via an application, sensor, and/or input means associated with an external user device (or as part of the system, e.g., the trailer brake controller), such as a mobile phone, tablet, or personal computing device) may also encompass the inputs or outputs as described above/herein. In these cases, the component will be programmed to query the user with respect to a particular parameter or variable (e.g., entries might range from basic user profiles for associating preferred default settings and logging information all the way to allowing the user to set significant variables, such as gain, trailer weight, etc.). These user-derived inputs can then be stored, used to compute additional values/variables, shared, and leveraged throughout the wider system. For example, such values might serve as a comparison points or allow for verification of other sensed data and/or calculated values automatically produced by the system.

As yet another distinction, certain components of the system may have internet-capabilities. That is, by way of wired or wireless data connections to a network (e.g., Ethernet, Wi-Fi, cellular network, etc.), it may be possible for components to be programmed to access specific data or information stored on servers and other computing devices, referred to herein as web-based data. In some embodiments, the nature of the data connection could even serve as a layer of privacy and data protection. For example, while the components of the system may rely on a wireless local area network associated with the vehicle or a specific component in the system (e.g., the communications device, the master controller, etc.), transmission of web-based data would only occur via a wired connection from a selected component. In this manner, it would become more difficult for an unauthorized party to access all of the components in the system and, further, by requiring internet connectivity via a wired connection, access to the system could be selectively limited by the user by simply unplugging a cord from the component in question. Moreover, the entire system may act as a closed loop system, whereby the individual components send and receive data amongst themselves without intervention of a separate device. This may be referred to as a mesh-network.

This approach may have several advantages. First, such web-based data may be independently verified and updated by third party experts, including manufacturers, weather forecasters, transit authorities, and the like. Second, it provides an opportunity to update component software or firmware, thereby enhancing the overall functionality of the system. For example, web-based data may come in the form of updates and receipt of data and information that may have only come into existence after the component is manufactured and/or after the end user purchased and installed the component. Web-based data such as weather forecasts, location, and traffic status may even be leveraged to (e.g., via modifications to calculations for braking) anticipate and/or plan in advance for certain conditions, as well as to assist the end user and the system itself to act in real-time in response to the implications of the data. Finally, web-based data may allow storing data from the present system, including user inputs (e.g., user profiles, etc.) and sensed data (e.g., use or event logs, system performance, etc.), for subsequent retrieval via cloud-based computing or other, similar data storage. Such web-based data may be compared against inputs and sensed data from a number of components in order to establish system norms, to verify the plausibility of data and calculations associated with the system, and/or contribute to the web-based data standards themselves), identify exceptions, and send messages (including warnings, cautions, reminders, and status updates). Web-based data also enables the ability to update the software or firmware of the components of the system.

The distinctions between sensed data, user-input data, and web-based data are not intended as rigid distinctions. As an example, data may be sensed by a component and subsequently transmitted via an internet connection. In the same manner user-input data may come into existence based upon an observation or read-out the user obtained from the internet and/or from a sensor/readout provided by a component. In these and other cases, the categories of sensed data, user-input data, and web-based data are informative in their nature and should not be understood as limiting how the data is used and/or how the system may operate. Depending upon context, a reference to data herein may encompass any of these categories.

While embodiments may refer to a particular network (e.g., internet, cloud-storage, cellular network, etc.), it is noted that a network may comprise various other configurations. For instance, a network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device, devices associated with a user, and/or active vehicle accessory system. The user account may also include information such as relationships with application usage, location, personal settings, and other information. In some embodiments, the ID may be combined with biometric data and/or used for crosschecking, data logging/archival purposes, theft deterrence, and other purposes described herein.

Each component may create, store, and process data (e.g., sensed, user-input, web-based, cloud server based, as stored, and/or after computations), as well as receive inputs and produce outputs. It will be understood that the outputs from any one component may serve as inputs for another. Similarly, each component identified herein may employ combinations of selected inputs and outputs, as will be described for certain embodiments below. Although a number of components may use identical inputs and/or produce identical outputs, the fact that multiple components produce the same feedback to the user (e.g., a low pressure warning, a disconnection warning, etc.) will benefit the driver/end user by delivering coordinated messages across multiple displays/interfaces, instead of separate and possibly differently presented feedback based on the individual component's settings. As noted below, the system may also make certain determinations about and/or corrections to identical or similar data generated or otherwise flowing through the system (e.g., multiple data inputs may allow for "cross-checking" across the entire system).

In the same manner, a number of components may provide similar or redundant functions (e.g., ability to receive user-inputs, data storage, communications capabilities, etc.). The disclosure of these functions is not intended to be exclusive to a single component. Moreover, it will be understood that all of the functionality of a particular component could be subsumed by a separate component. Also, redundant functionality may give rise to redundant inputs and data, which can then be crosschecked and further processed as noted herein.

The components of the present system communicate with one another, via wired and/or wireless connections and/or protocols, although wireless installations present certain advantages. As described below (including the Examples), wireless connections may allow for easy integration of new components. Retrofitting of existing, non-wireless products may be accomplished through use of an adapter or series of adapters. These adapters would be affixed proximate to the component of interest and establish a connection with that component via its conventional means (e.g., a wired connections such as USB cables, dedicated wires, coaxial cables, optical fiber cables, twisted pair cable, Ethernet HDMI, and the like). The adapter would possess sufficient circuitry to communicate with the system (receive inputs to provide to the component and transmit appropriate outputs based on data provided by the component) and may also incorporate additional sensors/functionality as appropriate to that component.

Adaptor may refer to a wireless adapter that allows an existing or legacy component to communicate wirelessly with other components of a system. For instance, an adaptor may couple to a wired connection of a device and may comprise a transmitter, sensor and/or receiver (or a single device that combines all of these components) that operatively sends and/or receives data. It is noted that at least one embodiment may utilize components that are in communication while other components are not. In an example, a user may utilize a brake controller and a sway controller that are in wireless communication with each other, while a camera system is not in communication with the controller or sway controller.

Adapters may also refer to an identification tag such as a radio frequency identification (RFID) tag, or other wireless identification tag (passive or active). An identification tag may be attached to or disposed within a component via an adhesive, over molding, mechanical coupling, magnetic coupling, or the like. For instance, an RFID tag can be adhered to a steel component (e.g., ball hitch, or the like). The RFID tag may be preprogrammed to store identification for the specific component and/or may be programmed by a user (e.g., end user, installer, etc.) to identify the particular component by make, model, characteristics (e.g., maximum load capacity, etc.). A component of the disclosed system may generate a signal that elicits a response from the identification tag. For instance, a master control may generate a signal to communicate with the identification tag. The master control may then receive a response and may store received information. In another example, a user device (e.g., smart phone) may communicate with the identification tag. The user device may then communicate with a master control. Separate sensors on or in any component (including the master controller and/or the component to which the adapter RFID tag is adhered) may be used to monitor and further process the signal produced by the tag, such as for purposes of monitoring displacement or movement of the tag, relative positioning of a plurality of tags, and the like.

The protocols inherent to wireless communication between system components may encompass any known system. For instance, embodiments may utilize various radio access network (RAN), e.g., Wi-Fi, Wi-Fi direct, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, xth generation long term evolution, or another IEEE 802.XX technology. BLUETOOTH (in any of its various iterations), various wireless technologies for exchanging data over short distances (e.g., ZigBee, RuBee, DASH7, etc.), and other protocols and personal area networks are expected to have particular utility. In the same manner, wireless communication may also include, in whole or in part, communications transmitted over more traditional local area network (including such networks provided by the vehicle and/or trailer/towed product) or a cellular data networks, so as to incorporate aspects of cloud-based computing systems, information available via world wide web and other internet connectivity, and the like. As such, any indication of "wireless," "Wi-Fi," or other similar terminology should be read expansively (at least within the context it is used) throughout this disclosure. Moreover, embodiments may use one or more different communications protocols or devices (whether wired or wireless) to communicate between the various components of the system.

The components of the system may rely on any of the following sensors. These sensors are integrated with the power supply, wiring, and/or other operational aspects of the component in question. Exemplary sensors include, but are not limited to the following (any type of sensor may be utilized without departing from the present teachings):

Load sensors. These devices indicate the application of force along a planar surface of the sensor. They may be incorporated at discrete locations and at various orientations to determine deliberate activation or unexpected/unintended scenarios. Examples where such sensors may be positioned include in conjunction with other sensors identified herein.

Accelerometers/decelerometers and motion/movement detection sensors: These devices may include micro electromechanical systems (MEMS), micro-opto-electromechanical systems, and other, similar types of acceleration measuring devices.

Temperature sensing devices: These may include thermistors, thermocouples, thermometers, and other similar instruments, also including those optionally incorporated onto/with integrated circuits (ICs).

Wheel speed sensors: These devices include Hall Effect sensors, accelerometers, gyroscopes, and the like. These can be also used to detect ABS.

Speed and distance sensors: These may include GPS, radar, and other known technologies.

Tire pressure monitors: These devices use one or more pressure transducers with thermistors for temperature measurement, as well as an accelerometer to allow for speed measurement. Insofar as pressure and temperature of gas are related, the sensor may automatically adjust as appropriate to deliver accurate data/outputs.

Current sensors: These devices measure load current according to well-known principles. As an example, a linear Hall effect sensor can to detect current in automobile or Trailer lamps without the use of a shunt resistor to sense the current, resulting in the non-contact measurement of current (ZCI).

"Sleep" Devices: These items are associated with any of the sensors or integrated means to cause the sensor/means to wake up after sensing certain activity to reduce power consumption of the larger sensor/component. They may comprise a single accelerometer or simple motion-activated device that generates a signal to activate a wider array of devices/sensors for a pre-determined period of time or other set of conditions (e.g., until motion stops), although other common approaches to detect a "wakening" state are possible (e.g., via current or voltage sensing, proximity of an object, user-initiated action, signals from other components, etc.).

Voltage monitors: These devices may detect low battery voltage, high battery voltage and other adjustments based on battery voltage according to well-known principles. Analog to digital converter (ADC) in a microcontroller or a voltage comparator are particularly well suited to serve as such sensors.

Frequency to voltage converters: These devices sense frequencies and convert them to a voltage-based signal according to well-known principles.

Proximity sensors: These devices rely on distance or range finders, including lasers and infrared sensors, to measure distance between the sensor and some other tangible object.

Angular sensors: The devices may include gyroscopes, accelerometers, anisotropic and other magnetoresitive sensors, potentiometers, inductive or capacitive, Hall, optical encoders to detect sway, angle between towed and towing vehicle, mounting angle of device, level sensing, etc.

Cameras: Relying upon appropriate software, these may sense angle, proximity, distance, lane change, patterns, faces, etc. These devices may also include more simplistic optical sensors, such as light intensity detectors associated with ambient or specifically designed light sources. Depending upon context, camera may refer to a sensor built into a particular component and/or to the discrete camera component described in the Electronics Systems section below.

Touch sensors: These devices use resistive, inductive or capacitive mechanisms to indicate contact.

Location sensors: Global Positioning System (GPS) and other similar technologies may be employed to detect location.

Crash sensors: These devices rely on accelerometers to detect sudden impact like crash, similar to those used in vehicle airbag deployment.

Load cells, strain gages, deflection sensors: These devices are well-known means of measuring weight/mass or other forces exerted in a particular direction.

Pressure transducers: These devices operate according to well-known principles to detect fluid pressure (e.g., brake fluid, air, etc.) to sense braking effort, pedal pressure, fluid exertion, etc.

Additionally, in certain embodiments, one component will serve as the master control by and, for the most part, through which the present system operates. In many embodiments, this master control may be integrated into a component, with the trailer brake controller being a potential choice owing to its existing familiarity with drivers and end users. Such trailer brake controllers often include graphic user interfaces, making them easily adaptable for further use as a master system control. Additionally, brake controllers are often located within the vehicle to streamline the delivery of warnings, updates, and other system information.

To the extent a separate component is provided for the master control, it should be in the vicinity and/or field of vision of the driver or intended user. It preferably includes functions for user interface and display (including input/output connections and functionality), wireless communication, information storage, and computation/microprocessor capabilities.

Alternatively, the master control could be integrated in or across any number of the other system components. It may be provided as a software package or application for an existing consumer-computing device, such as a laptop, digital assistant, tablet, or other electronic device possessing sufficient computing power and wireless and graphical/other user interface capabilities. In yet a further alternative, the master control could be produced as a standalone component, such as application that may be installed on user device or user equipment, thereby enhancing overall end user experience with a dedicated, specially designed interface that is convenient and simple to install. Further still, the system may not utilize a master control, but instead will share the control aspect among each of the various components. "User equipment," "device," "user equipment device," "client," and the like are utilized interchangeably in the subject application, unless context warrants particular distinction(s) among the terms. By way of example, user equipment may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, global positioning system (GPS) devices, and other devices possessing sufficient processing and software capabilities.

The master control can cross check data that is produced or gathered by the larger system. In particular, certain system components may produce similar or comparable forms of data (e.g., similar sensors on different devices, user inputs and web-based data relating to the same variable, etc.). In these scenarios, the master control can be specifically programmed to analyze such comparable data and determine the final or corrected value, which is then shared with all components in the system. This comparative function may also be useful in creating troubleshooting regimens in which user inputs are compared against sensed data and/or web-based information, with the master control then providing feedback and suggestions to the end user.

Any final or corrected values determined by cross-checking could be averaged from all the available data, or the master control might select one or more values based on pre-programmed hierarchy indicating a particular component provides more reliable information with respect to certain variables in comparison to other components (e.g., a wheel speed sensor located on the trailer may be deemed a more reliable indicator of trailer movement than an accelerometer located in the connection device associated with that trailer). In this regard, individual components may also be programmed with similar "cross-checking" capability to the extent they incorporate sensors or receive inputs for comparable but conflicting data.

In an aspect, the master control (as well as other components) may utilize high level processing techniques, such as artificial intelligence, statistical models, or other processes and/or algorithms. These high level-processing techniques can make suggestions, provide feedback, or provide other aspects. In embodiments, master control may utilize classifiers that map an attribute vector to a confidence that the attribute belongs to a class. For instance, master control may input attribute vector, x=(x1, x2, x3, x4, xn) mapped to f(x)=confidence(class). Such classification can employ a probabilistic and/or statistical based analysis (e.g., factoring into the analysis affinities and ingredient attributes) to infer suggestions and/or desired actions. In various embodiments, master control may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as automotive systems.

In accordance with various aspects, some embodiments may employ classifiers that are explicitly trained (e.g., via a generic training data) as well as implicitly trained (e.g., via observing user behavior, user interaction with components, user preferences, historical information, receiving extrinsic information). For example, support vector machines may be configured via learning or training phase within a classifier constructor and feature selection module. Thus, the classifier(s) may be used to automatically learn and perform a number of functions, including but not limited to determining, according to historical data, suggestions for gain and/or sensitivity settings. This learning may be on an individual basis, i.e., based solely on a single user, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

These high level-processing techniques may be used to analyze and leverage data within the system. Additionally, they exemplify how internet/third party connectivity and web-based data can be leveraged. Additionally or alternatively, these techniques may be logged, archived, and applied on an individualized basis (e.g., an ID for a particular component or system, a user profile, etc.). Finally, high level processing techniques can further inform or guide the crosschecking processes described herein.

As with other components, the master control can draw power from the vehicle or be provided with its own primary, renewable, or rechargeable power supply. For the sake of clarity, as used herein, references to the brake controller will typically be synonymous with the master control and vice versa, depending upon the context of the disclosure, although it will be understood that alternative embodiments using any of the alternative master controls are also contemplated. Also, in some embodiments, the master control may encompass the communications and information storage devices, to provide more defined functionality and assist in potential troubleshooting of system and/or component performance.

Access to the various forms of data (e.g., sensed, user input, and web-based), combined with the communications, information storage, and processing functionality of the system (either by way of a dedicated master control or a distributed/networked embodiment thereof), allows for further analysis of the data and system, as well as how each is used, both on a micro- and macro-scale. For example, this data may help to verify whether scheduled maintenance, software and system updates, and/or any warranties for components are applicable. The data (including information about system usage) may also be aggregated from a multiplicity of end users to inform future designs and updates, as well as track and improve safety performance. To the extent the end users operate the system under individualized user profiles (and in addition to any unique identifiers assigned to the master control for handling web-based data and other inputs/outputs), this aggregation of data can be similarly individualized, aggregated, and leveraged. For example, biometric data might serve as a theft deterrent or parental control by disabling or even disengaging components if an unauthorized use or user/driver is detected.

The aggregated may also provide data that assists in designing future components. For example, a designer may use aggregated data to learn that a limited amount of stress is applied to a portion of a component, which may allow the designer to redesign the component to move material from the lower stress area to a higher stress area or remove the material entirely.

The resulting system creates a series of interconnected components for the external vehicle accessories that afford the driver/user with additional information from and control of these components/added systems. By communicating seamlessly and directly with one another (or even indirectly, to the extent the system incorporates web-based data, external servers, and/or user devices such as mobile phones, tablets, and the like), these external components provide "active control" without driver/user intervention or, as an alternative, by taking certain actions in the event the driver/user does not respond after a set period.

Examples of specific embodiments and uses for this system will be provided in greater detail below. Example 1 describes a specific set up for a trailer brake controller-based system. The series of embodiments described in Example 2 illustrate how components might interact in various iterations of the system. Example 3 shows, at a high level, how any given component might interact with its sensors, as well as selected functional aspects of the larger system.

It will be understood that any sensors described above may be applied to the components below and, to the extent the description below includes a specific example of a sensor or function, it will be understood that equivalent sensors and means to accomplish that function are contemplated. In the same manner, while the description below provides specific examples of how components may be optimally configured, the functional aspects of the larger system may be incorporated into specific components through the use of sensors and other apparatus as described herein.

Electronics Systems

Brake controllers are envisioned as one of the components in the present system. Generally speaking, a brake controller is an electronic component that allows for activation and releases the brakes in a towed vehicle or trailer. Brake controller actions may be based upon braking actions, sensed conditions from the towing vehicle, and/or user intervention/inputs for operation. Exemplary, non-limiting brake controller units are disclosed in U.S. Pat. Nos. 6,012,780; 6,068,352; 6,282,480; 6,445,993; 6,615,125; 8,746,812; 8,789,896; and 9,150,201. All of these patents are incorporated by reference herein.

Within the electronics system, the brake controller may utilize as inputs from the other components any of the following:

1) ABS: vehicle or trailer ABS system signals may serve as inputs to modify braking, with the signal originating from a wheel speed sensor (on the trailer), a brake pedal sensor, onboard diagnostics, radar, and/or global positioning systems (GPS);
2) Active/inactive: if ignition is active (via on board diagnostics and/or controller area network bus), then decide the braking level;
3) Actuate: weight distribution, jacks, wheel sensors moved on incline, or breakaway pin may all serve as action events to apply the brakes and warn the driver/end user;
4) Air Ride: pin box activate the trailer brakes until the air ride is repaired;
5) Angle: the relative angle between the vehicle and trailer can be used to modify deceleration calculations;
6) Auto dimming: on board diagnostics, controller area network bus, other external components (e.g., interface and ancillary systems including the communications device), or ambient light sensors (such as photo cells or photoresistors) may be used for dimming or other adjustment of the backlights or display;
7) Biometrics: the identity of the driver/end user may be stored for archival purposes and may be used for safety insurance record access;
8) Boost: provided from the communications device and/or information storage device, or possibly from the brake controller's settings/operation, and used for output calculations and/or default value(s);
9) Brake intent: originates from a master cylinder pressure or pressure/movement sensor on the pedal of the vehicle itself and may be used to calculate the trailer brake controller output;
10) Brake output: originates from the trailer brakes and/or brake control unit and may be used to recalculate braking parameters based on the difference between the desired and actual voltages, as well as based on weather conditions and trailer/vehicle characteristics (weight, make, model, etc.);
11) Collision sensor: originates from the hitch, camera, communications device, global positioning system (GPS), or radar and may be used to apply the trailer brakes;
12) Connect/disconnect: originates from a converter, breakaway system, or the connections system and may warn the driver/end user with additional information like intent to move (via the ignition, wheel speed, GPS, etc.) and/or request additional action, like extension of the jack;
13) Crash detection: originates from a camera or decelerometer on any device and applies the trailer brakes upon detection;
14) Current Voltage: originates from the battery voltage and/or current from other components and may be used to detect low battery conditions and/or excessive current;
15) Deceleration/acceleration: originates from GPS or wheel speed and generally correlates to the accelerometer(s), with a verification and warning if an inconsistency is detected and a warning provided to the communications device and/or brake controller;
16) Default: based on the vehicle and trailer (including but not limited to information about the respective weights and other characteristics thereof), default values of gain and boost may be calculated or provided via communication device in order to operate the trailer brake controller;
17) Effort: may be expressed as a percentage of use from the battery in order to indicate battery condition, with this or any component creating a warning if that component is used above its usage life, and also warning the end user to change batteries or perform scheduled maintenance;
18) Engagement (mechanical): originates from connection systems and warns the end user with information like intent to move (via ignition, wheel speed, GPS, etc.) and/or request additional action, like extension of the jack;
19) Electric over hydraulic (EOH)/electric mode: originates from the trailer information provided by the communications device and may be used to set up brake controller default settings;
20) Faults: examples include connections systems not fully or properly engaged or jacks extended, with visual, audible, or other warnings provided to the user;
21) Gain: originates from the communications or information storage devices and used for trailer brake controller output calculations, setting of default values, and/or settings for the brake controller itself;
22) Heat: temperature from the trailer brakes and adjusts the output level;
23) High pin: as indicated by pin box or fifth wheel;
24) Image: originates from a camera and may be used to look at alignment of the hitch ball and receiver;
25) Lamp type: ZCI indicates lamp types used in the vehicle and causes stoplight drive with diagnostics potentially fine tuned accordingly;
26) Lane change: originates from a camera and may modify braking of the trailer;
27) Load: originates from a communications device, load sensor, connection systems (e.g., jack, coupler, fifth wheel, gooseneck, hitch, hitch bar, etc.), and/or accessory systems (e.g., roof rack, ramp, securing system, etc.) and causes the trailer brake controller output calculations and indicates gain, boost, an application of the brakes, and warning for the end user;
28) Location: for purposes of determining weather conditions via forecast (e.g., high temperatures, rain, wind, etc.) provided by the communications device, with the brake controller adjusting to anticipate higher temperatures than may exist in the ambient conditions and/or adjust gain and boost to anticipate rain;
29) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
30) Power loss: may originate and be detected by any component (e.g., the converter) and be of a short or long term nature, with a warning provided to the end user;
31) Pressure: originates from the TPMS of the trailer and/or if the fifth wheel airbag pressure is low, with a warning provided to the user and potential locking of the brakes by the controller and/or activation of a compressor to provide appropriate inflation:
32) PWM/multiplex: originates from the towing vehicle and may be input to the converter, senses brake on/off (BOO) input as PWM;
33) Second lock/latch: originates from the connections system and warns the user accordingly;
34) Status: status of the ignition variable from OBD ready to tow variable from the connection system or camera, with locking or unlocking the trailer brakes;

35) Vertical deceleration: originates from the hitch sensor, jack, TPMS, weight distribution system, or sway controller (and/or other components using accelerometers) and establishes the presence of a bumpy or rough road;
36) Warning: may be a warning received from any device which is then displayed in a coordinated and/or standardized format via the brake controller display/interface with application of the brakes as applicable;
37) Wear: wear status of the fifth wheel jaw, coupler, and/or trailer brakes and display warning; and
38) Wheel speed: originates from the sway controller, OBD-II (onboard diagnostics II), GPS, or radar, and brake output may be reduced at lower speed as the brakes tend to be more efficient at these speeds, also may permit the selective application of brakes to only selected wheels and/or in predetermined sequences.

The brake controller may provide any of the following outputs:

1) Active/inactive: brake control is active when BOO is active or manual lever is active;
2) Angle: relying on an accelerometer or other similar devices, the angle of the vehicle and trailer is sensed;
3) Auto dimming: ambient light as detected by an appropriate sensor, such as a photo cell or photoresistor, or by the controller area network bus;
4) Biometrics: may verify the identity of the driver/user based upon the cameras or other user-provided or user-based information;
5) Boost: as set in the brake controller itself;
6) Brake intent: output of brake control is proportional to the brake intent, which may be measured as noted herein (e.g., pedal force and movement detected by an appropriate sensor, pressure in the brake fluid pressure, etc.);
7) Brake output: output as generated by software in the brake controller itself;
8) Charging status: indicative of battery charge in a handheld unit, as sensed by measuring the charging current;
9) Collision sensor: collision detected and deceleration exceeds a predetermined (or preset) threshold;
10) Connect/disconnect: based upon resistive and/or inductive sensing, the brake controller generates output indicative of and/or in response to this condition;
11) Crash detection: may be detected and communicated based on the output of an accelerometer exceeding a threshold value within a specified time;
12) Current voltage: the output current is sensed to detect overload or short to ground, trailer connection etc., and the battery voltage, referred to hereafter as $V_{bat}$) adjusts the average output voltage to keep it constant for the same input conditions;
13) Deceleration/acceleration; indicative signals (as detected, for example, by an accelerometer, gyroscope, etc.) can be communicated to other devices and cross-checked or used by the other device;
14) Default: on power up, some settings not adjusted and stored in memory will be equated to pre-programmed default values if they are not adjusted/stored in the memory and communicated to other components;
15) Effort: the period of time (e.g., as measured in minutes or hours) the controller is used may be monitored via software;
16) EOH/electric mode: detects the mode in the software using a connectivity test and may communicated to other components;
17) Faults: if conditions (e.g., short to ground, overload, short to $V_{bat}$, over temperature, battery reversal/improper connection, etc.) are sensed and the brake controller displays and/or takes action for continued safe operation;
18) Gain: as set in the brake controller itself;
19) Heat: as sensed using a thermistor or other similar apparatus;
20) Lamp type: the stoplight drive current sense can depend upon the type of lamp load (e.g., light emitting diode, incandescent, etc.);
21) Level: sensed in idle condition as well as periodically during operation (but not while the brakes are activated) using an accelerometer or like;
22) Load: as sensed using current sense during the inductive test in an idle state;
23) Location: as sensed by GPS;
24) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
25) Operational frequency: the number, duration, and possibly other characteristics of specified braking events in a given period of time (e.g., one day) are stored in memory and communicated to the interface/ancillary system for statistical analysis and/or other purposes;
26) Power loss: sensed using $V_{bat}$, with short/temporary power losses avoiding the complete shutdown of the component, while major/longer term power loss triggers current component parameters to be saved in memory and restored upon the return of power;
27) Pressure: detected using a pressure transducer in the brake master cylinder;
28) PWM/multiplex: sensed using software within the controller;
29) Status: active or inactive;
30) Vertical deceleration: sensed using an accelerometer;
31) Warning: upon detecting/sensing faults (e.g., short to ground, open ground, etc.), warning signals will be provided by the controller;
32) Wear: sensed wear in parts as indicated by changes in specified parameters will be identified by a self-testing regimen; and
33) Wheel speed: as measured using an appropriate sensor, such as a hall sensor, accelerometer, gyroscope, etc., or as may be provided by the controller area network.

In some embodiments, sway control units and modules involve apparatus and methods for distributing the weight of a trailer to a towing vehicle and controlling the sway of that trailer relative to the towing vehicle. They may encompass a wide variety of mechanical swing arms, brackets, shoes, slides, spring bars, and related devices that may be attached to any of the draw bar, the ball (or other) mount, the hitch assembly, and the vehicle itself. Additionally, sway controllers encompass actuators, processors, electronic controls, and/or methods for selectively controlling the mechanical components in such systems. Non-limiting examples are disclosed in the following United States Patents, all of which are incorporated by reference herein: U.S. Pat. Nos. 5,868,414; 7,029,020; and 8,186,702. Moreover, a sway controller may utilize an electronic system that may not need the weight distribution system. Such electronic sway controllers may provide simultaneous braking when sway is detected to all or a portion of the brakes of the trailer. These braking events may generally prevent the trailer from swaying.

The sway controller according to the invention relies on or otherwise receives the following inputs from other components in the system or sensors within the controller itself:

1) ABS: vehicle ABS system signals may serve as inputs to modify braking of the trailer;
2) Active/Inactive: if the ignition is not active, the sway controller will be in sleep mode;
3) Actuate: until the vehicle or towed apparatus (e.g., trailer) is moving as indicated by wheel speed or other means, the sway control system can be in sleep mode;
4) Angle: the relative angle between the vehicle and trailer (via the connection devices such as the coupler, fifth wheel or gooseneck hitch, or the pin box) can be used to verify the angle used for sway controller calculations (as detected by an accelerometer, gyroscope, etc.);
5) Biometrics: the identity of the driver/end user may be stored for archival purposes and may be used for safety insurance record access;
6) Boost: provided from the communications device and/or information storage device and used for output calculations and/or default value(s);
7) Brake Intent: originates from a master cylinder pressure or pressure/movement sensor on the pedal of the vehicle itself and may be used to compare it with the actual deceleration forces;
8) Brake Output: originates from the trailer brakes and may be used to recalculate based on the difference between the desired and actual voltage;
9) Deceleration/Acceleration: deceleration from any component(s) may be indicative of the vehicle moving so as to wake up the sway controller, communications device, and/or trailer brake controller;
10) Faults: sway detection as provided by camera or angle sensor from the coupler or other connection device and may apply the trailer brakes based on sway signal characteristics;
11) Gain: originates from the communications or information storage devices and used for trailer brake controller output calculations, setting of default values, and/or settings for the sway controller's internal settings and/or the brake controller itself;
12) Heat: temperature from the trailer brakes and adjusts the output level;
13) Image: originates from a camera and may be used to observe and/or determine any swing relative between the vehicle and the trailer;
14) Lane Change: originates from a camera and may modify braking of the trailer;
15) Level: indicative of the level of the hitch, coupler, and/or other connection device and adjusts the weight distribution system accordingly;
16) Load: originates from a communications device, load sensor, connection systems (e.g., jack, coupler, fifth wheel, gooseneck, hitch, hitch bar, etc.), and/or accessory systems (e.g., roof rack, ramp, securing system, etc.) and causes the trailer brake controller output calculations and indicates gain, boost, an application of the brakes, and warning for the end user;
39) Location: for purposes of determining weather conditions via forecast (e.g., high temperatures, rain, wind, etc.) provided by the communications device, with the brake controller adjusting to anticipate higher temperatures than may exist in the ambient conditions and/or adjust gain and boost to anticipate rain and more sway if windy;
17) Status: ignition active and sway in sleep mode if ignition is not active;
18) Vertical Deceleration: originates from the hitch sensor, jack, TPMS, weight distribution system, or sway controller (and/or other components using accelerometers) and establishes the presence of a bumpy or rough road then the sway module outputs may be further processed accordingly;
19) Warning: signal from break away, battery (e.g., low battery), power loss, ABS active (vehicle or towed product) would prompt the sway control to adjust the output.
20) Wear: wear signal from any component (involved in such mechanical action) and send warning to communications device and the master control;
21) Wheel Speed: indicative of trailer movement and originates from the sway controller, OBD-II (onboard diagnostics II), GPS, or radar, with the transfer functions of the sway output relying on speed because the efficiency of the brakes is a function of speed.

The sway controller may provide any of the following outputs:

1) Active/Inactive: when lateral swing exceeds a predetermined threshold, the component will be output to the braking as active;
2) Angle: a camera and/or a transducers at the ball or coupler may be used to measure angle (as detected by an accelerometer, gyroscope, etc.);
3) Boost: may be a relative value automatically set or selected based upon characteristics of the towed system/trailer (e.g., weight of the trailer, tongue weight, etc.);
4) Brake Intent: sensed braking may be detected by a strain gage, a force gage, or similar sensors positioned within the vehicle and/or the present system;
5) Brake Output: as generated by the sway module itself, and the outputs may be for each side or each magnet associated with braking;
6) Collision Sensor: collision sensed via decelerometer;
7) Connect/Disconnect: based upon resistive and/or inductive sensing, the brake controller generates output indicative of and/or in response to this condition
8) Crash Detection: rate of change in angle (as detected by an accelerometer or gyroscope on the sway control, by camera, by force sensors on the hitch/hitch bar, etc.) may be interpreted as a crash and a warning signal may be sent to other devices (and possibly prompt further action, such as entering a "crash mode");
9) Current Voltage; the output current is sensed to detect overload, short to ground, or similar conditions and, when such conditions exist, the drive is disabled, the $V_{bat}$ is sensed, and/or a notification is provided to the communications device;
10) Deceleration/Acceleration: measures deceleration via an accelerometer;
11) Default: upon powering the sway controller module, some settings will be returned to default values if they are not adjusted and stored in the memory and communicated to other components;
12) Effort: indicative of the date the module was installed and its cumulative time of use (and, possibly, more comprehensive information as to the relative timing of its use and/or other events);
13) Faults: shorted or open brakes, no communication with the vehicle;

14) Gain: may be a relative value automatically set or selected based upon characteristics of the towed system/trailer (e.g., weight of the trailer, tongue weight, etc.);
15) Heat: as indicated by an appropriately positioned thermistor with circuitry provided to sense/calculate a threshold for "over temperature" conditions;
16) Level: as indicated by a tilt sensor;
17) Load: sensed using current sense during the inductive test in the idle state;
18) Location: may be sensed by a GPS sensor;
19) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
20) Operational Frequency: indicative of hours used based upon changes in the angle;
21) Power Loss: sensed using $V_{bat}$, with short/temporary power losses avoiding the complete shutdown of the component, while major/longer term power loss triggers current component parameters to be saved in memory and restored upon the return of power;
22) Status: indicative of connectivity;
23) Vertical Deceleration: as sensed using an appropriate accelerometer;
24) Warning: warning signals will be provided from other components (e.g., trailer brake controller) upon detecting various faults (e.g., short to ground, open ground, etc.);
25) Wear: based upon a self testing regimen, the module will detect and indicate wear in its parts by changes to selected parameters (such as excessive temperature of thermistor in comparison to brake current or brake current as compared to deceleration readings in the direction of travel, with anomalous readings in either being indicative of wear), with potential prompts for the end user to take further action, such as increasing the spring tension of the bar, etc.;
26) Wheel Speed: as measured using an appropriate sensor, such as a hall sensor, or as may be provided by the controller area network.

Converters are devices that couple to the electrical system of a vehicle, and especially wiring that controls the taillights, signal lights, and the like. Converters then transmit and/or further process those electrical signals so as to allow for simultaneous operation of similar devices on a corresponding vehicle accessory, such as a trailer or hitch mounted cargo carrier or other device. Non-limiting examples of such converters include United States Patent Publication Nos. 2014/0001730 and 2015/0367774 and U.S. Pat. Nos. 8,179,142; 9,102,267; and 9,120,424, all of which are incorporated by reference.

Converters useful to the invention utilize the following inputs from other components in the system or sensors within the unit itself:
1) Active/Inactive: if the ignition is active and/or the connectivity status is not connected, verify and notify the communications device and the information storage/memory device to extend the jacks and/or apply the trailer brakes;
2) Connect/Disconnect: based upon an indication from the brake controller and/or other component that the trailer is disconnected and verifies with lamps and notifies the communications device and the information storage/memory device;
3) Current Voltage: originates from the battery voltage and/or current from other components (e.g., trailer brakes, battery, trailer brake controller, jacks, etc.) and may be used to detect low battery conditions and/or excessive current;
4) Default: the trailer/towed product will indicate the number and type of lights present which may be used for verification based upon current and notify in the event of a discrepancy;
5) Faults: low battery voltage and/or excessive current being drawn from the battery and may notify the communications device and the information storage/memory device;
6) Heat: temperature indicated by the brake controller, brake magnets, the battery, or other components and, in their inactive state, may be indicative of the ambient temperature conditions, and appropriate notification may be provided to the communications device and the information storage/memory device;
7) Lamp Type: based on information about the trailer/towed product set up received from the communication device and/or other components, and verifies and notifies of any discrepancies;
8) Power Loss: this input can come from the TBC or other devices;
9) PWM/Multiplex: information on the vehicle and its setup, which informs the pulse width modulation/multiplex methods, is received from the communications device or other components and verified, with notification of any discrepancies, created and provided to the communications devices or other components;
10) Status: ignition active and connectivity status is not connected and verify/notify communications device and/or information storage device, while also potentially extending jack and applying trailer brakes;
11) Warning: a warning received from any of the connection devices may initiate an alteration (e.g., flashing) in the trailer lights.

In the same manner, converters typically may provide any of the following outputs:
1) Connect/Disconnect: trailer/towed product connection (or lack thereof) may be detected via creation of output voltage and a corresponding detection of current;
2) Current Voltage: current is sensed via current and voltage is sensed via an analog to digital conversion of $V_{bat}$;
3) Default: upon powering the converter module, some settings will be returned to default values if they are not adjusted and stored in the memory and communicated to other components;
4) Effort: the number of braking events, signals (e.g., turn signal activations, tail light operations, etc.), and similar items attempted or accomplished within a given time period (e.g., days, hours, etc.) can be tracked via software and communicated to the communications device and/or the interface/ancillary systems, including the cloud, in order to gather statistical information;
5) Faults: software and/or circuitry may be used to sense and take action in response to certain fault conditions (e.g., short to ground, $V_{bat}$, over temperature, battery reversal or improper connection, etc.);
6) Heat: as sensed via a thermistor or similar apparatus;
7) Lamp Type: as determined using current sense;
8) Load: as measured using current sense;
9) Location: as sensed via GPS;

10) Operational Frequency: by counting the number of times different inputs are turned on or otherwise activated or engaged;
11) Power Loss: sensed using $V_{bat}$, with short/temporary power losses avoiding the complete shutdown of the component, while major/longer term power loss triggers current component parameters to be saved in memory and restored upon the return of power;
12) PWM/Multiplex: sense if inputs are modulated or multiplexed to that information may be stored in memory and broadcast through or beyond the system;
13) Status: specifically, idle or active and incandescent or light emitting diode (although other status may also apply);
14) Warning: upon detecting various faults via software or circuitry (e.g., short to ground, open load, etc.), warning signals may be communicated;
15) Wear: based upon a self-testing regimen, the module will detect and indicate wear in its parts by changes to selected parameters (such as excessive temperature change at a given current or abnormal current sense in relation to the trailer/towed product type may be indicative of potential issues).

Breakaway systems are devices that sense the unintended disconnection of towing systems and devices. These systems may use any variety of electric or electromechanical couplings positioned on the vehicle and/or the connections system components to verify the proximity or actual physical contact of/between the components in question. Some systems may also include automatic brake activation on the trailer (or towed device) when a disconnect is detected. For example, this electromechanical connection comprises a safety cable that pulls a key out of a switch box allowing the circuit in the breakaway system to be completed, thereby providing power to electrical braking systems or, in the event of hydraulic brakes, an appropriate activation signal. Additionally, some systems incorporate rechargeable batteries that may be charged by an auxiliary power wire from the vehicle's trailer connection. Mounting systems are often provided to ensure that the breakaway system is located proximate to the trailer and vehicle connection assembly (e.g., hitch ball, hitch box, etc.).

Breakaway systems that might be incorporated with the invention may utilize the following inputs from other components in the system or sensors within the system itself:
1) Active/Inactive: if ignition is active and the $5^{th}$ wheel hitch, coupler, gooseneck, or other connection device is not engaged, send voltage to brakes via the breakaway system;
2) Actuate: until the vehicle or towed apparatus (e.g., trailer) is moving as indicated by wheel speed or other means, the breakaway system can be in sleep mode;
3) Air Ride: pin box activate the trailer brakes until the air ride is repaired;
4) Collision Sensor: originates from the hitch, camera, communications device, global positioning system (GPS), or radar and may be used to extend the jack;
5) Connect/Disconnect: originates from a trailer brake controller, converter, breakaway system, or the connections system and may extend the jack;
6) Crash Detection: originates from a camera or decelerometer on any device and applies the trailer brakes upon detection;
7) Current Voltage: originates from the battery voltage and/or current from other components (e.g., trailer brakes, battery, trailer brake controller, jacks, etc.) and may be used to detect low battery conditions and/or excessive current;
8) Deceleration/Acceleration: deceleration from any component(s) may be indicative of the vehicle moving so as to wake up this component, communications device, and/or trailer brake controller;
9) Engagement (Mechanical): hitch, coupler, $5^{th}$ wheel, gooseneck engagement/disengagement would be useful information to the break away system.
10) Faults: a low battery fault may result in verification that enough voltage will be available quickly provide maximum braking and/or request/direct shut down of unnecessary power draw from other components in the system, and particularly those on the trailer and/or that have been disconnect;
11) Heat: temperature from the trailer brakes and adjusts and optionally report the output level;
12) Image: originates from a camera and may be used to observe and/or determine any break away relative between the vehicle and the trailer;
13) Load: originates from a communications device, load sensor, connection systems (e.g., jack, coupler, fifth wheel, gooseneck, hitch, hitch bar, etc.), and/or accessory systems (e.g., roof-rack, ramp, securing system, etc.) and causes an application of the brakes and warning for the end user;
14) Location: for purposes of determining weather conditions via forecast (e.g., high temperatures, rain, wind, etc.) provided by the communications device, with maximum signal reduced and gain and boost adjusted in the event of rain;
15) Power Loss: may originate and be detected by any component (e.g., the converter) and be of a short or long term nature, with a warning provided to the end user;
16) PWM/Multiplex: information on the vehicle and its setup, which informs the pulse width modulation/multiplex methods, is received from the communications device or other components and verified, with notification of any discrepancies, created and provided to the communications devices or other components;
17) Status: if the ignition is active and any connection device (e.g., 5th wheel, couple, gooseneck, etc.) is not engaged and send voltage to brakes;
18) Warning: may be a warning received from any device with application of the brakes as applicable;
19) Wear: wear signal from any component (involved in such mechanical action) and send warning to communications device and the master control;
20) Wheel Speed: indicative of wheel movement.

The breakaway system also typically provides any of the following outputs:
1) Active/Inactive: monitor voltage and/or current provided to the brakes;
2) Charging Status: this may be sent to the master control to aid in its decisions with, as an example, low charge status warning to the user of an issue with respect to the battery;
3) Current Voltage: as current or voltage provided to the brake magnets;
4) Default: two axles;
5) Faults: overheating, shorted magnet(s), breakaway switch failure, or trailer brake disconnection from the breakaway system;

6) Heat: the breakaway module may generate heat if the switch's contact resistance is high due to oxidation, corrosion, or similar degradation of its surface;
7) Location: may be sensed via GPS;
8) Status: indicative of connectivity;
9) Warning: shorted magnet(s), breakaway active, or lower than expected voltage/current;
10) Wear: contact resistance indirectly measured via temperature changes (e.g., heat detection) within a predetermined time frame;

Tire pressure-monitoring systems (TPMS) periodically or continuously sense the air pressure in one or more tires. As with the other components of the present system, such TPMS devices are separate from any integrated, closed systems that may be employed by the vehicle manufacturer to monitor only the vehicle tires. Such systems employ pressure sensors operatively connected to one or more of the inflatable tires of a trailer or towed device, with a corresponding receiver for the TPMS assisting in the operation of the system. These sensors may provide signals to a processor and/or memory unit of the TPMS device, which then communicates with the driver/end user through a graphical interface, display, or other warning system. Typically, when one or more sensors register pressure readings outside of the predetermined normal range, an alert is provided to the user.

TPMS devices may utilize any of the following inputs from other components or sensors within the system itself:
1) Active/Inactive: Ignition active status and/or ABS active signal would wake up the TPMS;
2) Actuate: until the vehicle or towed apparatus (e.g., trailer) is moving as indicated by wheel speed or other means, the TPMS system can be in sleep mode;
3) Auto Inflate: if low pressure is detected, inflation of the tires is initiated until a correct pressure is detected;
4) Current Voltage: originates from the battery voltage and/or current from other components (e.g., trailer brakes, battery, trailer brake controller, jacks, etc.) and may be used to detect low battery conditions and/or excessive current;
5) Faults: too much trailer weight from the communications device and communicates to the TPMS receiver, so as to notify and/or verify against other data within the overall system, with adjustment to gain/boost in the trailer brake controller, warnings of sway condition, etc., as further possibilities;
6) Heat: temperature from the trailer brakes and notifies the TPMS receiver;
7) Location: for purposes of determining weather conditions via forecast (e.g., high temperatures, rain, wind, etc.) provided by the communications device, with pressure readings adjusted according to barometric pressure;
8) Power Loss: may originate and be detected by any component (e.g., the converter) and be of a short or long term nature, with a warning provided to the end user;
9) Pressure: self-generated indication of low pressure and results in tire inflation;
10) Proximity: proximity of TPMS to the TPMS receiver;
11) Status: Ignition active status would wake up the TPMS;
12) Warning: ABS active warning could serve as a cross check with potential adjustment to the gain/boost by the brake controller, etc.;
13) Wheel Speed: indicative of wheel movement.

TPMS devices also provide any of the following outputs:
1) Active/Inactive: indicated as active when wheel rotation is detected, with request to send pressure or temperature sensed data or inputs received when queried;
2) Current Voltage: may be indicative of low $V_{bat}$;
3) Default: indicative of manufacturer's recommended pressures;
4) Engagement (Mechanical): the actual pressure reading will be indicative of correct position of the TPMS;
5) Faults: may be no communication and/or out of range pressure;
6) Heat: thermistor or similar apparatus detects the temperature of pressurized air in the tire;
7) Location: may be sensed via GPS;
8) Operational Frequency: indicative of component starts and stops, travel time, and/or total tire usage time;
9) Pressure: as measured via a pressure transducer;
10) Status: indicative of movement of the object associated with the TPMS;
11) Warning: low battery (as sensed by $V_{bat}$), tire pressure out of range (as sensed by the pressure transducer), and or high temperature (as sensed via the thermistor);
12) Wear: may be indicated by wheel speed measurements from the component that are inconsistent with wheel speed inputs provided from other system components;
13) Wheel Speed: as indicated by an accelerometer or other appropriate device integrated with the TPMS.

Trailer braking units merely activate the brakes on the trailer itself, without necessarily receiving control signals from a separate device (e.g., a trailer brake controller). Brake units may be integrated with a trailer, or a separate aftermarket kit may be installed on the trailer itself. Brake units may be distinguished from brake controller units, in part, by their location (on the trailer itself) and their need to receive an additional braking signal—usually provided by the brake controller or some other electrical connection with the vehicle itself (e.g., a signal to activate the tail lights, possibly provided by a converter).

Trailer brakes may utilize any of the following inputs from other components or sensors within the unit itself:
1) ABS: vehicle ABS system signals may serve as inputs to modify braking of the trailer;
2) Active/Inactive: if ignition is active and the $5^{th}$ wheel hitch, coupler, gooseneck, or other connection device is not engaged, send voltage to brakes;
3) Actuate: until the vehicle or towed apparatus (e.g., trailer) is moving as indicated by wheel speed or other means, the trailer brake monitor can be in sleep mode;
4) Air Ride: pin box activate the trailer brakes until the air ride is repaired;
5) Angle: the relative angle between the vehicle and trailer (via the connection devices such as the coupler, fifth wheel or gooseneck hitch, or the pin box) can be used to verify the angle and apply brakes in response to too much swing amplitude and frequency;
6) Boost: provided from the communications device and/or information storage device and used to verify settings against trailer weight, vehicle weight, and the corresponding brake voltage;
7) Brake Intent: provided from the master cylinder pressure or pressure/movement of a sensor associated with the brake pedal and used to compare against the corresponding brake voltage;
8) Charging Status: of the trailer battery;
9) Collision Sensor originates from the hitch, camera, communications device, global positioning system (GPS), or radar and may be used to extend the jack;

10) Connect/Disconnect originates from a trailer brake controller, converter, breakaway system, or the connections system and may extend the jack;
11) Crash Detection: originates from a camera or decelerometer on any device and applies the trailer brakes upon detection;
12) Current Voltage: originates from the battery voltage and/or current from other components (e.g., trailer brakes, battery, trailer brake controller, jacks, etc.) and may be used to detect low battery conditions and/or excessive current;
13) Deceleration/Acceleration: deceleration from any component(s) may be indicative of the vehicle moving so as to wake up this component, communications device, and/or trailer brake controller;
14) Default: the number of axles on the trailer may come from the communications device based up on the trailer type, but with a comparison of current vs. voltage verifying the correct number of axles;
15) Faults: tire and/or brake temperature and high $V_{BAT}$ and/or low $V_{BAT}$ from the battery or the brake controller may be communicated to the master control for warning purposes;
16) Gain: originates from the communications or information storage devices and used to verify that the voltage of the brakes ($V_{brakes}$) do not exceed the gain setting;
17) Heat: heating of the trailer brakes;
18) Image: originates from a camera and may be used to examine source of audible noise, as detected/transmitted by a microphone associated with the camera, from the brakes;
19) Lane Change: trailer brake controller informs the brake unit of a lane change and may instruct to apply brakes directly;
20) Load: originates from a communications device, load sensor, connection systems (e.g., jack, coupler, fifth wheel, gooseneck, hitch, hitch bar, etc.), and/or accessory systems (e.g., roof rack, ramp, securing system, etc.) and causes an application of the brakes and warning for the end user;
21) Noise: indicative of rough road, wearing of a device and/or a loose mechanical connection, with the accelerometer inputs interpreted accordingly and warning indications provided to the user with respect to premature wear;
22) Power Loss: may originate and be detected by any component (e.g., the converter) and be of a short or long term nature, with a warning provided to the end user;
23) Pressure: as indicated by TPMS with the brakes applied to immobilize the trailer;
24) Second lock/latch: originates from the connections system and the jack stays extended until the pin is inserted;
25) Status: if the ignition is active and any connection device (e.g., $5^{th}$ wheel, couple, gooseneck, etc.) is not engaged and send voltage to brakes;
26) Warning: may be a warning received from any device with application of the brakes as applicable;
27) Wear: wear signal from any component (involved in such mechanical action) and send warning to communications device and the master control;
28) Wheel Speed: indicative of wheel movement.

Trailer brake units may provide any of the following outputs:

1) Active/Inactive: via the presence of pressure and/or voltage;
2) Actuate: position sensor;
3) Boost: Measure the effectiveness based on deceleration value, could adjust the boost value;
4) Brake Intent: as measured using hydraulic pressure or voltage at the electric brakes;
5) Brake Output: voltage reading at the brakes;
6) Connect/Disconnect: open circuit or low resistance;
7) Current Voltage: analog to digital converter and current sensing transducer;
8) Default: EOH or electric setup in software and also includes the number of axles;
9) Effort: expressed as a percentage based on the average voltage versus the maximum voltage over a given period;
10) EOH/Electric Mode: software and/or component-based memory stores the type of brakes;
11) Faults: using current flow, voltage is measured from an analog to digital converter associated with a thermocouple for detecting heat, thereby providing indication of low voltage, low current, and/or shorts;
12) Gain: maximum voltage observed at/by the brake over a given period of time, with trailer brake, voltage, or deceleration changing boost if it is determined as inadequate;
13) Heat: measured by way of a thermocouple;
14) Load: number of axles measured by sensing current load cell for weight at wheel;
15) Location: may be sensed via GPS;
16) Noise: audible noise as detected via appropriate sensors and/or via appropriately situated accelerometer(s);
17) Operational Frequency: position sensor, noise sensor;
18) Pressure: as measured via a pressure transducer;
19) Status: indicative of the presence of voltage and/or pressure;
20) Warning: in the event the thermocouple detects overheating;
21) Wear: indicated by total hours used and/or braking for the same output drive or trailer load less deceleration observed in a self-testing regimen;
22) Wheel Speed: as measured using an appropriate sensor, such as a hall sensor or a generator.

Camera systems may include one or more cameras mounted on a trailer, cargo carrying system and/or items stowed on such systems, a connection assembly (as defined herein), and/or on the vehicle itself. Preferably, digital cameras provide immediate, digital data that may be processed and analyzed via appropriate, dedicated circuits, microprocessors, and/or software. In this manner, movement of objects, recognition of objects or people, and a number of other known approaches to processing and leveraging image-based data may be employed by the system. While cameras normally produce pictures, other optical sensing devices may also be encompassed, such as fingerprint sensors, infrared (or other non-visible light) sensors, and the like.

Cameras may utilize any of the following inputs from other components or sensors within the system itself:

1) ABS: the camera may be used to examine the vehicle ABS system and verify operation and status/activity in that regard;
2) Active/Inactive: sway active, check lane change status using camera;
3) Angle: the relative angle between the vehicle and trailer (via the connection devices such as the coupler, fifth wheel or gooseneck hitch, or the pin box) can be used to verify the angle communicated to the sway controller;
4) Current Voltage: originates from the battery voltage and/or current from other components (e.g., trailer brakes, battery, trailer brake controller, jacks, etc.) and may be used to detect low battery conditions and/or excessive current;
5) Deceleration/Acceleration: deceleration from any component(s) may be indicative of the vehicle moving so as to wake up this component, communications device, and/or trailer brake controller;
6) Faults: 'too much sway' from sway control can be cross checked by camera;
7) High Pin: fifth wheel high pin indicator could be cross-checked with camera to verify high pin condition;
8) Noise: indicative of rough road, wearing of a device and/or a loose mechanical connection, with the accelerometer inputs interpreted accordingly and warning indications provided to the user with respect to premature wear;
9) Power Loss: may originate and be detected by any component (e.g., the converter) and be of a short or long term nature, with a warning provided to the end user;
10) Second lock/latch: originates from the connections system and the jack stays extended until the pin is inserted;
11) Status: sway active and check lane change status using the camera;
12) Warning: shows image (if available) for a warning condition;

Camera systems also may provide any of the following outputs:
1) Active/Inactive: software can detect camera activity by pattern change or similar algorithms;
2) Angle: detects angle by way of pattern recognition, integrated angle sensor, or feature extraction;
3) Biometrics: may be used for a retina scan or other similar tests;
4) Collision Sensor: collision sensed via decelerometer;
5) Connect/Disconnect: as indicated by a lack of communication from/by the component;
6) Current Voltage: measured via $V_{bat}$ and current;
7) Default: for both hardware and software, as depending upon the original equipment manufacturer's determinations for the particular camera in use;
8) Faults: indicative of improper positioning, with software potentially programmed to manage and track these conditions;
9) Heat: sensed by a thermistor and electronics or other, similar apparatus;
10) Image: by way of still photos, video, or other moving images, whether based on visible, infrared, or ultraviolet spectra;
11) Location: may be sensed via GPS;
12) Operational Frequency: indicative of how often the component has been turned on/activated and/or the number of times it has received a request from other components;
13) Power Loss: as measured according to $V_{bat}$;
14) Proximity: in particular, the edge of the trailer/towed product, the vehicle perimeters (e.g., bumpers, fenders, wheels, other extremities, etc.), and/or the connection device, as detected relying on appropriate recognition software;
15) Status: as working and/or active;
16) Warning: indicative of low battery or a malfunction of the camera's hardware or software;
17) Wear: as indicated by quiescent current.

All of the foregoing inputs and outputs for the components of the electronics systems are merely exemplary and do not necessarily limit the ability to provide other inputs and/or outputs described herein. Further, while these systems are described as electronic systems, the connection devices and accessory devices described below (as well as those systems otherwise included or described herein) may include electronic components and systems.

Connection Devices

Fifth wheel hitches are trailer connection devices as well known in the art. Generally speaking, these components are usually mounted in or under the bed of a pick-up truck or similar consumer vehicle. A kingpin on the trailer/towed product cooperates with crescent-shaped set of jaws to allow for the connection of the trailer while simultaneously permitting a range of motion between the trailer and vehicle. Additional mechanisms are incorporated to ensure the hitch is securely fastened to the vehicle, the kingpin is properly seated, and the entire assembly has sufficient range of motion to allow the vehicle and trailer to turn. The mounting is also designed to evenly and appropriately distribute the weight of the towed apparatus. Non-limiting examples of such fifth wheel hitches include United States Patent Publication Nos. 20140265244, 20120018979, 20120018978 and U.S. Pat. No. 7,556,278, all of which are incorporated by reference.

The fifth wheel hitch components used in various embodiments of the invention may utilize as inputs any of the following conditions:
1) Active/Inactive: if the ignition is active but the fifth wheel hitch is not engaged, then extend the jack and apply the trailer brakes;
2) Actuate: when vehicle motion is detected (e.g., as evidenced by wheel speed) and fifth wheel hitch is not engaged, then extend the jack;
3) Angle: the angle between the vehicle and the trailer/towed product, as evidenced by the coupler, gooseneck and/or pin box, with verification of the angle sensed communicated to the sway controller and/or other components;
4) Biometrics: identity of the driver/end user can be stored for record keeping/archival purposes, as well as used for safety insurance record access, with the possibility of disabling operation in response thereto;
5) Brake Intent: originates from a master cylinder pressure or pressure/movement sensor on the pedal of the vehicle itself and may be used to compare against actual/sensed deceleration forces;
6) Connect/Disconnect: originates from a converter, breakaway system, or the connections system and request additional action, like extension of the jack;
7) Crash Detection: vehicle movement would prevent disengagement and an automatic connect or disconnect can be based upon vehicle speed (e.g., moving=locked, not moving=open);
8) Current Voltage: originates from the battery voltage and/or current from other components (e.g., trailer brakes, battery, trailer brake controller, converter, jack, etc.) and may be used to detect low battery conditions and/or excessive current;
9) Deceleration/Acceleration: indicative of deceleration, consistent with vehicle movement, as sensed or indicated by any component, resulting in a verification that the fifth wheel hitch is engaged and/or a warning to the communication device and/or master control;

10) Default: default trailer weight from communications device (used to assess force on jaw);
11) Engagement (Mechanical): converter and TBC can detect trailer self-connection (to the vehicle), with self-detection also possible;
12) Faults: ignition on and trailer/towed product movement, results in extension of jack(s) if the fifth wheel hitch is not engaged;
13) High Pin: origination point for high pin information/sensed data;
14) Image: originates from a camera and may be used to look at alignment of the fifth wheel hitch;
15) Load: indicative of communications device, load sensor, jack, fifth wheel hitch, gooseneck, hitch/hitch bar, roof rack, securing systems, and/or ramp, resulting in a signal to the communications device to apply the brakes and warn the user;
16) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
17) Power Loss: may originate and be detected by any component (e.g., the converter) and be of a short or long term nature, with a warning provided to the end user;
18) Proximity: indicative of proximity of the trailer ball to the jaws and may result in movement of the vehicle to attain proper alignment;
19) Second lock/latch: self-indication;
20) Status: if the is ignition active but the fifth wheel hitch is not engaged, then extend the jack and apply the trailer brakes;
21) Vertical Deceleration: originates from the hitch sensor, jack, TPMS, weight distribution system, or sway controller (and/or other components using accelerometers)
22) Warning: can't take any action;
23) Wear: in response to a wear signal from any other component (particularly those involved in mechanical operations), a warning may be sent to the communications device and/or master control;
24) Wheel Speed: indicative of trailer movement, and may be further indicated by speed data provided from the sway module, on board diagnostics II, GPS, or radar, with the jack extended in the event the fifth wheel is not engaged properly so as to avoid the trailer falling into the vehicle and/or otherwise causing an accident.

The fifth wheel hitch components used in various embodiments of the invention may provide as outputs any of the following conditions:

1) Active/Inactive: by monitoring current or weight/force;
2) Actuate: as indicated by jaw position, a pin indicator, and/or a leg pin;
3) Air Ride: indicative of air pressure;
4) Angle: as indicated by a tilt sensor or angle sensor, for example, to measure head movement;
5) Auto Inflate: air pressure;
6) Brake Intent: sensed braking can be accomplished by strain gage, force gage, or other appropriately selected and positioned sensors;
7) Collision Sensor: collision sensed via decelerometer;
8) Connect/Disconnect: component can determine by sensing jaw position and indicator position;
9) Crash Detection: a force sensor is incorporated in connection with force exceeding predetermined thresholds as being indicative of a crash event;
10) Current Voltage: particularly with respect to motorized units, the output current of the motor is sensed to detect overload, short to ground, etc., and the $V_{bat}$ is sensed and drive disabled if over-range is detected, as well as a notification provided to the communications device;
11) Deceleration/Acceleration: measured as deceleration via an accelerometer;
12) Default: ready to hitch based on jaw position capacity stored in memory of component or as otherwise indicated within the system;
13) Effort: indicative of the date the module was installed and its cumulative time of use (and, possibly, more comprehensive information as to the relative timing of its use and/or other events);
14) Engagement (Mechanical): component can determine by sensing jaw position and indicator position;
15) Faults: not engaged and loose fitting, each as sensed by position and/or proximity sensors;
16) High Pin: load sensor or optical sensor;
17) Level: as indicated by a tilt sensor;
18) Load: as indicated by a camera on the jack, a load sensor (e.g., a load cell), a tilt sensor, and/or sensed current;
19) Location: as indicated by GPS;
20) Lube: the communications device may track scheduled maintenance, date(s) of service, and the like;
21) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
22) Operational Frequency: period of time (e.g., hours) the component was in use as indicated by changes in the angle;
23) Power Loss: sensed using $V_{bat}$, with short/temporary power losses avoiding the complete shutdown of the component, while major/longer term power loss triggers current component parameters to be saved in memory and restored upon the return of power;
24) Pressure: detected using a pressure transducer in an air bag or other similar device;
25) Proximity: relative to other components, particularly for the purpose of coupling, with such action sensed via camera or appropriate proximity sensor(s) (e.g., infrared, ultrasonic, GPS, laser, inductive, and/or capacitive in nature);
26) Second lock/latch: as indicated by the presence of a pin;
27) Status: as engaged and/or connected;
28) Vertical Deceleration: as indicated by an appropriately positioned accelerometer;
29) Warning: overload or short circuit by current sense, locked by sensing travel position, and/or over weight capacity rating by measuring weight;
30) Wear: monitors current, such as a strain gage for monitoring strain on/in the component;

Gooseneck hitches are connection devices well known in the art. These components may be mounted in or under the bed of a pick-up truck or similar consumer vehicle. A hitch ball protrudes upward from the mounting assembly to allow for the connection of the trailer. Additional mechanisms are incorporated to ensure the hitch ball is securely fastened to within its mounting and the assembly has sufficient range of motion to allow the vehicle and trailer to turn. Non-limiting examples of such gooseneck hitches include United States Patent Publication No. 20130277944 U.S. Pat. Nos. 8,286, 986, 8,783,705, and 8,783,706 all of which are incorporated by reference. Moreover, the gooseneck hitch may include safety chain tie down members, such as those disclosed in U.S. Pat. Nos. 8,215,658 and 8,360,458.

Gooseneck components used in various embodiments of the invention may utilize as inputs any of the following conditions:

1) Active/Inactive: if ignition is active and gooseneck is not engaged, then extend jack and apply trailer brakes;
2) Actuate: when vehicle motion is detected (e.g., as evidenced by wheel speed) and fifth wheel hitch is not engaged, then extend the jack;
3) Angle: the angle between the vehicle and the trailer/towed product, as evidenced by the coupler, gooseneck and/or pin box, with verification of the angle sensed communicated to the sway controller and/or other components;
4) Biometrics: identity of the driver/end user can be stored for record keeping/archival purposes, as well as used for safety insurance record access, with the possibility of disabling operation in response thereto;
5) Brake Intent: originates from a master cylinder pressure or pressure/movement sensor on the pedal of the vehicle itself and may be used to compare against actual/sensed deceleration forces;
6) Connect/Disconnect: originates from a converter, breakaway system, or the connections system and request additional action, like extension of the jack;
7) Crash Detection: vehicle movement would prevent disengagement and an automatic connect or disconnect can be based upon vehicle speed (e.g., moving=locked, not moving=open);
8) Current Voltage: originates from the battery voltage and/or current from other components (e.g., trailer brakes, battery, trailer brake controller, converter, jack, etc.) and may be used to detect low battery conditions and/or excessive current;
9) Deceleration/Acceleration: indicative of deceleration, consistent with vehicle movement, as sensed or indicated by any component, resulting in a verification that the fifth wheel hitch is engaged and/or a warning to the communication device and/or master control;
10) Default: default trailer weight as indicated by the communications device (used to assess force on jaw);
11) Engagement (Mechanical): vehicle movement would prevent disengagement and an automatic connect or disconnect can be based upon vehicle speed (e.g., moving=locked, not moving=open);
12) Faults: ignition on and trailer/towed product movement, results in extension of jack(s) if the fifth wheel hitch is not engaged;
13) Image: originates from a camera and may be used to look at alignment of the fifth wheel hitch;
14) Load: indicative of communications device, load sensor, jack, coupler, fifth wheel hitch, gooseneck, hitch/hitch bar, roof-rack, securing systems, and/or ramp, resulting in the trail brake controller output calculations for gain and boot and a signal to apply the brakes and warn the user;
15) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
16) Power Loss: may originate and be detected by any component (e.g., the converter) and be of a short or long term nature, with a warning provided to the end user;
17) Proximity: indicative of proximity of the trailer ball to the jaws and may result in movement of the vehicle to attain proper alignment;
18) Second lock/latch: self-indication;
19) Status: if ignition is active and gooseneck is not engaged, then extend jack and apply trailer brakes;
20) Vertical Deceleration: originates from the hitch sensor, jack, TPMS, weight distribution system, or sway controller (and/or other components using accelerometers)
21) Warning: can't take any action;
22) Wear: in response to a wear signal from any other component (particularly those involved in mechanical operations), a warning may be sent to the communications device and/or master control;
23) Wheel Speed: indicative of trailer movement, and may be further indicated by speed data provided from the sway module, on board diagnostics II, GPS, or radar, with the jack extended in the event the gooseneck is not engaged properly so as to avoid the trailer falling into the vehicle and/or otherwise causing an accident.

Gooseneck components used in various embodiments of the invention may provide as outputs any of the following conditions:

1) Active/Inactive: by monitoring current or weight/force;
2) Actuate: as indicated by the ball position in an up or down orientation and/or by the safety chain hooks;
3) Air Ride: indicative of air pressure;
4) Angle: as indicated by a tilt sensor or angle sensor;
5) Auto Inflate: air pressure;
6) Brake Intent: sensed braking can be accomplished by strain gage, force gage, or other appropriately selected and positioned sensors;
7) Collision Sensor: collision sensed via decelerometer;
8) Connect/Disconnect: component can determine by sensing jaw position and indicator position, with the current in the jaw mechanism motor monitored with increases being indicative of when the pin is positioned correctly;
9) Crash Detection: a force sensor is incorporated in connection with force exceeding predetermined thresholds as being indicative of a crash event;
10) Current Voltage: the output current is sensed to detect overload, short to ground, etc., and the $V_{bat}$ is sensed and drive disabled if over-range is detected, as well as a notification provided to the communications device;
11) Deceleration/Acceleration: measured as deceleration via an accelerometer;
12) Default: ready to hitch position capacity stored in memory of component or as otherwise indicated within the system;
13) Effort: indicative of the date the module was installed and its cumulative time of use (and, possibly, more comprehensive information as to the relative timing of its use and/or other events);
14) Engagement (Mechanical): component can determine by sensing jaw position and indicator position, with the current in the jaw mechanism motor monitored with increases being indicative of when the pin is positioned correctly;
15) Faults: not engaged and loose fitting, each as sensed by position and/or proximity sensors;
16) Level: as indicated by a tilt sensor;
17) Load: as indicated by a camera on the jack, a load sensor (e.g., a load cell), a tilt sensor, and/or sensed current;
18) Location: as indicated by GPS;
19) Lube: the communications device may track scheduled maintenance, date(s) of service, and the like;
20) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
21) Operational Frequency: period of time (e.g., hours) the component was in use as indicated by changes in the angle;
22) Power Loss: sensed using $V_{bat}$, with short/temporary power losses avoiding the complete shutdown of the component, while major/longer term power loss triggers current component parameters to be saved in memory and restored upon the return of power;
23) Proximity: relative to other components, particularly for the purpose of coupling, with such action sensed via camera or appropriate proximity sensor(s) (e.g., infrared, ultrasonic, GPS, laser, inductive, and/or capacitive in nature);
24) Second lock/latch: as indicated by the presence of a pin;
25) Status: as engaged and/or connected;
26) Vertical Deceleration: as indicated by an appropriately positioned accelerometer;
27) Warning: overload or short circuit by current sense, locked by sensing travel position, and/or over weight capacity rating by measuring weight;
28) Wear: monitors current, such as a strain gage for monitoring strain on/in the component;

Pin boxes fix the kingpin at a certain location and angle in relationship to connection device such as a fifth wheel hitch. The pin box usually has a box frame made from flat steel plates to accommodate heavy loads, while one or more air bags, shocks, or other movement-dampening mechanisms positioned within the box frame to help minimize jostling and unwanted movement between the connection device/vehicle and the towed apparatus/trailer. Non-limiting examples of such pin boxes include United States Patent Publication No. 20130175786 and U.S. Pat. Nos. 7,530,591, 7,997,608, 7,712,761, and 8,100,427 all of which are incorporated by reference.

Pin box components used in various embodiments of the invention may utilize as inputs any of the following conditions:
1) Active/Inactive: if ignition is active and pin box is not engaged, then extend jack and apply trailer brakes;
2) Actuate: when vehicle motion is detected (e.g., as evidenced by wheel speed) and fifth wheel hitch is not engaged, then extend the jack;
3) Air Ride: in response to a signal for air pressure, a compressor or similar device is instructed to provide more air;
4) Angle: the angle between the vehicle and the trailer/towed product, as evidenced by the coupler, gooseneck and/or pin box, with verification of the angle sensed communicated to the sway controller and/or other components;
5) Biometrics: identity of the driver/end user can be stored for record keeping/archival purposes, as well as used for safety insurance record access, with the possibility of disabling operation in response thereto;
6) Connect/Disconnect: originates from a converter, breakaway system, or the connections system and request additional action, like extension of the jack;
7) Current Voltage: originates from the battery voltage and/or current from other components (e.g., trailer brakes, battery, trailer brake controller, converter, jack, etc.) and may be used to detect low battery conditions and/or excessive current;
8) Deceleration/Acceleration: indicative of deceleration, consistent with vehicle movement, as sensed or indicated by any component, resulting in a verification that the fifth wheel hitch is engaged and/or a warning to the communication device and/or master control;
9) Default: default trailer weight from communications device (used to assess force on jaw);
10) Engagement (Mechanical): converter and TBC can detect trailer self-connection (to the vehicle), with self-detection also possible;
11) Faults: ignition on and trailer/towed product movement, results in extension of jack(s) if the fifth wheel hitch is not engaged;
12) High Pin: origination point for high pin information/sensed data;
13) Load: indicative of communications device, load sensor, jack, coupler, fifth wheel hitch, gooseneck, hitch/hitch bar, roof-rack, securing systems, and/or ramp, resulting in the trail brake controller output calculations for gain and boot and a signal to apply the brakes and warn the user;
14) Lube: the communications device may track scheduled maintenance, date(s) of service, and the like;
15) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
16) Power Loss: may originate and be detected by any component (e.g., the converter) and be of a short or long term nature, with a warning provided to the end user;
17) Proximity: indicative of proximity of the trailer ball to the jaws and may result in movement of the vehicle to attain proper alignment;
18) Second lock/latch: as indicated by fifth wheel or gooseneck with the jack remaining extended until the pin is inserted;
19) Status: if ignition is active and pin box is not engaged, then extend jack and apply trailer brakes;
20) Warning: can't take any action;
21) Wear: in response to a wear signal from any other component (particularly those involved in mechanical operations), a warning may be sent to the communications device and/or master control;
22) Wheel Speed: indicative of trailer movement, and may be further indicated by speed data provided from the sway module, on board diagnostics II, GPS, or radar, with the jack extended in the event the gooseneck is not engaged properly so as to avoid the trailer falling into the vehicle and/or otherwise causing an accident.

Pin box components used in various embodiments of the invention may provide as outputs any of the following conditions:

1) Active/Inactive: by monitoring current or weight/force;
2) Actuate: as indicated by latch mechanism and/or angle of the pin box relative to the trailer/towed product;
3) Air Ride: indicative of air pressure;
4) Angle: as indicated by a tilt sensor or angle sensor, for example, to measure head movement;
5) Auto Inflate: air pressure;
6) Brake Intent: sensed braking can be accomplished by strain gage, force gage, or other appropriately selected and positioned sensors;
7) Collision Sensor: collision sensed via decelerometer;
8) Connect/Disconnect: component can determine by sensing jaw position and indicator position, with the current in the jaw mechanism motor monitored with increases being indicative of when the pin is positioned correctly;
9) Crash Detection: a force sensor is incorporated in connection with force exceeding predetermined thresholds as being indicative of a crash event;
10) Current Voltage: the output current is sensed to detect overload, short to ground, etc., and the $V_{bat}$ is sensed and drive disabled if over-range is detected, as well as a notification provided to the communications device;
11) Deceleration/Acceleration: measured as deceleration via an accelerometer;
12) Default: ready to hitch position;
13) Effort: indicative of the date the module was installed and its cumulative time of use (and, possibly, more comprehensive information as to the relative timing of its use and/or other events);
14) Engagement (Mechanical): component can determine by sensing jaw position and indicator position, with the current in the jaw mechanism motor monitored with increases being indicative of when the pin is positioned correctly;
15) Faults: not engaged and loose fitting, each as sensed by position and/or proximity sensors;
16) Heat: as indicated by thermistor and electronics;
17) High Pin: load sensor or optical sensor;
18) Level: as indicated by a tilt sensor;
19) Load: as indicated by a camera on the jack, a load sensor (e.g., a load cell), a tilt sensor, and/or sensed current;
20) Location: as indicated by GPS;
21) Lube: the communications device may track scheduled maintenance, date(s) of service, and the like;
22) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
23) Operational Frequency: period of time (e.g., hours) the component was in use as indicated by changes in the angle;
24) Power Loss: sensed using $V_{bat}$, with short/temporary power losses avoiding the complete shutdown of the component, while major/longer term power loss triggers current component parameters to be saved in memory and restored upon the return of power;
25) Proximity: relative to other components, particularly for the purpose of coupling, with such action sensed via camera or appropriate proximity sensor(s) (e.g., infrared, ultrasonic, GPS, laser, inductive, and/or capacitive in nature);
26) Status: as engaged and/or connected;
27) Vertical Deceleration: as indicated by an appropriately positioned accelerometer;
28) Warning: overload or short circuit by current sense, locked by sensing travel position, and/or over weight capacity rating by measuring weight;
29) Wear: monitors current, such as a strain gage for monitoring strain on/in the component;

The coupler or coupling system is a mechanism that is fixed (e.g., welded or bolted) onto the end of trailer connection (i.e., the trailer tongue), allowing it to be secured over and pivot about a hitch ball. Examples of known couplers include straight channel, foldaway, round or adjustable tongue, flat mount, A-frame, and other similar types. The coupler has a latching mechanism to grip and hold the hitch ball, usually by way of a trigger, thumb, wrap-around yoke, pin fastener, or other similar mechanisms. Non-limiting examples of such couplers include U.S. Pat. Nos. 7,871,098, and 8,083,250 all of which are incorporated by reference.

Coupler components used in various embodiments of the invention may utilize as inputs any of the following conditions:

1) Active/Inactive: if ignition is active and coupler is not engaged, then extend jack and apply trailer brakes;
2) Actuate: when vehicle motion is detected (e.g., as evidenced by wheel speed) and fifth wheel hitch is not engaged, then extend the jack;
3) Biometrics: identity of the driver/end user can be stored for record keeping/archival purposes, as well as used for safety insurance record access, with the possibility of disabling operation in response thereto;
4) Connect/Disconnect: originates from a converter, breakaway system, or the connections system and request additional action, like extension of the jack;
5) Crash Detection: vehicle movement would prevent disengagement and an automatic connect or disconnect can be based upon vehicle speed (e.g., moving=locked, not moving=open);
6) Current Voltage: originates from the battery voltage and/or current from other components (e.g., trailer brakes, battery, trailer brake controller, converter, jack, etc.) and may be used to detect low battery conditions and/or excessive current;
7) Deceleration/Acceleration: indicative of deceleration, consistent with vehicle movement, as sensed or indicated by any component, resulting in a verification that the fifth wheel hitch is engaged and/or a warning to the communication device and/or master control;
8) Default: default trailer weight from communications device (used to assess force on jaw);
9) Engagement (Mechanical): when hitch bar is engaged in the hitch, a signal is sent to the communications device and/or the trailer brake controller;
10) Faults: ignition on and trailer/towed product movement, results in extension of jack(s) if the fifth wheel hitch is not engaged;
11) Image: originates from a camera and may be used to look at alignment of the fifth wheel hitch;
12) Level: indicative of the level of the hitch, with a signal sent to adjust the weight distribution system accordingly;
13) Load: indicative of communications device, load sensor, jack, fifth wheel hitch, gooseneck, hitch/hitch bar, roof rack, securing systems, and/or ramp, resulting in a signal to the communications device to apply the brakes and warn the user;
14) Lube: the communications device may track scheduled maintenance, date(s) of service, and the like;
15) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
16) Power Loss: may originate and be detected by any component (e.g., the converter) and be of a short or long term nature, with a warning provided to the end user;
17) Proximity: indicative of proximity of the trailer ball to the jaws and may result in movement of the vehicle to attain proper alignment;
18) Second lock/latch: as indicated by fifth wheel or gooseneck with the jack remaining extended until the pin is inserted;
19) Status: if ignition is active and coupler is not engaged, then extend jack and apply trailer brakes;
20) Vertical Deceleration: originates from the hitch sensor, jack, TPMS, weight distribution system, or sway controller (and/or other components using accelerometers)
21) Warning: can't take any action;
22) Wear: in response to a wear signal from any other component (particularly those involved in mechanical operations), a warning may be sent to the communications device and/or master control;
23) Wheel Speed: indicative of trailer movement, and may be further indicated by speed data provided from the sway module, on board diagnostics II, GPS, or radar, with the jack extended in the event the gooseneck is not engaged properly so as to avoid the trailer falling into the vehicle and/or otherwise causing an accident.

Coupler components used in various embodiments of the invention may provide as outputs any of the following conditions:
1) Active/Inactive: by monitoring current or weight/force;
2) Actuate: as indicated by engagement lever, angle with respect to hitch ball, and/or relative force fore and aft (relative to the vehicle orientation) of the coupler component to measure braking and acceleration events;
3) Angle: as indicated by a tilt sensor or angle sensor, for example, to measure head movement;
4) Brake Intent: sensed braking can be accomplished by strain gage, force gage, or other appropriately selected and positioned sensors;
5) Collision Sensor: collision sensed via decelerometer;
6) Connect/Disconnect: component can determine by sensing jaw position and indicator position, with the current in the jaw mechanism motor monitored with increases being indicative of when the pin is positioned correctly;
7) Crash Detection: a force sensor is incorporated in connection with force exceeding predetermined thresholds as being indicative of a crash event;
8) Current Voltage: the output current is sensed to detect overload, short to ground, etc., and unexpected current is compared to setup parameters or other stored or comparative information, and then the $V_{bat}$ is sensed and drive disabled if over-range is detected, as well as a notification provided to the communications device;
9) Deceleration/Acceleration: measured as deceleration via an accelerometer;
10) Default: ready to hitch based on lever position with ready to receive capacity stored in memory of component or as otherwise indicated within the system;
11) Effort: indicative of the date the module was installed and its cumulative time of use (and, possibly, more comprehensive information as to the relative timing of its use and/or other events);
12) Engagement (Mechanical): component can determine by sensing jaw position and indicator position, with the current in the jaw mechanism motor monitored with increases being indicative of when the pin is positioned correctly;
13) Faults: not engaged and loose fitting, each as sensed by position and/or proximity sensors;
14) Level: as indicated by a tilt sensor;
15) Load: as indicated by a camera on the jack, a load sensor (e.g., a load cell), a tilt sensor, and/or sensed current;
16) Location: as indicated by GPS;
17) Lube: the communications device may track scheduled maintenance, date(s) of service, and the like;
18) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
19) Operational Frequency: period of time (e.g., hours) the component was in use as indicated by changes in the angle;
20) Power Loss: sensed using $V_{bat}$, with short/temporary power losses avoiding the complete shutdown of the component, while major/longer term power loss triggers current component parameters to be saved in memory and restored upon the return of power;
21) Proximity: relative to other components, particularly for the purpose of coupling, with such action sensed via camera or appropriate proximity sensor(s) (e.g., infrared, ultrasonic, GPS, laser, inductive, and/or capacitive in nature);
22) Second lock/latch: as indicated by the presence of a pin;
23) Status: as engaged and/or connected;
24) Vertical Deceleration: as indicated by an appropriately positioned accelerometer;
25) Warning: overload or short circuit by current sense, locked by sensing travel position, and/or over weight capacity rating by measuring weight;
26) Wear: monitors current, such as a strain gage for monitoring strain on/in the component;

Weight distribution systems fits over or onto a connection device and helps to balance the load more evenly. Such systems are coupled at opposing ends to the vehicle (e.g., via a hitch receiver) and the towed apparatus. They include a head assembly that connects to the vehicle, as well as a plurality of spring bars extending out from that assembly. The spring bars are connected to the trailer (e.g., via chains) at their opposing end, so as to create tension that distributes the tongue weight more evenly. Non-limiting examples are disclosed in the following United States Patents, all of which are incorporated by reference herein: U.S. Pat. Nos. 5,868,414; 7,029,020; and 8,186,702.

Weight distribution components used in various embodiments of the invention may utilize as inputs any of the following conditions:

1) Active/Inactive: if ignition is not active, the component may be placed in sleep mode;
2) Actuate: until vehicle and/or trailer movement is sensed (e.g. via wheel speed), component can be placed in sleep mode;
3) Angle: indicative of the angle between the vehicle and trailer as sensed by any of the connection devices, with verification of the angle and adjustment of the weight distribution system as appropriate;
4) Biometrics: identity of the driver/end user can be stored for record keeping/archival purposes, as well as used for safety insurance record access, with the possibility of disabling operation in response thereto;
5) Deceleration/Acceleration: indicative of deceleration, consistent with vehicle movement, as sensed or indicated by any component, resulting in a verification that the fifth wheel hitch is engaged and/or a warning to the communication device and/or master control;
6) Engagement (Mechanical): Converter and TBC can detect trailer connection to the truck;
7) Faults: any faults associated with the trailer brake controller, jacks, fifth wheel hitch, coupler, hitch device, battery, camera, and/or brake unit;
8) Heat: preferably indicative of only internal heat;
9) Lane Change: when detected, verify the appropriate adjustments to the weight distribution system;
10) Level: indicative of the level at the hitch and/or coupler, with adjustment of the weight distribution system accordingly;
11) Load: indicative of communications device, load sensor, jack, coupler, fifth wheel hitch, gooseneck, hitch/hitch bar, roof rack, securing systems, and/or ramp, resulting in a signal to the communications device to apply the brakes and warn the user;
12) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
13) Second lock/latch: as indicated by fifth wheel or gooseneck with the jack remaining extended until the pin is inserted;
14) Status if ignition is not active, the component may be placed in sleep mode;
15) Warning: can't take any action;
16) Wear: in response to a wear signal from any other component (particularly those involved in mechanical operations), a warning may be sent to the communications device and/or master control;

Weight distribution components used in various embodiments of the invention may provide as outputs any of the following conditions:
1) Active/Inactive: by monitoring current or weight/force;
2) Angle/articulation: as indicated by a tilt sensor or angle sensor;
3) Connect/Disconnect: component can determine by resistive and/or inductive testing;
4) Current Voltage: the output current is sensed to detect overload, short to ground, etc., and the $V_{bat}$ is sensed and drive disabled if over-range is detected, as well as a notification provided to the communications device;
5) Default: system present;
6) Effort: indicative of the date the module was installed and its cumulative time of use (and, possibly, more comprehensive information as to the relative timing of its use and/or other events);
7) Engagement (Mechanical): sensed by proximity sensor and current;
8) Faults: not engaged and loose fitting, each as sensed by position and/or proximity sensors;
9) Heat: as indicated by thermistor and electronics;
10) Level: as indicated by a tilt sensor;
11) Load: as sensed using an appropriately positioned strain gage, load cell, or deflection sensor;
12) Location: as indicated by GPS;
13) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
29) Operational Frequency: period of time (e.g., hours) the component was in use as indicated by motion;
30) Power Loss: sensed using $V_{bat}$, with short/temporary power losses avoiding the complete shutdown of the component, while major/longer term power loss triggers current component parameters to be saved in memory and restored upon the return of power;
31) Proximity: relative to other components, particularly for the purpose of coupling, with such action sensed via camera or appropriate proximity sensor(s) (e.g., infrared, ultrasonic, GPS, laser, inductive, and/or capacitive in nature);
32) Second lock/latch: position sensor detects actuation to secure the component;
33) Status: as engaged and/or connected;
34) Vertical Deceleration: as indicated by an appropriately positioned accelerometer;
35) Warning: too heavy trailer and/or improper weight distribution;
36) Wear: monitors current, such as a strain gage for monitoring strain on/in the component;
37) Wheel Speed: as measured using an appropriate sensor, such as a hall sensor, or as may be provided by the controller area network.

Hitches are devices attached to the chassis or frame of a vehicle to allow additional devices to be employed. Hitches usually include a centrally located, hollow, tubular receiver that serves as a connection point for other apparatus, usually via a standard sized hitch pin and clip assembly. The receiver box is integrally attached to additional structure (usually comprising at least one transverse beam, with option mounting brackets attached to or integrally formed on that beam). These beams/brackets are then secured to the vehicle chassis/frame. Hitches may be classified according to standard categories based upon the size of the receiver box opening, the gross trailer weight, and the tongue weight capacity of the hitch. Hitches, however, may also include coupling devices, such as depicted in U.S. Pat. No. 9,150,068, which is hereby incorporated by reference.

Hitch components used in various embodiments of the invention may utilize as inputs any of the following conditions:
1) Active/Inactive: if ignition is active and ball on hitch bar is not engaged to the coupler, then the jacks will extend and the trailer brakes will be applied;
2) Actuate: until vehicle and/or trailer movement is sensed (e.g. via wheel speed), component can be placed in sleep mode;
3) Biometrics: identity of the driver/end user can be stored for record keeping/archival purposes, as well as used for safety insurance record access, with the possibility of disabling operation in response thereto;

4) Brake Intent: originates from a master cylinder pressure or pressure/movement sensor on the pedal of the vehicle itself and may be used to compare against actual/sensed deceleration forces;

5) Connect/Disconnect: originates from a converter, breakaway system, or the connections system and request additional action, like extension of the jack;

6) Current Voltage: originates from the battery voltage and/or current from other components (e.g., trailer brakes, battery, trailer brake controller, converter, jack, etc.) and may be used to detect low battery conditions and/or excessive current;

7) Engagement (Mechanical): self-input and/or originating from a separate lock-pin lock arrangement;

8) Faults: ignition on and trailer/towed product movement, results in extension of jack(s) if the fifth wheel hitch is not engaged;

9) Heat: preferably indicative of only internal heat;

10) Level: indicative of the level at the hitch and/or coupler, with adjustment of the weight distribution system accordingly;

11) Load: indicative of communications device, load sensor, jack, coupler, fifth wheel hitch, gooseneck, roof rack, securing systems, and/or ramp, resulting in a signal to the communications device to apply the brakes and warn the user;

12) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;

13) Power Loss: may originate and be detected by any component (e.g., the converter) and be of a short or long term nature, with a warning provided to the end user;

14) Second lock/latch: as indicated by fifth wheel or gooseneck with the jack remaining extended until the pin is inserted;

15) Status: if ignition is active and ball on hitch bar is not engaged to the coupler, then the jacks will extend and the trailer brakes will be applied;

16) Warning: can't take any action;

17) Wear: in response to a wear signal from any other component (particularly those involved in mechanical operations), a warning may be sent to the communications device and/or master control;

18) Wheel Speed: indicative of trailer movement, and may be further indicated by speed data provided from the sway module, on board diagnostics II, GPS, or radar, with the transfer function of the brake output will have the speed in the equation (because the efficiency of the brakes is a function of speed) and the sensor at the hitch is assumed to be the input for calculating the brake output.

Hitch components used in various embodiments of the invention may provide as outputs any of the following conditions:

1) Active/Inactive: by monitoring current or weight/force;

2) Actuate: oblong hole in the hitch may measure force fore and aft of the hitch bar connection (relative to vehicle orientation) to sense braking and acceleration;

3) Brake Intent: sensed braking can be accomplished by strain gage, force gage, or other appropriately selected and positioned sensors;

4) Connect/Disconnect: component can determine hitch bar insertion into the hitch via a sensor at the back of the hitch bar and a separate sensor to sense when the pin is inserted;

5) Crash Detection: a force sensor is incorporated in connection with force exceeding predetermined thresholds as being indicative of a crash event;

6) Current Voltage: the output current is sensed to detect overload, short to ground, etc., and the $V_{bat}$ is sensed and drive disabled if over-range is detected, as well as a notification provided to the communications device;

7) Deceleration/Acceleration: measured as deceleration via an accelerometer;

8) Default: ready to receive hitch bar based sensed presence of pin inserted capacity stored in memory of component or as otherwise indicated within the system;

9) Engagement (Mechanical): component can determine hitch bar insertion into the hitch via a sensor at the back of the hitch bar and a separate sensor to sense when the pin is inserted;

10) Faults: not engaged and loose fitting, each as sensed by position and/or proximity sensors;

11) Level: as indicated by a tilt sensor;

12) Load: as indicated by a camera on the jack, a load sensor (e.g., a load cell), a tilt sensor, a sensed current, and/or an oblong hole and sensor fore and aft therein;

13) Location: as indicated by GPS;

14) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);

15) Operational Frequency: period of time (e.g., hours) the component was in use;

16) Power Loss: sensed using $V_{bat}$, with short/temporary power losses avoiding the complete shutdown of the component, while major/longer term power loss triggers current component parameters to be saved in memory and restored upon the return of power;

17) Proximity: relative to other components, particularly for the purpose of coupling, with such action sensed via camera or appropriate proximity sensor(s) (e.g., infrared, ultrasonic, GPS, laser, inductive, and/or capacitive in nature);

18) Status: as engaged and/or connected;

19) Vertical Deceleration: as indicated by an appropriately positioned accelerometer;

20) Warning: locked by sensing travel position;

21) Wear: monitors current, such as a strain gage for monitoring strain on/in the component;

22) Wheel Speed: as measured using an appropriate sensor, such as a hall sensor, or as may be provided by the controller area network.

Hitches bars, also referred to as draw bars, are connected to the hitch component and allow for additional clearance between the vehicle and trailer or towed product. In their most basic form, a hitch bar is simply a tubular member sized to fit/connect to a standard sized receiver box on one end and having a separate receiver box formed on its opposing end (this opposing receiver box need not be the same as the one that is located on the hitch itself). Hitch bars may be straight or curved, so as to allow for a change in the relative height of the connection point with the trailer itself.

Hitch bar components used in various embodiments of the invention may utilize as inputs any of the following conditions:

1) Active/Inactive: if ignition is active and ball on hitch bar is not engaged to the coupler, then the jacks will extend and the trailer brakes will be applied;
2) Biometrics: identity of the driver/end user can be stored for record keeping/archival purposes, as well as used for safety insurance record access, with the possibility of disabling operation in response thereto;
3) Brake Intent: originates from a master cylinder pressure or pressure/movement sensor on the pedal of the vehicle itself and may be used to compare against actual/sensed deceleration forces;
4) Connect/Disconnect: originates from a converter, breakaway system, or the connections system and request additional action, like extension of the jack;
5) Engagement (Mechanical): presence of pin to hitch and connectivity of additional components/accessories (e.g., hitch bar, pintle, tow hooks, tri-ball, etc.);
6) Faults: ignition on and trailer/towed product movement, results in extension of jack(s) if the fifth wheel hitch is not engaged;
7) Heat: preferably indicative of only internal heat;
8) Load: indicative of communications device, load sensor, jack, coupler, fifth wheel hitch, gooseneck, roofrack, securing systems, and/or ramp, resulting in a signal to the communications device to apply the brakes and warn the user;
9) Noise: indicative of rough road, wearing of a device and/or a loose mechanical connection, possibly as measured by a microphone (for audible) and/or an analog to digital converter (ADC) camera (for electrical), with the accelerometer inputs interpreted accordingly and warning indications provided to the user with respect to premature wear;
10) Proximity: indicative of proximity of the trailer ball to the jaws and may result in movement of the vehicle to attain proper alignment;
11) Second lock/latch: as indicated by fifth wheel or gooseneck with the jack remaining extended until the pin is inserted;
12) Status: if ignition is active and ball on hitch bar is not engaged to the coupler, then the jacks will extend and the trailer brakes will be applied;
13) Warning: can't take any action;
14) Wear: in response to a wear signal from any other component (particularly those involved in mechanical operations), a warning may be sent to the communications device and/or master control;
15) Wheel Speed: indicative of trailer movement, and may be further indicated by speed data provided from the sway module, on board diagnostics II, GPS, or radar, with the transfer function of the brake output will have the speed in the equation (because the efficiency of the brakes is a function of speed) and the sensor at the hitch is assumed to be the input for calculating the brake output.

Hitch bar components used in various embodiments of the invention may provide as outputs any of the following conditions:

1) Active/Inactive: by monitoring current or weight/force;
2) Actuate: oblong hole in the hitch may measure force fore and aft of the hitch bar connection (relative to vehicle orientation) to sense braking and acceleration;
3) Angle/articulation: as indicated by a tilt sensor or angle sensor;
4) Brake Intent: sensed braking can be accomplished by strain gage, force gage, or other appropriately selected and positioned sensors;
5) Collision Sensor: collision sensed via decelerometer;
6) Connect/Disconnect: component can determine trailer connection by sensing the coupler positioning, with the current in the coupler mechanism motor monitored with increases being indicative of when the hitch ball is positioned correctly;
7) Crash Detection: a force sensor is incorporated in connection with force exceeding predetermined thresholds as being indicative of a crash event;
8) Current Voltage: the output current is sensed to detect overload, short to ground, etc., and the $V_{bat}$ is sensed and drive disabled if over-range is detected, as well as a notification provided to the communications device;
9) Deceleration/Acceleration: measured as deceleration via an accelerometer;
10) Default: ready to hitch position capacity stored in memory of component or as otherwise indicated within the system;
11) Effort: indicative of the date the module was installed and its cumulative time of use (and, possibly, more comprehensive information as to the relative timing of its use and/or other events);
12) Engagement (Mechanical): component can determine trailer connection by sensing the coupler positioning, with the current in the coupler mechanism motor monitored with increases being indicative of when the hitch ball is positioned correctly;
13) Faults: pin not inserted and too much trailer weight, each as may be measured by proximity and/or force sensors;
14) Heat: as indicated by thermistor and electronics;
15) Level: as indicated by a tilt sensor;
16) Load: as indicated by a camera on the jack, a load sensor (e.g., a load cell), a tilt sensor, a sensed current, and/or an oblong hole and sensor fore and aft therein;
17) Location: as indicated by GPS;
18) Lube: the communications device may track scheduled maintenance, date(s) of service, and the like;
19) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
23) Operational Frequency: period of time (e.g., hours) the component was in use;
24) Power Loss: sensed using $V_{bat}$, with short/temporary power losses avoiding the complete shutdown of the component, while major/longer term power loss triggers current component parameters to be saved in memory and restored upon the return of power;
25) Proximity: relative to other components, particularly for the purpose of coupling, with such action sensed via camera or appropriate proximity sensor(s) (e.g., infrared, ultrasonic, GPS, laser, inductive, and/or capacitive in nature);
26) Second lock/latch: indicative of presence of a pin (e.g., a cotter pin);
27) Status: as engaged and/or connected;
28) Vertical Deceleration: as indicated by an appropriately positioned accelerometer;
29) Warning: locked by sensing travel position;
30) Wear: monitors current, such as a strain gage for monitoring strain on/in the component;

31) Wheel Speed: as measured using an appropriate sensor, such as a hall sensor, or as may be provided by the controller area network.

Accessory Systems

Jacks and jacking systems constitute accessories most commonly associated with a trailer or towed product, especially proximate to the trailer tongue. These products help to stabilize the towed product, generally by extending one or more members to engage an object not associated with the vehicle and to more fully support the weight of the trailer. Jack assemblies operate according to a wide variety of principles (e.g., screw type, etc.), and they may be deployed and controlled manually or a part of a partially or fully automated system. Non-limiting examples of such systems are disclosed in the following United States Patent Nos., all of which are incorporated by reference herein: U.S. Pat. Nos. RE43535; 6,874,764; 7,325,786; 7,407,151; 8,181, 983; 8,348,241; 8,523,148; and 8,910,924. Additional examples, also incorporated herein, may be found in United States Patent Publication Nos. 2014/0246637; 2014/0367626; and 2015/0158464.

Within the various accessory systems of the invention, the jack may utilize as inputs any of the following conditions:

1) Active/Inactive: an active ignition input in combination with a positive connectivity status may result in retraction of the jack;
2) Actuate: when motion is detected in either the vehicle or trailer (e.g., by way of wheel speed) but there is no electrical connection, the jack may be extended;
3) Air Ride: based upon the pin box, the jack may be forced to remain extended at least until the air ride is repaired;
4) Angle/articulation: based upon weight distribution, the jack may be extended and/or retracted;
5) Auto Dimming: dimming signal from other components and/or the on-board diagnostics or controller area network bus, so as to modulate the intensity of the light on the jack itself;
6) Auto Inflate: based upon the TPMS, air cushion and trailer weight, check if trailer weight is too high to cause tire deflation;
7) Biometrics: based on the camera and/or communications device, the user identity can be confirmed;
8) Collision Sensor: in response to connection systems, the camera, the GPS, and/or radar, the jack may be extended;
9) Connect/Disconnect: based on the electronics components (e.g., trailer brake controller, converter, breakaway system, etc.) and/or connection devices (e.g., fifth wheel, hitch bar, coupler, gooseneck, pin box, etc.), the jack may be extended;
10) Current Voltage: the battery voltage/current and current provided from any of the other components (e.g., trailer brake controller, trailer brakes, converter, battery, etc.) may be used to detect low battery or excessive current situations;
11) Default: originates from communication device after calculations based on trailer weight and/or other parameters, with a verification and report to other components regarding any discrepancies;
12) Engagement (mechanical): indicative of engagement of other connection devices (e.g., pin box, fifth wheel hitch, etc.);
13) Faults: shorted magnet or misconnection of the trailer may extend the jack to prevent potential operation of the vehicle;
14) Heat: based on the converter, brake controller, and/or other components and, being indicative of ambient temperature when those devices are inactive, higher temperatures (relative to high ambient temperatures) indicative of use of those components may be sensed;
15) High Pin: based on the converter, breakaway system, and/or connection devices or based on input from the communications device or master control, the jack may remain extended;
16) Image: based on the camera, connection between the trailer and vehicle or engagement of spring bars or other components associated with the trailer may be determined;
17) Level: based upon the connection devices and/or sway controller, one or more jacks may be extended or retracted, with the use of a plurality of jacks further enabling leveling action within a geometric plane (e.g., a series of jacks may be independently deployed at the four corners of the trailer to allow for coordinated leveling action by the present system);
18) Load: based on the communications device, connection devices, roof rack, securing system, ramp, and/or a load sensor, an appropriate communication can be provided to the brake controller and/or control system and/or automatic spring bar engagement may be initiated;
19) Lube: based on the communications device or information storage/memory device, a predetermined schedule can be arranged;
20) Power Loss: based on a temporary or long term power loss detected by any other component may result in a warning signal provided to the end user;
21) Pressure: based upon the TPMS, air cushion and trailer weight, check if trailer weight is too high to cause tire deflation;
22) Proximity: proximity to the coupler or other connection device may be established via a proximity sensor, with the jack being moved via wheels to align to the correct position for engagement;
23) Second lock/latch: based on any appropriate connection device, the jack would stay extended until a pin or similar mechanism/device is positioned appropriately;
24) Status: based on ignition variable from on board diagnostics and/or "ready to tow" and "no connection made" variables from connection devices or camera, the jack may be extended;
25) Warning: an appropriate warning from the connection device may result in extension of the jack;
26) Wear: if any of the connection devices indicate wear, a warning may be generated by way of the brake controller;
27) Wheel Speed: indicative of whether the trailer is moving, based upon information from the sway module, on board diagnostics, GPS, and/or radar, with the jacks being retracted.

The jack may provide as outputs any of the following conditions:

1) Active/Inactive: by monitoring the current or pressure;
2) Actuate: indicative of travel position;
3) Angle: by way of an angle, tilt, or travel position sensor;
4) Connect/Disconnect: sensed by measuring current;
5) Current Voltage: faults sensed by measuring current and/or low or high voltage sensed by measuring voltage;
6) Default: retract, extend, or travel positions may be stored in information storage/memory devices;

7) Effort: current or pressure sense;
8) Engagement (Mechanical): established by a camera associated with the jack, a load sensor (e.g., load cell, hydraulic sensor, tilt sensor, etc.), or current sensing;
9) Faults: shorted motor, overload, and/or open load as determined by sensed current;
10) Heat: via a thermistor or thermocouple may monitor the temperature of the motor;
11) Level: via a tilt sensor on the jack;
12) Load: established by a camera associated with the jack, a load sensor (e.g., load cell, hydraulic sensor, tilt sensor, etc.);
13) Location: established by GPS;
14) Lube: the communications device tracks scheduled maintenance, as well as the date and other information with respect to actual services performed;
15) Noise: electrical (i.e., current) or audible;
16) Operational Frequency: tracks the number and other information associated with extension, retraction, or other operation of the jack;
17) Power Loss: reports a temporary loss of power;
18) Pressure: hydraulic pressure is determined via an appropriate pressure sensor;
19) Proximity: location and proximity to other devices for the purpose of coupling may be sensed via a camera or other proximity sensor/scheme (e.g., infrared, ultrasonic, or laser-based sensors; GPS; inductive or capacitive methods; etc.);
20) Second lock/latch: foot locked into extension;
21) Status: with respect to electric or hydraulic operation;
22) Vertical Deceleration: by way of an accelerometer;
23) Warning: may include overload or short circuit by current sense, locked by sensing the normal travel position, and/or over weight capacity rating by measuring the weight;
24) Wear: by monitoring current or pressure.

Cargo carriers may take the form of platforms, cargo baskets, hinged boxes, or cargo racks (e.g., bike, kayak, ski, snowboard, and the like) which attach to the receiver hitch or roof rails of a vehicle. Such carriers can accommodate additional luggage and cargo, in addition to potentially serving as a stepping platform to allow easier access to the roof of the vehicle (and/or items attached to it). In all embodiments, the cargo is carried on a generally flat, planar surface. In preferred embodiments, the platform has rectangular or other similar shape with its longest length in the transverse direction (relative to movement of the vehicle) to minimize the impact on vehicle profile/length while maximizing the cargo area. Rails or an enclosure, preferably provided with a lockable and/or hinged lid, may define the cargo carrying area along its periphery. Additionally or alternatively, straps, fasteners, or other similar apparatus may be integrated in or proximate to the platform, rails, and/or box to ensure the cargo remains on/in the carrier. If the carrier is rooftop mounted, mechanisms (e.g., closable jaws, C- or J-shaped hooks, etc.) may be provided along its underside to engage and be secured to roof-mounted rails or other attachment points on the vehicle. In hitch mount iterations, a tubular member attaches to and extends out from one side of the platform to serve as a connection point with a hitch, hitch bar, or other similar connection device located on the vehicle or towed product itself. Cargo carriers may also include designs that are specific to a particular purpose, such as carrying bicycles, in which case modifications to the size, shape, and functionality of the platform will be apparent (e.g., rather than having a flat, planar platform, a bicycle carrier may include a platform comprising only of wheel mounts or an upright bar with a horizontal attachment members secured to the frame of the bicycle(s)).

The cargo carrier may utilize as inputs any of the following conditions:
1) Active/Inactive: based on active ignition but component is not fastened/secured, then the jack will be extended and the trailer brakes applied;
2) Biometrics: the identity of the driver/end user may be stored for archival purposes and may be used for safety insurance record access;
3) Engagement (Mechanical): indicative of use;
4) Faults: rough road indication and/or high speed from trailer brake controller or other components results in tightening of straps/fasteners;
5) Status: ignition active and component not fastened/secured results in extension of jack and application of trailer brakes;
6) Warning: cannot take any action; may use GPS or biometric information to lock (e.g., trailer brake controller indicates an unauthorized user, resulting in locking of the carrier).

The cargo carrier may provide as outputs any of the following conditions:
1) Active/Inactive: by monitoring current or weight/force;
2) Actuate: motion/movement relative to the location of the component (e.g., the roof of the vehicle), as indicated by an accelerometer or vibration sensor;
3) Angle: by way of an angle or tilt sensor;
4) Collision Sensor: collision as sensed via a decelerometer;
5) Connect/Disconnect: indicative of position of latch, strap and/or other mechanism used to secure the device;
6) Current Voltage: at the end of travel of the fastener, with overload and short circuit sensed by measuring current and low voltage indicated by measuring the battery voltage;
7) Default: system present;
8) Effort: indicative of the date the module was installed and its cumulative time of use (and, possibly, more comprehensive information as to the relative timing of its use and/or other events);
9) Engagement (Mechanical): position of the latch, strap, and/or other mechanism used to secure the device will be sensed to detect engagement;
10) Faults: not secured as indicated by a position sensor;
11) Level: via a tilt sensor on the jack;
12) Load: weight as indicated by a load cell, strain gage, and/or deflection;
13) Location: as indicated by GPS;
14) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
15) Operational Frequency: period of time (e.g., hours) the component was in use;
16) Power Loss: based on a temporary or long term power loss detected by any other component may result in a warning signal provided to the end user;
17) Proximity: location and proximity to other devices for the purpose of coupling may be sensed via a camera or other proximity sensor/scheme (e.g., infrared, ultrasonic, or laser-based sensors; GPS; inductive or capacitive methods; etc.);
18) Second lock/latch: position sensor indicates actuation in order to secure the device;
19) Status: connected;

20) Vertical Deceleration: by way of an accelerometer;
21) Warning: not engaged properly and/or crash;
22) Wear: too much wobble as indicated by a vibration sensor.

Roof rack systems are a series of rails or attachment points affixed to the top of a vehicle. Generally speaking, these systems usually include a plurality of longitudinal rails in combination with one or more transverse bars. The transverse bar may be adjustably attached to the rails so as to allow the user to adjust the number of bars provided, as well as the relative distance between the bars (understanding that most roof rack systems include a plurality of transverse bars). The bars and/or the rails may have a cross-sectional profile that is circular, oval, rectangular, or rounded polygonal in nature. The rails are secured to the vehicle itself, possibly via designated installation points or channels integrated into the vehicle design by the original manufacturer. In some embodiments, the longitudinal bars are held in place by attachment mechanisms, wherein the attachment mechanism is anchored to the vehicle, thereby allowing for more versatility in the size/length of the rails. Moreover, the roof rack systems may include mechanism to attach cargo thereto, e.g., bike engagement devices, kayak racks, canoe racks, ski racks, snowboard racks, and the like.

Roof rack systems may utilize as inputs any of the following conditions:
1) Active/Inactive: based on active ignition but component is not fastened/secured, then the jack will be extended and the trailer brakes applied;
2) Biometrics: the identity of the driver/end user may be stored for archival purposes and may be used for safety insurance record access;
3) Engagement (Mechanical): self-indicating (e.g., the carrier is engaged);
4) Faults: rough road indication and/or high speed from trailer brake controller or other components results in tightening of straps/fasteners;
5) Load: as indicated by the communications device, connection devices (e.g., coupler, fifth wheel, gooseneck, etc.), or accessories (e.g., jack, roof rack, securing system, ramp, etc.), with resulting application of brakes and a warning to the user;
6) Noise: indicative of rough road, wearing of a device and/or a loose mechanical connection, with the accelerometer inputs interpreted accordingly and warning indications provided to the user with respect to premature wear;
7) Status: ignition active and component not fastened/secured results in extension of jack and application of trailer brakes;
8) Warning: can't take any action; may use GPS or biometric information to lock (e.g., trailer brake controller indicates an unauthorized user, resulting in locking of the carrier);
9) Wheel Speed: indicative of vehicle movement.

Roof rack systems may provide as outputs any of the following conditions:
1) Active/Inactive: by monitoring current or weight/force;
2) Actuate: motion/movement relative to the location of the component (e.g., the roof of the vehicle), as indicated by an accelerometer or vibration sensor;
3) Collision Sensor: collision as sensed via a decelerometer;
4) Connect/Disconnect: indicative of position of latch, strap and/or other mechanism used to secure the device;
5) Crash Detection: as may be incorporated in fastening locations;
6) Current Voltage: at the end of travel of the fastener, with overload and short circuit sensed by measuring current and low voltage indicated by measuring the battery voltage;
7) Deceleration/Acceleration: deceleration as detected by an appropriately positioned accelerometer;
8) Default: system present;
9) Effort: indicative of the date the module was installed and its cumulative time of use (and, possibly, more comprehensive information as to the relative timing of its use and/or other events);
10) Engagement (Mechanical): position of the latch, strap, and/or other mechanism used to secure the device will be sensed to detect engagement;
11) Faults: not secured as indicated by a position sensor;
12) Level: via a tilt sensor on the jack;
13) Load: weight as indicated by a load cell, strain gage, and/or deflection;
14) Location: as indicated by GPS;
15) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
16) Operational Frequency: period of time (e.g., hours) the component was in use;
17) Power Loss: based on a temporary or long term power loss detected by any other component may result in a warning signal provided to the end user;
18) Proximity: location and proximity to other devices for the purpose of coupling may be sensed via a camera or other proximity sensor/scheme (e.g., infrared, ultrasonic, or laser-based sensors; GPS; inductive or capacitive methods; etc.);
19) Second lock/latch: position sensor indicates actuation in order to secure the device;
20) Status: connected;
21) Vertical Deceleration: by way of an accelerometer;
22) Warning: not engaged properly and/or crash;
23) Wear: too much wobble as indicated by a vibration sensor;
24) Wheel Speed: as measured using a wheel speed sensor (e.g., hall sensor, etc.) and/or as indicated via the controller area network.

Securing systems include vehicle and/or trailer mounted systems for attaching and releasing cargo to a vehicle and/or trailer. These systems usually include straps, fasteners, ties, chains, belts, or other similar mechanisms. They may be attached to roof rack systems, cargo carriers, or possibly even the vehicle and/or trailer itself. The straps/fasteners may be received by a housing that is attached to the system, carrier, or vehicle. The housing may include mechanism that allow for tightening and retraction of the straps/fasteners. Additionally or alternatively, these systems could include complete rails to allow the user to position the straps/fasteners (and/or the housing with which each is associated) as desired anywhere along the length of the rail. A clasp or other mechanism receives, secures, and/or binds two straps together and/or a clasp mechanism is provided to one housing, with an adjustable length of strap/fastener provided to an opposing housing, so that cargo positioned between the two housings can be secured.

Securing systems may utilize as inputs any of the following conditions:
1) Active/Inactive: based on active ignition but component is not fastened/secured, then the jack will be extended and the trailer brakes applied;

2) Biometrics: the identity of the driver/end user may be stored for archival purposes and may be used for safety insurance record access;
3) Deceleration/Acceleration: deceleration from any component may be indicative of vehicle movement, resulting in a system wake up from sleep and/or status sent to the communications device and/or master control;
4) Engagement (Mechanical): any item to which the strap is attached, as potentially indicated by position of latch, strap or other mechanism to sense/detect engagement;
5) Faults: rough road indication and/or high speed from trailer brake controller or other components results in tightening of straps/fasteners;
6) Heat: only indicative of internal heat;
7) Load: as indicated by the communications device, connection devices (e.g., coupler, fifth wheel, gooseneck, etc.), or accessories (e.g., jack, roof rack, securing system, ramp, etc.), with resulting application of brakes and a warning to the user;
8) Status: ignition active/acceleration of vehicle and component not fastened/secured results in extension of jack and application of trailer brakes;
9) Vertical Deceleration: as indicated from hitch sensor; jack, TPMS, weight distribution system, sway module, or other components using an appropriately position accelerometer and indicates presence of a bumpy road for communication to other devices to protect the component from experiencing additional stress;
10) Warning: can't take any action; may use GPS or biometric information to tighten or lock (e.g., trailer brake controller indicates movement without engagement, resulting in tightening, or movement by an unauthorized user, resulting in locking of the carrier);
11) Wear: as indicated by a wear signal from any mechanical device, results in a warning to the communications device and/or master control;
12) Wheel Speed: indicative of vehicle movement.

Securing systems may provide as outputs any of the following conditions:
1) Active/Inactive: by monitoring current or weight/force;
2) Actuate: motion/movement relative to the location of the component (e.g., the roof of the vehicle), as indicated by an accelerometer or vibration sensor;
3) Connect/Disconnect: indicative of position of latch, strap and/or other mechanism used to secure the device;
4) Current Voltage: at the end of travel of the fastener, with overload and short circuit sensed by measuring current and low voltage indicated by measuring the battery voltage;
5) Default: system present;
6) Effort: indicative of the date the module was installed and its cumulative time of use (and, possibly, more comprehensive information as to the relative timing of its use and/or other events);
7) Engagement (Mechanical): position of the latch, strap, and/or other mechanism used to secure the device will be sensed to detect engagement;
8) Faults: not secured as indicated by a position sensor;
9) Heat: as indicated by thermistor and electronics;
10) Load: weight as indicated by a load cell, strain gage, and/or deflection;
11) Location: as indicated by GPS;
12) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
13) Operational Frequency: period of time (e.g., hours) the component was in use;
14) Power Loss: based on a temporary or long term power loss detected by any other component may result in a warning signal provided to the end user;
15) Proximity: location and proximity to other devices for the purpose of coupling may be sensed via a camera or other proximity sensor/scheme (e.g., infrared, ultrasonic, or laser-based sensors; GPS; inductive or capacitive methods; etc.);
16) Second lock/latch: position sensor indicates actuation in order to secure the device;
17) Status: connected;
18) Warning: not engaged properly and/or crash;
19) Wear: too much wobble as indicated by a vibration sensor;
20) Wheel Speed: as measured using a wheel speed sensor (e.g., hall sensor, etc.) and/or as indicated via the controller area network.

Winches include any device that may deploy and retract ropes, cables, cords, and other similar objects, as well as adjust tension in the same. Usually, winches are motorized and capable of moving or displacing large objects. They comprise a spool that may be operatively associated with a drive assembly that is motorized or hand-operated via a crank. The drive assembly may include gears, solenoids, ratchets, and/or pawls to improve safety and efficiency. If motorized winches are provided, they may be associated with the vehicle's power or transmission systems, or separate electric, hydraulic, pneumatic, or combustion engines may be associated with the winch itself.

Winches may utilize as inputs any of the following conditions:
1) Active/Inactive: if ignition is active, connectivity status is not connected and the connection device (e.g., coupler, gooseneck, pin box, etc.) is not engaged, then verify and notify the communications and/or information storage device and act to extend the jacks and/or apply the trailer brakes;
2) Connect/Disconnect: based on the electronics components (e.g., trailer brake controller, converter, breakaway system, etc.) and/or connection devices (e.g., fifth wheel, hitch bar, coupler, gooseneck, pin box, etc.), the jack may be extended;
3) Engagement (Mechanical); position of latch, strap or other mechanism to secure the device is sensed to detect the engagement;
4) Faults: current measurement to detect open, overload or shorts;
5) Heat: only indicative of internal heat;
6) Load: as indicated by the communications device, connection devices (e.g., coupler, fifth wheel, gooseneck, etc.), or accessories (e.g., jack, roof rack, securing system, ramp, etc.), with resulting application of brakes and a warning to the user;
7) Lube: based on the communications device or information storage/memory device, a predetermined schedule can be arranged;
8) Noise: indicative of rough road, wearing of a device and/or a loose mechanical connection, with the accelerometer inputs interpreted accordingly and warning indications provided to the user with respect to premature wear;
9) Proximity; proximity of object pulled by the winch to the truck/trailer using camera
10) Status: ignition active and connectivity status not connected (i.e., coupler, fifth wheel, pin box, or other connection device not engaged) and results in verification and notification to communications device and/or storage device with additional extension of jacks and application of trailer brakes;
11) Warning: can't take any action; prevents activation if, for example, TPMS indicates overload;
12) Wheel Speed: indicative of vehicle movement.

Winches may provide as outputs any of the following conditions:
1) Active/Inactive: by monitoring current or weight/force;
2) Actuate: a loose cable as indicated by a position sensor;
3) Angle/articulation: indicative of activation and/or the position of the object being pulled by the winch;
4) Collision Sensor: collision as sensed via a decelerometer;
5) Connect/Disconnect: loads on this component may be detected by sensing current after actuation of the component;
6) Current Voltage: at the end of travel of the fastener, with overload and short circuit sensed by measuring current and low voltage indicated by measuring the battery voltage;
7) Default: load value;
8) Effort: indicative of the date the module was installed and its cumulative time of use (and, possibly, more comprehensive information as to the relative timing of its use and/or other events);
9) Engagement (Mechanical): position of the latch, strap, and/or other mechanism used to secure the device will be sensed to detect engagement;
10) Faults: overload and/or short circuit via current measurement;
11) Heat: as indicated by thermistor and electronics;
12) Load: as indicated by a current sense signal;
13) Location: as indicated by GPS;
14) Noise: preferably detected as audible noises, as may be generated by road surfaces and especially rough, bumpy, or irregular surfaces and/or deceleration signal frequency (thereby suggesting difficult, inconsistent, or otherwise obstructed road surfaces/conditions);
15) Operational Frequency: number of times the component was in use;
16) Power Loss: based on a temporary or long term power loss detected by any other component may result in a warning signal provided to the end user;
17) Proximity: location and proximity to other devices for the purpose of coupling may be sensed via a camera or other proximity sensor/scheme (e.g., infrared, ultrasonic, or laser-based sensors; GPS; inductive or capacitive methods; etc.);
18) Second lock/latch: position sensor indicates actuation in order to secure the device;
19) Status: connected;
20) Warning: overload and/or short circuit;
21) Wear: noise as indicated by a vibration sensor;
21) Wheel Speed: as measured using a wheel speed sensor (e.g., hall sensor, etc.) and/or as indicated via the controller area network.

Ramp systems are retractable, flat platforms for loading and unloading cargo from the bed or carrying bay of a vehicle, such as onto the bed of a pick-up truck. Ramps usually comprise one or two flattened metal sheets. A hook, latch, or other mechanism is provided at one end of each sheet to secure the ramp to the vehicle. The exposed top surface of the ramp is designed for vehicles, people, and cargo to safely traverse over the ramp, so that it may include traction surfaces and/or tapered ends to allow for smooth transitions on and off the ramp. The materials for the ramp should be selected for durability, load-bearing capability, weight, and cost. Some ramp systems may include automated or partially automated deployment and retraction systems, usually including a drive motor and associated mechanism. A storage/stowage mechanism may be included to the extent the ramp system is affixed to/mounted on or under the vehicle. Ramp systems may also be associated with trailers or other towed products.

Ramp systems may utilize as inputs any of the following conditions:
1) Active/Inactive: if the ignition is active and the vehicle is motion (e.g., via wheel speed or other sensors or inputs), the ramp is positioned for movement/travel;
2) Engagement (Mechanical): as indicated by winch, TPMS, or load sensor and/or based on position of latch/securing mechanism;
3) Faults: indicative of failure of securing strap or overload condition (with potential indication to deactivate associated system, such as disengagement of winch to prevent pulling objects up the ramp);
4) Status: ignition active and vehicle movement results in ramp positioned to move;
5) Warning: can't take any action for the reasons noted in the faults of this section (see above);

Ramp systems may provide as outputs any of the following conditions:
1) Active/Inactive: presence of voltage or pressure;
2) Actuate: rattling of the ramp as sensed with a position sensor and/or accelerometer;
3) Angle/articulation: by way of an angle or tilt sensor;
4) Effort: indicative of the date the module was installed and its cumulative time of use (and, possibly, more comprehensive information as to the relative timing of its use and/or other events);
5) Engagement (Mechanical): position of the latch, strap, and/or other mechanism used to secure the device will be sensed to detect engagement;
6) Load: as measured with current sense output and should be proportional to the load;
7) Location: as indicated by GPS;
8) Operational Frequency: the number of times the component was deployed;
9) Proximity: location and proximity to other devices for the purpose of coupling may be sensed via a camera or other proximity sensor/scheme (e.g., infrared, ultrasonic, or laser-based sensors; GPS; inductive or capacitive methods; etc.);
10) Second lock/latch: so as to secure the component;
11) Status: deployed;
12) Warning: not engaged properly and/or crash;
13) Wear: noise as indicated by a vibration sensor.

Interface and Ancillary Systems

Batteries comprise any number of known devices for supplying electrical current. Typically, batteries rely on electrochemical reactions to produce current when a load is applied across the battery's terminals. Within the realm of towing and vehicle accessory devices, standardized consumer batteries are used.

Batteries are made up of one or more cells in which the electricity-producing reactions occur. These cells may be primary (non-rechargeable), although rechargeable systems may be more appealing to users. The voltage and other electrical characteristics of the battery depend on the number of cells incorporated within the battery (and their precise orientation, e.g. in parallel or in series), as well as the chemical composition of the materials participating in the reaction. Common primary batteries are characterized by their anode and cathode materials, and they may include zinc-manganese dioxide (i.e., alkaline), lithium-manganese dioxide, zinc-air, lithium-iron disulfide, and carbon zinc cells. Rechargeable batteries include lithium-ion materials (encompassing a wide range of intercalating lithium-based materials), nickel-metal hydride, and lead-acid cells.

Within the various accessory systems of the invention, the batteries may utilize as inputs any of the following conditions:
1) Active/Inactive: indicated when ignition is on and/or the trailer is moving, excessive number of components and/or excessive demand for current (i.e., exceeding a threshold value) results in disabling non-prioritize components or otherwise redirecting and reallocating available current to specific components;
2) Current Voltage: as indicated by charging current and battery voltage, which may be communicated across the present system, particularly with respect to low voltage indicated by multiple components;
3) Default: as indicated by any component, for example, breakaway battery current when active may be based on the number of axles, with a verification made during periodic self-testing regimens;
4) Faults: total current too high or low as indicated by the communications device, with the communications device also reporting current and heat for individual components and the entire system;
5) Heat: indicative of only internal heat for this component;
6) Power Loss: as indicated by any component, whether temporary or of a longer term nature, with a warning provided to the end user;
7) Status: amount of current in use, thereby allowing a determination on a component-by-component basis as to how to allocate and/or prioritize remaining capacity;
8) Warning: indicative of excessive current with a resulting decision to disable certain components and/or send requests.

Within the various accessory systems of the invention, the batteries may provide as outputs any of the following conditions:
1) Active/Inactive: indicated as active when load is connected, with current varying according to the load so that the current may be monitored and communicated to other components;
2) Current Voltage: battery charged or charging;
3) Default: output voltage at a nominal 13.5 volts;
4) Faults: deep discharge, which may be communicated to other components;
5) Heat: thermistor and electronics;
6) Load: battery connected to load and supplying current;
7) Location: as indicated by GPS;
8) Status: amount of current in use, thereby allowing a determination on a component-by-component basis as to how to allocate and/or prioritize remaining capacity, low or high voltage, too much current drawn;
9) Warning: indicative of low charge, short circuit, and/or failure to charge;
10) Wear; performance will deteriorate with age and charge cycling, so as to provide dead battery detection.

The system also incorporates various communications devices.

Generally speaking, these communications devices may utilize as inputs any input from any component above could also be provided as an input by the communications device. As non-limiting examples, such inputs could include:

1) ABS; can come from CAN, OBD II, Wheel speed, TPMS, Radar, Camera, GPS, Pedal sensor, TBC etc.
2) Active/Inactive: IGNITION, TBC, Converter, Jack, Trailer Brakes, $5^{th}$ wheel, Gooseneck, Pin Box, Coupler, Sway, Weight Distribution, Hitches, Cargo Carrier, Roof Rack, Securing Systems, Winch, Batteries, Breakaway System, TPMS,
3) Actuate; Travel position of Jacks, Jaw Position, pin Indicator of $5^{th}$ wheel, Ball position of Gooseneck, Latch mechanism and angle of pin box to trailer in pin Box, Engagement lever angle with respect to the hitch ball, relative force fore and aft of coupler to measure braking and acceleration in coupler, Oblong hole in hitch bar connection, motion relative to roof in cargo carrier, add all
4) Air Ride; Air pressure in $5^{th}$ wheel, Gooseneck and Pin Box,
5) Angle; Brake Control mounting angle from TBC, Tilt sensor in jack, $5^{th}$ wheel, Gooseneck, Pin Box, Coupler, Sway angle from gyro or accelerometer at ball/coupler or camera behind back of truck in the center, Tilt sensor in hitch bar, cargo carrier, Angle sensor in Ramp, Angle Sensor to measure head movement in $5^{th}$ wheel, Pin Box and coupler
6) Auto Dimming: CAN or ambient light sensor in Brake Control,
7) Auto Inflate: Air pressure from $5^{th}$ wheel, Gooseneck or Pin Box
8) Biometrics: Using camera for retina scan or fingerprint scanning
9) Boost; From TBC via user setting or from calculations by server or TBC or other master controller based on trailer weight, number of axles, truck type, weather, brake condition.
10) Brake Intent: From Brake pedal, Brake fluid pressure or hitch bar pressure. Also from strain gage, force gage, displacement sensor at $5^{th}$ wheel, hitch bar, gooseneck, Pin box, coupler, sway module etc.
11) Brake Output: from TBC, Sway module, Trailer Brakes.
12) Charging Status: From Battery or Breakaway system.
13) Collision Sensor: Accelerometer in TBC, Hitch Bar, Sway module or any device or camera.
14) Connect/Disconnect: Resistive and Inductive test by TBC, Sway Control, Trailer Brake module, Breakaway system. Current measurement for Jack. Jaw and indicator position for $5^{th}$ wheel, gooseneck, Pin box. Current sense in jaws movement motor, sensor in hitches to sense that the pin is inserted, current in coupler motor, current in winch motor, lack of communication with camera.
15) Crash Detection Accelerometer in TBC, Sway control or any device, Force or strain gage sensor in $5^{th}$ wheel, gooseneck, hitch, hitch bar, coupler, or any device
16) Current Voltage: Input of battery voltage and current from other devices—used to detect low battery condition or excessive current situation TBC, Battery, Trailer Brakes, Converter, Jack, Battery etc.
17) Deceleration/Acceleration: Deceleration or acceleration from GPS or wheel speed will correlate to the accelerometer. Input comes from TBC, Sway control, TPMS or any device with those sensors. Deceleration or acceleration from any device indicates that it is moving. This can be used to wake up some devices.
18) Default:
19) Effort
20) Engagement (Mechanical)

21) EOH/Electric Mode
22) Faults
23) Gain: From TBC via user setting or from calculations by server or TBC or other master controller based on trailer weight, number of axles, truck type, weather, brake condition
24) Heat
25) High Pin
26) Image
27) Lamp Type
28) Lane Change
29) Level
30) Load
31) Location
32) Lube
33) Noise
34) Operational Frequency
35) Power Loss
36) Pressure
37) Proximity
38) PWM/Multiplex
39) Second lock/latch
40) Status
41) Vertical Deceleration
42) Warning: Trailer not connected from TBC, Converter. Low tire pressure from TPMS, not engaged from $5^{th}$ wheel, gooseneck, pin box, coupler, hitch. Crash warning. too much wear warning from brakes, etc. Excessive current—overload or short from TBC, Converter, Breakaway, Trailer Brakes. Short to ground from Jack, winch, TBC, converter, $5^{th}$ wheel jaw motor, gooseneck, pin box, weight distribution system or any system with motor or power drive.
43) Wear
44) Wheel Speed Throughout the system, the communications devices may provide as outputs any output from any component above could also be provided as an output by the communications device. As non-limiting examples, such outputs could include:

1) Active/Inactive: TBC, jacks, $5^{th}$ wheel, Gooseneck, Pin Box, Coupler, Sway, Weight distribution, Hitches, Hitch Bar, Cargo Carrier, Roof Rack, Security Systems, Converter, Winches, batteries, breakaway System, TPMS, Trailer Brakes, Cameras, Ramp—all communicate whether they are active or inactive. For example, the TBC is active when either brakes are active or manual lever is pushed. The output of TBC is nonzero in either case.
2) Actuate
3) Air Ride
4) Angle
5) Auto Dimming
6) Auto Inflate
7) Biometrics
8) Boost
9) Brake Intent
10) Brake Output: The brake output is generated by TBC, Sway control and is present at the Trailer Brakes. All of them communicate the details of the output to the communication device. This will include how much voltage is intended to be sent to the brakes. The Brakes in turn communicate how much voltage it received.
11) Charging Status
12) Collision Sensor
13) Connect/Disconnect
14) Crash Detection
15) Current Voltage
16) Deceleration/Acceleration
17) Default
18) Effort
19) Engagement (Mechanical)
20) EOH/Electric Mode: The user input will inform the communication device the type of trailer and number of axles. The TBC will detect the load and communicate what it found for load—electric or EOH and including number axles to the communication device.
21) Faults
22) Gain
23) Heat: Overheated status of devices that have power drive components and are likely to get hot is communicated to the communication dev. The thermistor or thermocouple senses the temperature. The devices like TBC, Jack, $5^{th}$ wheel, gooseneck, Sway control, Weight Distribution, Hitch bar, Securing Systems, Converters, Winches, batteries, Breakaway system, TPMS, Trailer Brakes, Camera etc. will communicate the heat status to the communication dev.
24) High Pin
25) Image
26) Lamp Type
27) Lane Change
28) Level
29) Load
30) Location
31) Lube
32) Noise
33) Operational Frequency
34) Power Loss
35) Pressure
36) Proximity
37) PWM/Multiplex
38) Second lock/latch
39) Status
40) Vertical Deceleration
41) Warning
42) Wear
43) Wheel Speed Information storage devices are another key aspect of the system. These systems include cloud-based storage, internet or private party servers, hard disk drives, portable storage media (e.g., thumb drives), or any other, similar electronic storage device. The information storage device may also generate information with respect to logging the access or other acquisition of inputs and outputs associated with the device. Any of the aforementioned inputs and outputs associated with any of the other components in this disclosure may serve as inputs and/or outputs. For the sake of clarity, these will include any combination of the following (as they may be defined/contemplated anywhere in this disclosure):

1) ABS
2) Active/Inactive
3) Actuate
4) Air Ride
5) Angle
6) Auto Dimming
7) Auto Inflate
8) Biometrics
9) Boost
10) Brake Intent
11) Brake Output
12) Charging Status
13) Collision Sensor
14) Connect/Disconnect 15) Crash Detection
16) Current Voltage
17) Deceleration/Acceleration
18) Default
19) Effort
20) Engagement (Mechanical)
21) EOH/Electric Mode
22) Faults
23) Gain
24) Heat
25) High Pin
26) Image
27) Lamp Type
28) Lane Change
29) Level
30) Load
31) Location
32) Lube
33) Noise
34) Operational Frequency
35) Power Loss
36) Pressure
37) Proximity
38) PWM/Multiplex
39) Second lock/latch
40) Status
41) Vertical Deceleration
42) Warning
43) Wear
44) Wheel Speed User Interface Units Any component, including the master control, may incorporate a user interface to obtain inputs from the user, to provide information (warnings, status, faults, etc.) to that user, and to generally realize further efficiencies for the entire system. These interface items may take a variety of forms, including but not limited to any combination of the following well-known mechanisms:

1) Liquid crystal display units, cathode ray tubes, light emitting diodes displays and other video projection devices;
2) Touch screens associated with the aforementioned video devices;
3) Dedicated buttons, switches, and/or knobs that may be indicative of preset conditions or responsive to options projected by a video device;
4) Dedicated status lamps or light emitting diodes;
5) Keyboards and numeric keypads;
6) Tactile response mechanisms, such as vibration pads or mechanisms, braille and/or other similar indicating systems; and
7) Voice-activated operations, including appropriate microphones, speakers, and associated processors/software, for voice-activated commands, synthesized speech, and/or other audible feedback.

Control System

The master control for the system will be a device that effectively coordinates and determines final actions and status for the system. However, the system may not use a master control for a specific component to act. The specific components may communicate amongst one another, such as being part of a mesh network, and may act based upon the information flowing therebetween.

A de facto control system may be inherently established by utilizing standard software protocols in all or selected components of the electrical, connection, accessory, and/or interface systems. In this regard, the end user may not necessarily have a graphic user interface or other tangible device representing the control system, but the coordinated and seamless interaction of the components would effectively serve as such a system. In this scenario, further enhancements could be realized by permitting a communications device to effectively act as a control panel or dashboard, by way of an application uploaded onto the device that enables such actions.

Whatever form the control system takes, the ultimate intent is to provide the end user with an integrated means of monitoring and interacting with all of the components in the present system. In this regard, the control system may display any warning, status, and default setting for each component in the system, and it may further aggregate these warnings, statuses, and defaults to generate additional instructions and recommendations for the user. In some instances, these instructions and recommendations could be automatically implemented, particularly to the extent the action relates to safety (e.g., engaging the brakes and extending the jacks to avoid unintended movement of a trailer, etc.).

Other Components Potentially Associated with the System

Original equipment brakes provided by the vehicle manufacturer may incorporate specific features, such as anti-lock functionality, that generate additional signals and information that can be useful to the present system. These features may be accessed by connecting appropriate components to the on board diagnostics and/or controller area network.

On-board diagnostics systems (OBD) are systems provided by vehicle manufacturers to identify and share operational information about the vehicle across its various systems. Depending upon the vehicle manufacturer, it may be possible for end users to easily tie into this system in order to monitor, leverage, and reproduce signals and conditions inherent in the OBD for use in the present system.

Controller area network (CAN) bus is the communications line provided by the vehicle manufacturer. As above, it provides a potential access point by which end users can potentially tap into existing vehicle infrastructure.

Example 1

A data collection system and a communication system related to various types of towing systems and assemblies are contemplated. In particular, FIG. 1 illustrates a network system architecture 100 that includes a communication framework 106 for collecting, processing, and communicating data. In combination with interface device 102, the communication framework 106 allows data to be sensed at a particular towing system, including a trailer and/or any number of accessories, and/or assembly device module 110 of the towed and towing vehicles. An interface device 102 may be in communication with a computer/processor 104 by way of the communication framework 106 such as the internet, network, or cloud as is generally known in the art or as may be developed in the future. The processor 104 and communication framework 106 of the system architecture 100 may also include on on-line web server. The interface device 102 may be a computer, smartphone, tablet, television, laptop, or other device that is accessible by the user to access a website application. The towing system device modules 110 may be in communication with the computer/processor 104 by way of the communication framework 106.

The computer/processor 104 of the network system 100 may include a database that is configured to receive the sensed data from at least one towing system device module 110. Sensed data may be collected through the communication framework 106 and stored at the database maintained within the computer/processor 104. The collection of sensed data may then be processed to identify various data sets. The data sets may then be communicated to the interface device 102 and/or other aspects of the system, such as assembly device module 110.

Figure 2:
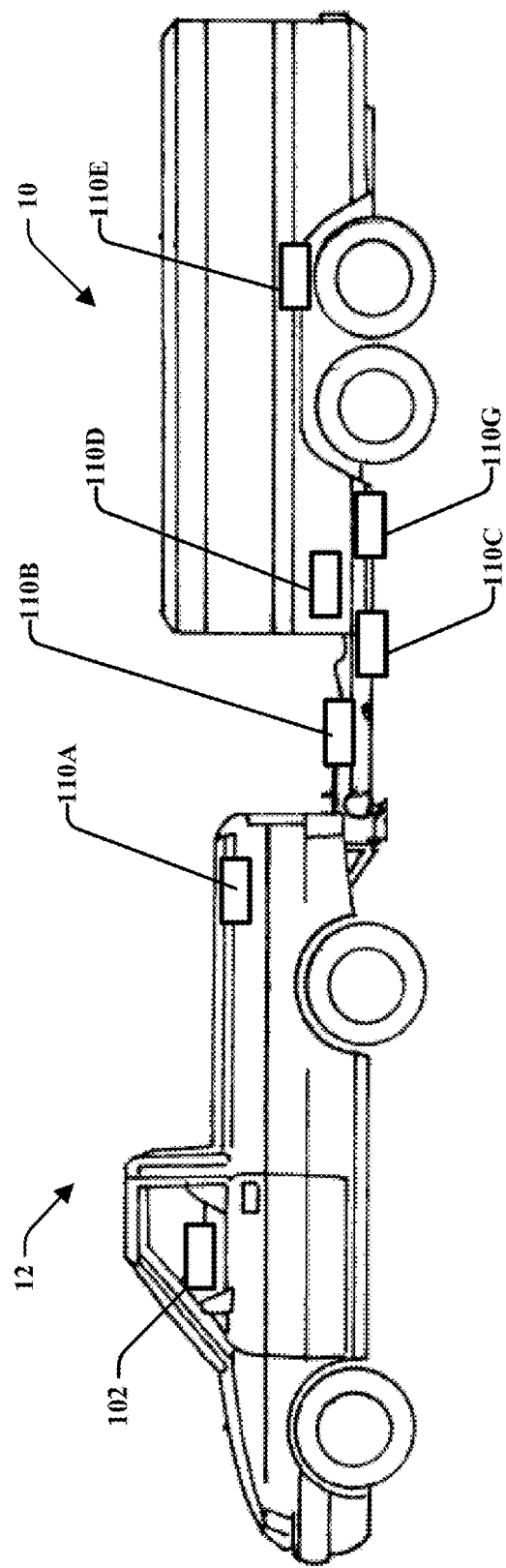
FIG. 2 is a schematic perspective view of embodiments of the data collection and communication system of the present disclosure applied to a towed vehicle and a towing vehicle.
Figure 3:
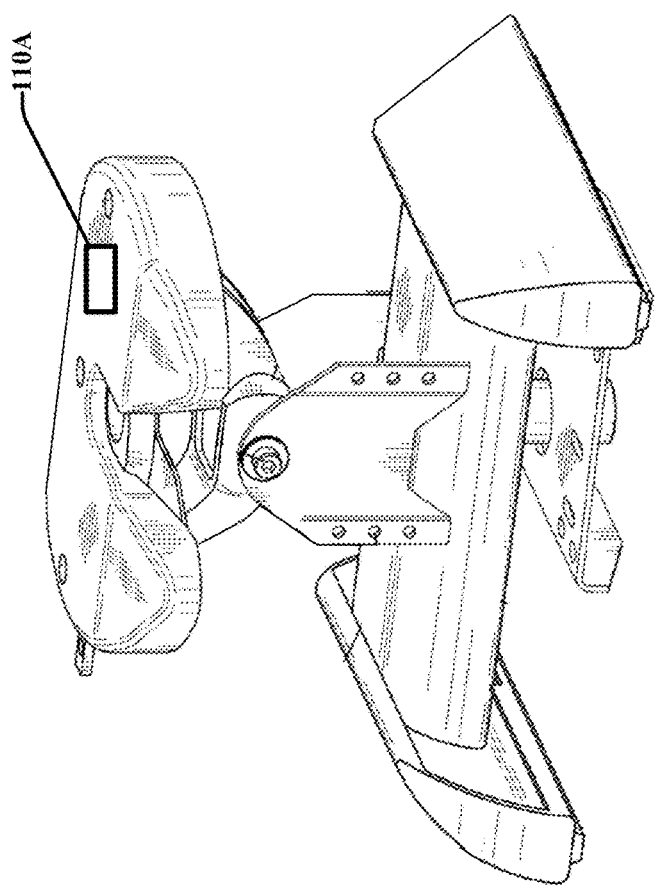
FIG. 3 is a perspective view of a fifth wheel hitch module of the data collection and communication system of the present disclosure.
Figure 4:
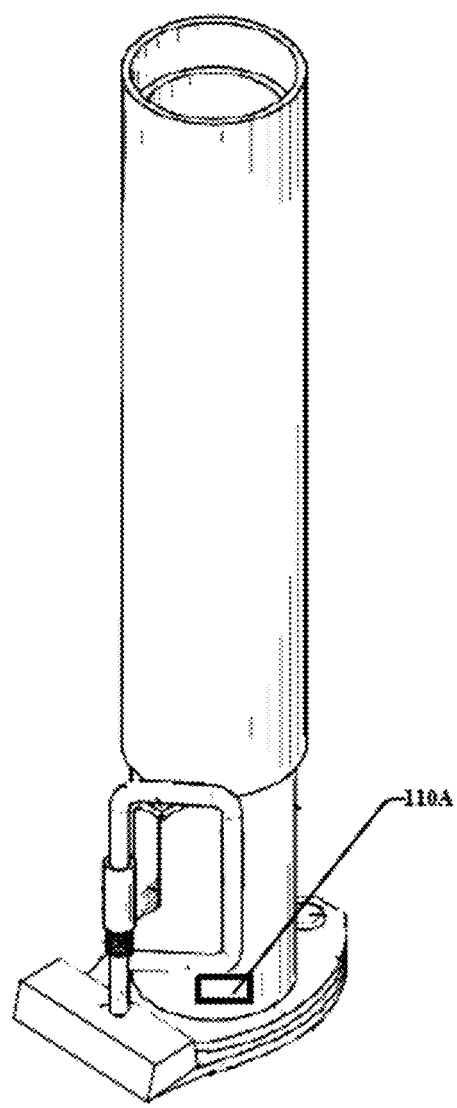
FIG. 4 is a perspective view of a gooseneck coupler module of the data collection and communication system of the present disclosure.
Figure 5:
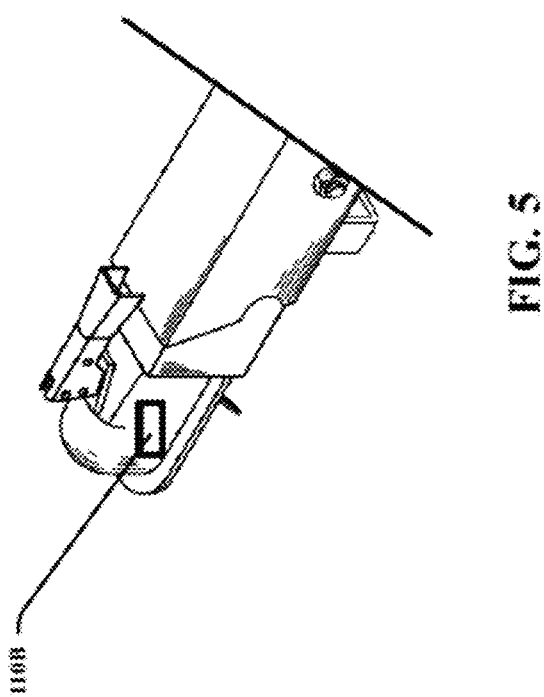
FIG. 5 is a perspective view of a coupler module of the data collection and communication system of the present disclosure.
Figure 6:
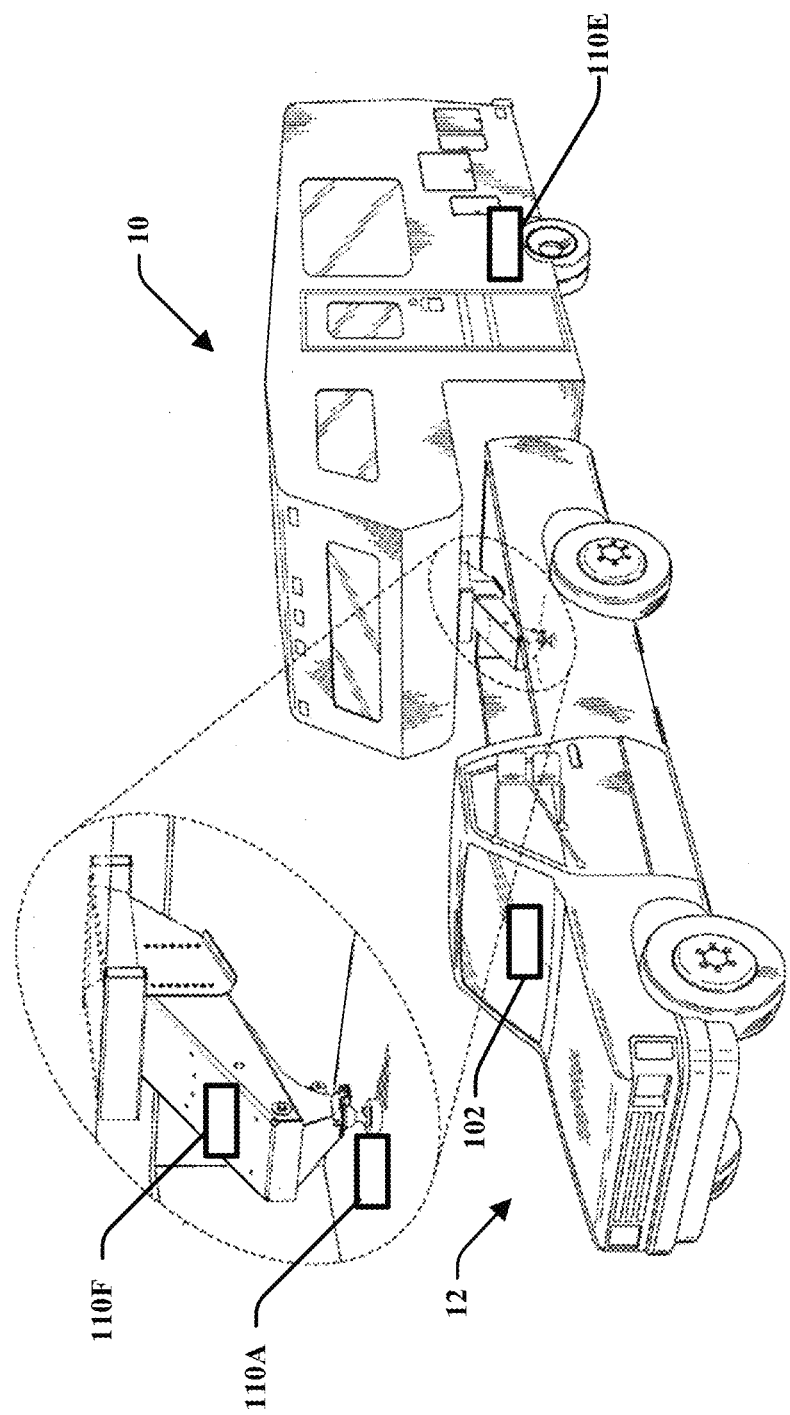
FIG. 6 is a schematic perspective view of various modules of the data collection and communication system of the present disclosure applied to a towed vehicle and a towing vehicle.
Figure 7:
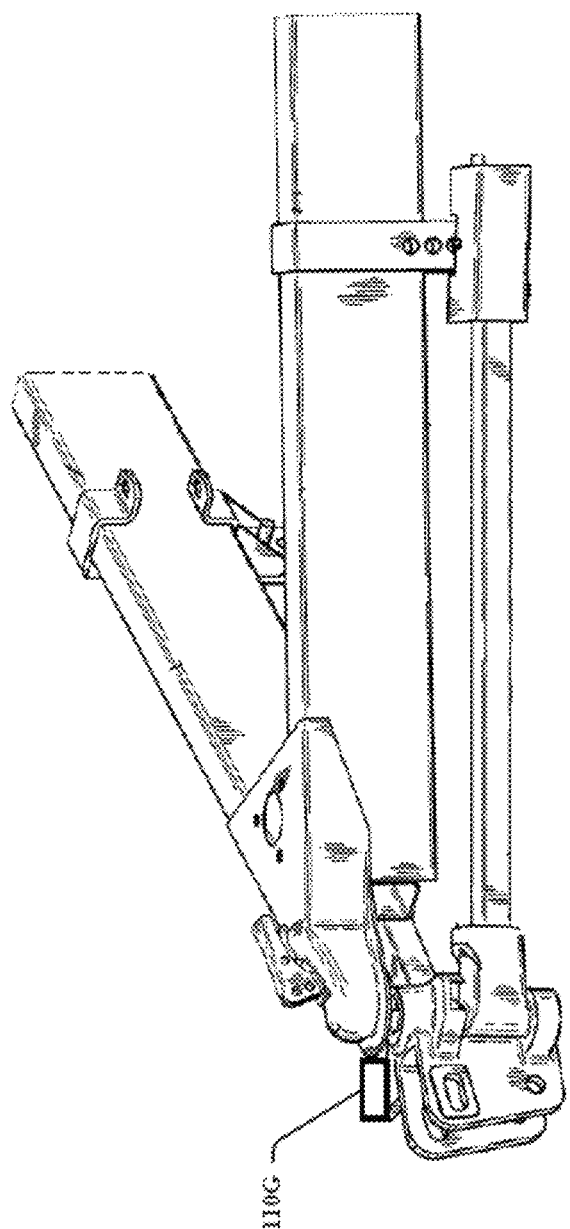
FIG. 7 is a perspective view of a weight distribution modules of the data collection and communication system of the present disclosure.

As illustrated by FIGS. 2 and 3, the device modules 110A-110G associated with the particular towing system and accessories, may be located on the towed vehicle 10 or the towing vehicle 12. The towing systems and accessories may include, but may not be limited to, a brake controller, a sway module, a jack assembly, a fifth wheel hitch, a gooseneck hitch, a pin box assembly, a coupler, and a weight distribution assembly. The device module representing each of the identified towing systems may be positioned at various locations of the towed 10 or towing vehicle 12.

The device module 110 may be a sensor or other data gathering device associated with one or more of the towing systems and/or accessories. The device module 110 may include a transceiver configured to transmit and receive information through the communication framework 106, in a wired or wireless configuration. Optionally, the network may enable communication between at least one internet-accessible website. A "network" can include, but is not limited to, broadband wide-area networks such as cellular networks, local-area networks, wireless local-area networks (e.g., Wi-Fi), and personal area networks, such as near-field or short-distance communication networks including BLUETOOTH®. Communication across a network may include packet-based communications, radio and frequency/amplitude modulations networks, and any of the other protocols identified herein. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, mobile phone adapters, dedicated wires, coaxial cables, optical fiber cables, twisted pair cables, Ethernet, HDMI and the like.

This arrangement, particularly to the extent multiple transceivers are incorporated, gives rise to the possibility of a "mesh network." This network exists among the various devices associated with system 100, and it acknowledges that any number of devices embodying that system may communicate seamlessly with one another without the need for specific user intervention or intervention of a master controller, user interface, or electronic storage device. The mesh network helps to enable many of the automated features of the disparate devices/components comprising the system 100.

Examples of such wireless configuration may include, but is not limited to, various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, xth generation long term evolution, or another IEEE 802.XX technology. Furthermore, embodiments may utilize wired communications.

The interface device 102 may include a user interface 120 as shown in FIG. 1 and elsewhere. The interface device may be in communication with the communication framework in a wired or wireless configuration. In embodiments, the interface device 102 may be various access devices, which may include a smart phone, laptop, in-vehicle device, or separate interface device that retrieves/transmits diagnostic data/information, and other data/information to/from the towing systems via the wired or wireless network. In one embodiment, the interface device 102 may use a long-range wireless interface to communicate diagnostic and related information to the central host computer 104, and to receive related information from same.

More specifically, in one embodiment, the invention includes a system featuring: 1) a controller; 2) a diagnostic system configured to receive diagnostic information from a host towed or towing vehicle; 3) a position-locating system configured to determine the towed or towing vehicle location information; 4) a communication interface configured to send additional information to a peripheral system, and 5) any number of transceivers configured to receive and/or transmit information through network such as a wireless transmitter communicating to a wireless network to an Internet-accessible website.

In certain embodiments, the interface device 102 can include a controller and a display, such as a touchscreen, an LED or LCD, or any other type of known or future developed display device. In this case, the controller may feature machine-readable computer code, e.g., firmware, which controls the display. For example, the computer code can be configured to render a text message on the display. The text message can be sent from the Internet-accessible website, or from a cellular telephone or the processor 104. The display may be configured to mount inside the vehicle. In various embodiments, the interface device 102 may include a graphics display.

In other embodiments, the interface device 102 may feature a voice interface that receives audio information and sends the information to the wireless transmitter. For example, the access device can be a smartphone that contains a Bluetooth® transceiver configured to send information to and receive information from the network of towing systems. Alternatively, the access device includes the Bluetooth® transceiver, e.g. it is mounted on an internal circuit board. In still other embodiments, the interface device includes a short- or long-range wireless transmitter, e.g. a transceiver operating a Bluetooth®, 802.11, part-15, infrared wireless protocol, or other wired or wireless communication protocol.

The towing system device modules 110A-110G may be a data collection device, a data communication device, or both. The modules may include a data-gathering portion, a data-transmitting portion that transmits the information, and a power management portion that supplies power to the module as needed. The data may be transmitted to a processor 104 that may manage communication with each modules and interface device. The processor runs firmware that receives and processes an incoming data message, and may acknowledge, interpret, process prospective outputs, and transmit the data through the network. The processor 104 additionally receives and processes diagnostic information from modules 110. For example, the processor can process diagnostic data as more specifically identified below.

The processor 104 may store firmware, pre-processed diagnostic data, and/or post-processed diagnostic data in a memory or in a cloud system. The memory may also store a file-managing operating system or database that runs on the processor. During operation, the memory can additionally function as a "data logger" where diagnostic and functional data may be captured at high rates (e.g., periodically at intervals ranging anywhere from 1 to 500 milliseconds, with 4 and 200 milliseconds being preferred rates) and then read out later.

With firmware, the processor 104 formats information into unique packets and serially transfers these packets to a wireless modem or the like (such communication protocols may include any known or future developed communication protocol, including, without limitation, TCP/IP. Each formatted packet may include, e.g., a header that describes its destination and the wireless modem's numerical identity (e.g., its "phone number") and a payload that includes the information. For example, the packets can include diagnostic or functional data information or other information. Once transmitted, the packets propagate through the network, which delivers them to an Internet-accessible website.

More specifically, the following features may be performed by various towing system and/or accessory device modules 110A-110G. The data collected may then be communicated through the communication framework 106.

As a Data Collection Device:

Fifth Wheel Hitch/Gooseneck Coupler and Ball 110A:

The fifth wheel hitch or gooseneck coupler and ball modules 110A may sense and collect various data parameters related to the function of a fifth wheel hitch or gooseneck coupler and ball and/or the conditions under which such operates. By way of a non-limiting example, the module 110A may perform warranty or diagnostic type data collection as it relates to cycles, load, trip data, vibration profile, misuses occurred such as loading with jaws closed or goose accident, age, trailer weight, a log of operational conditions (e.g., sway), and additional sensor information. This information may be utilized for any purpose, such as to determine if a repair is covered by a warranty or was the result of misuse.

Coupler 110B:

The coupler module 110B may sense and collect various data parameters related to the function of a coupler and/or the conditions under which such operates. By way of a non-limiting example, the module 110B may perform warranty or diagnostic type data collection as it relates to a coupler safety pin, whether the coupler is connected or disconnected, load, usage, vibration profile, and misuse or wear.

Jack Assemblies 110C:

The jack assembly module 110C may sense and collect various data parameters related to the function of a jack assembly and/or the conditions under which such operates. By way of a non-limiting example, the module 110C may perform warranty or diagnostic type data collection as it relates to load, cycles, position of the jack (extended or retracted), trailer weight, level, travel, pivot, and lubrication, as well as perform automatic user convenience functions such as activating a light in dark/night-time conditions.

Sway Controller 110D:

The sway controller module 110D may sense and collect various data parameters related to the function of a sway controller and/or the conditions under which such operates. By way of a non-limiting example, the module 110D may perform warranty or diagnostic type data collection as it relates to road profile data, wheel speed, number of occurrence of sway control, the magnitude of occurrence of sway control, trailer conditions, gain, load, pin weight, and number of times a warning message is provided to the user.

Brake Controller 110E:

The brake controller module 110E may sense and collect various data parameters related to the function of a brake controller and/or the conditions under which such operates. By way of a non-limiting example, the module 110E may perform warranty or diagnostic type data collection as it relates to fault codes and occurrences, settings related to gain or boost (including determining whether they are appropriate for the trailer weight and truck type sensed or indicated to the system), percent output habits of the vehicle operator including time or general usage, trip data, mode usage, age, vibration profile, and additional sensor usages.

Pin Box 110F:

The pin box module 110F (FIG. 3) may sense and collect various data parameters related to the function of a pin box and/or the conditions under which such operates. By way of a non-limiting example, the module 110F may perform warranty or diagnostic type data collection as it relates to load, cycles, auto inflate or deflate occurrences, connection, disconnect, trip data, and vibration profile.

Weight Distribution 110G:

The weight distribution module 110G may sense and collect various data parameters related to the function of a weight distribution assembly and/or the conditions under which such operates. By way of a non-limiting example, the module 110G may perform warranty or diagnostic type data collection as it relates to cycles, load, usage, pads, profile, number of bar disconnects, clips, and trip data such as turns.

As a Data Communication Device:

Fifth Wheel Hitch and Gooseneck Coupler and Ball 110A:

The fifth wheel hitch and gooseneck coupler and ball module 110A may communicate various data parameters related to the function of a fifth wheel hitch or gooseneck coupler and ball and/or the conditions under which such operates. By way of a non-limiting example, the module 110A may communicate data to identify goose pop up, connection of jaws, and second lock latch status. Further, the modules 110A may communicate diagnostic status such as hitch pin, load, and disconnect status. Additional sensed parameters may include usage, wear, safety chain engagement, actuation is open or closed, proximity to cab/trailer and connection or disconnection.

Coupler 110B:

The coupler module 110B may communicate various data parameters related to the function of a coupler and/or the conditions under which such operates. By way of a non-limiting example, the module 110B may communicate data to identify connection status or the status of a second lock or catch. Further, the module 110B may communicate diagnostic status such as load, and disconnect status. Additional sensed parameters may include usage, wear, proximity to cab/trailer, connection or disconnection, and safety pin.

Sway Controller 110C:

The sway controller module 110C may communicate various data parameters related to the function of a sway controller and/or the conditions under which such operates. By way of a non-limiting example, the module 110C may communicate data to identify outputs. Further, the module 110C may communicate diagnostic status such as if and/or when a sway event is in progress or has occurred. Additional sensed parameters may include when and/or if a warning/safety sway condition exists and wheel speeds at the time of the condition.

Jack Assemblies 110D:

The jack assembly module 110D may communicate various data parameters related to the function of a jack assembly and/or the conditions under which such operates. By way of a non-limiting example, the module 110D may communicate data to identify position, load, and effort. Further, the module 110D may communicate diagnostic status such as cycles. Additional sensed parameters may include jail failure, wear/cycle, lubrication, electrical drive position or level, warnings for load or overload conditions, assist in hookup, and proximity related to jack stow or work positions.

Brake Controller 110E:

The brake controller module 110E may communicate various data parameters related to the function of a brake controller and/or the conditions under which such operates. By way of a non-limiting example, the module 110E may communicate data to identify electric over hydraulic dimming (EOH), configuration, outputs, boost, and gain. Further, the module 110E may communicate diagnostic status such as faults (e.g., open ground, short to ground, short to $V_{bat}$, overload, etc.), and current voltages. Additional sensed parameters may include warning or safety conditions such as power loss, connection or disconnection, and default. Further communicated data may include sensor inputs for heat, wheel speed, and brake effort.

Pin Box 110F:

The pin box module 110F may communicate various data parameters related to the function of a pin box and/or the conditions under which such operates. By way of a non-limiting example, the module 110F may communicate data to identify connection status, articulation proximity, and air ride. Further, the module 110F may communicate diagnostic status such as air bag failure, disconnection, load, high pin, and pressure. Additional sensed parameters may include auto inflate/deflate, load, tire pressure monitoring system (TPMS), and proximity.

Weight Distribution 110G:

The weight distribution module 110G may communicate various data parameters related to the function of a weight distribution assembly and/or the conditions under which such operates. By way of a non-limiting example, the module 110G may communicate data to identify a load, and a level. Further, the module 110G may communicate diagnostic status such as load, conditions, bar disconnect status, and friction pad wear. Additional sensed parameters may include usage, wear, load at head/base, level, proximity, missing clips, and special relationship to other assemblies such as motorized systems including jack assemblies.

Figure 8:
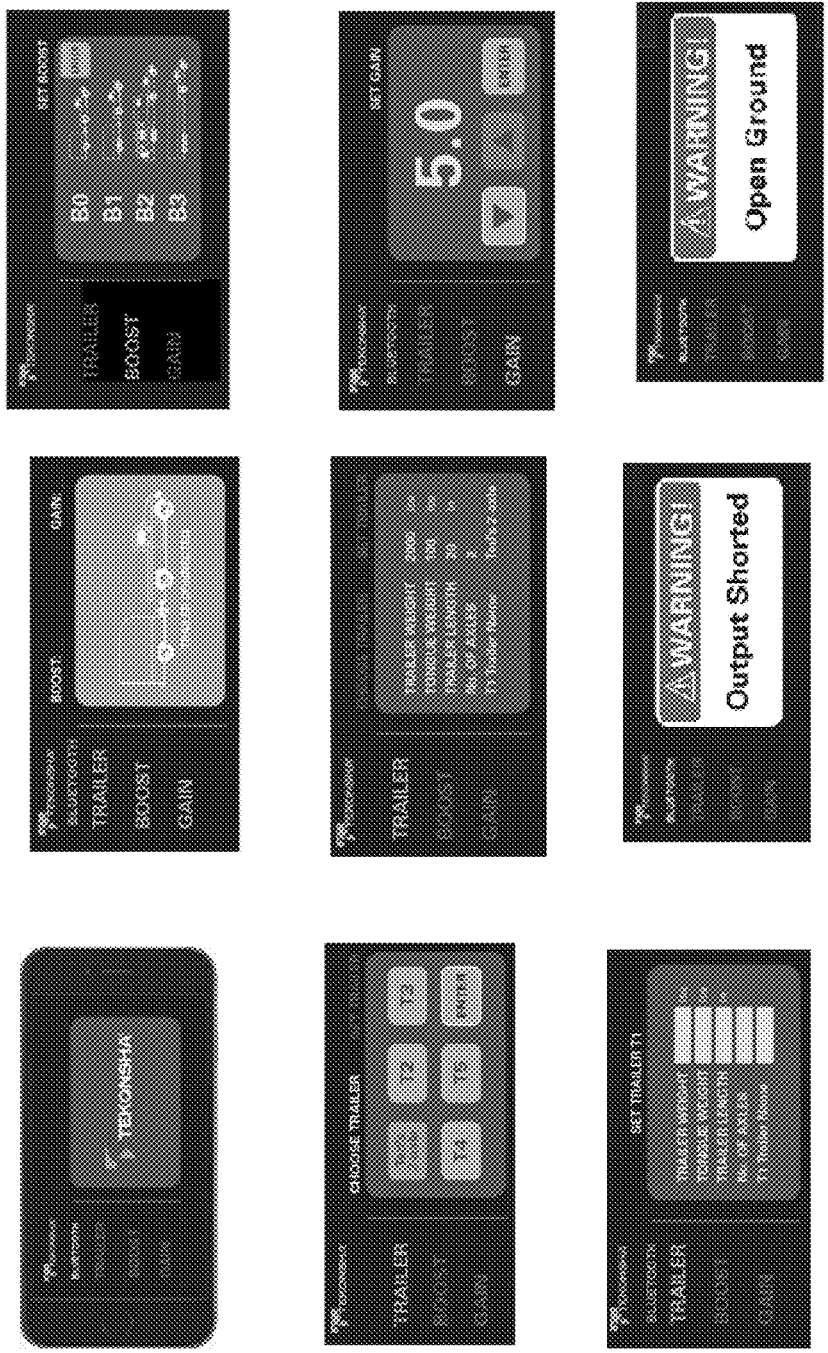
FIG. 8 illustrates various plan views of display screenshots associated with a brake controller modules of the data collection and communication system of the present disclosure.

Provided is an exemplary the data collection and communication system of the present disclosure. The present disclosure, however, is not limited to this example. The present teachings may include any combination of each of the components described above and below. For the sake of brevity not every combination is disclosed, but is contemplated by the present teachings. In this embodiment, a brake controller, such as one disclosed by commonly owned U.S. Pat. No. 8,789,896 with is incorporated by reference, has been configured to communicate and collect data related to its use and performance. The brake controller has been configured to collect data and communicate data to a smartphone via a wireless Bluetooth connection as illustrated by the various screenshots of FIG. 8 and Attachment A. Attachment A accompanies this application and illustrates various data inputs that may be collected from the brake controller module 110E to a display 102 such as a smartphone or other application on a mobile device. Notably, this disclosure contemplates that similar types of data may be collected by the various other modules 110A, 110B, 110C, 110D, 110E, 110F, and 110G and communicated to a smartphone or other device through the network, via wired or wireless connections as described herein.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the data collection and communication system of the present disclosure. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Example 2

FIGS. 9 through 13D illustrate various embodiments of the invention. In particular, specific interactions between specific components are shown in flowchart format so as to highlight specific functions. It will be understood that these interactions and components may be incorporated into a system with additional components, all as disclosed above.

Figure 9:
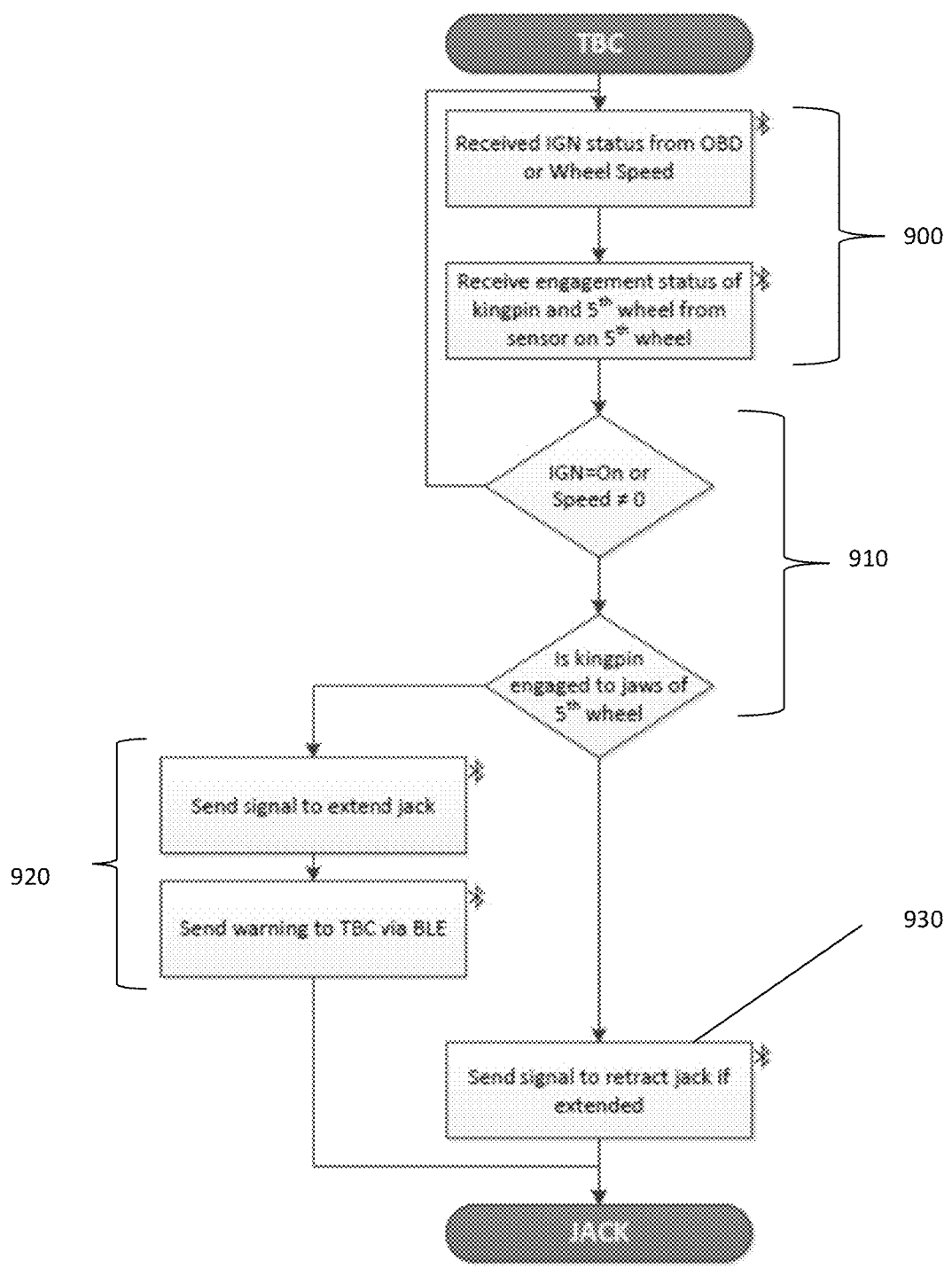
FIG. 9 is a flowchart indicating electromechanical interactions between the trailer brake controller (TBC), the jack, and possibly other components of the invention according to certain embodiments contemplated herein.

For example, FIG. 9 indicates the specific flow of actions between the trailer brake controller and the jack. It may be possible to couple these components—using these precise actions/functions—with other aspects, such as a tire pressure monitoring system or a securing system. These additional components may add additional functionality but without altering or diminishing the specific sequence illustrated in FIG. 9.

The specific embodiments contemplated by these examples are intended as non-limiting. Also, conventional aspects of flowcharts will be appreciated by those of skill: as an example, diamond-shaped boxes in the drawings represent decision points (or, in some cases, yes-no determinations made by data provided by the present system and/or the components in question), while the arrows illustrate the progression of events. The Bluetooth symbol (*) generally indicates wireless communication between the components in all of the subgroupings of this Example 2, although this contextual use is not intended to limit the invention only to the use of Bluetooth protocols.

Example 2A

FIG. 9 illustrates how the Trailer Brake Controller TBC leverages sensed data and inputs to exert control over the jack without the need for independent user intervention. TBC receives input or sensed data, preferably in a wireless fashion, to continually verify coordinated operation of the system. Preliminary steps 900 are devoted to determining whether the wheels of the vehicle are in motion, potentially by receiving the status of the ignition from the on board diagnostics or based upon the observed wheel speed from any of the system components. The engagement status of the connection device (e.g., the kingpin of the fifth wheel hitch from a sensor located on that component) is also verified.

As noted in block 910, if the ignition is on and/or the speed is not equal to zero (either indicated forward motion or unintended backwards rolling of the vehicle and/or trailer), a negative indication to those conditions reverts the system back to step 900 and continues in a loop to ensure real-time status and operation. If movement or ignition is present, kingpin engagement is also verified in step 910. If the kingpin is not engaged, actions 920 (both preferably wireless) are initiated to create an output to extend the jack and to warn driver via the brake controller unit display or interface (e.g., audible warning). Conversely, if the kingpin is engaged, a jack retraction output is generated in step 930 to continually confirm safe operation of the overall system. Such automatic communication between devices is an example of a "mesh network" in which the components may interact seamlessly, while providing status updates or other information to the user.

Example 2B

Figure 10:
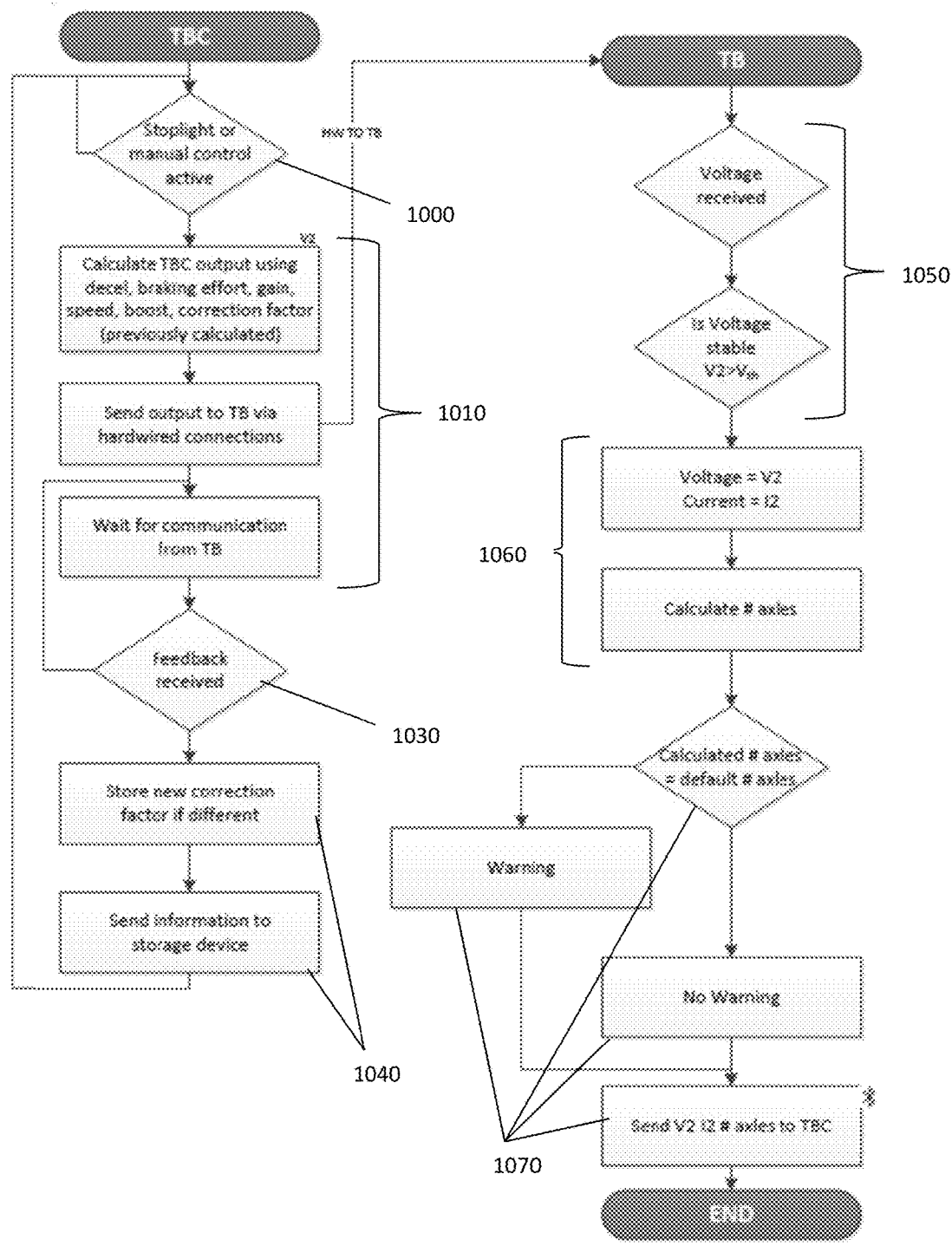
FIG. 10 is a flowchart indicating interactions between the trailer brake controller (TBC), the trailer brakes (TB), and possibly other components of the invention according to certain embodiments contemplated herein.

FIG. 10 shows how operation of the trailer brake controller TBC may be coordinated with the trailer brake unit TB. In preliminary step 1000, stoplight or manual control is confirmed as active. If these items are inactive, the system will function on a continual loop until such action is verified, resulting in a seamless, continuous approach to operation.

Step 1010 involves the calculation of a trailer brake control output based on sensed data (or inputs) indicative of deceleration, braking effort, gain, speed, boost, and/or a correction factor reflecting any number of variables that may be outside of the norm (e.g., in response to weather conditions, trailer weight, level, etc.). This output is communicated as voltage V2 to the trailer brake unit, preferably via a hardwired connection to minimize any unintended failures and, more generally, to ensure the safest and most secure mode of operation between these critical units. Finally, this step also involves receipt of communication from the trailer brake unit.

Step 1030 verifies whether feedback was received from the brake unit via step 1010. As with other aspects of the system, a negative response initiates periodic verification in of step 1030 to ensure continuous and seamless operation.

In the event feedback is detected in step 1030, step 1040 stores any new information, such as an updated correction factor (which addresses voltage drop in the wires or connections caused by heavy current and wire resistance, as one example and is calculated, for example, by the trailer brake controller based on $V_1$, $V_2$, and $I_2$) or other inputs from the trailer brakes. Step 1040 also returns operation back to step 1000 to verify the appropriate correction factor (and/or other data received) is incorporated into future operation of the system.

As noted above trailer brakes TB receive voltage V2 from the trailer brake controller. Step 1050 determines whether the voltage so received is stable by comparing it against voltage $V_{th}$ for a fixed period of time, such as 0.6 seconds (or any range from 0.1 to 1.0 seconds), Voltage V2 and current I2 are established and the brake unit TB calculates the number of axles for braking in step 1060. Finally, the unit TB compares the calculated number of axles against a default setting or input provided by another system component and sends a warning output to all components as appropriate to the circumstances. In either case, this final step 1070 produces an output, preferably communicated wirelessly, to reflect V2, I2, and the number of axles back to the brake controller TBC and, possibly, other system components, possibly relying on a mesh network.

Example 2C

Figure 11:
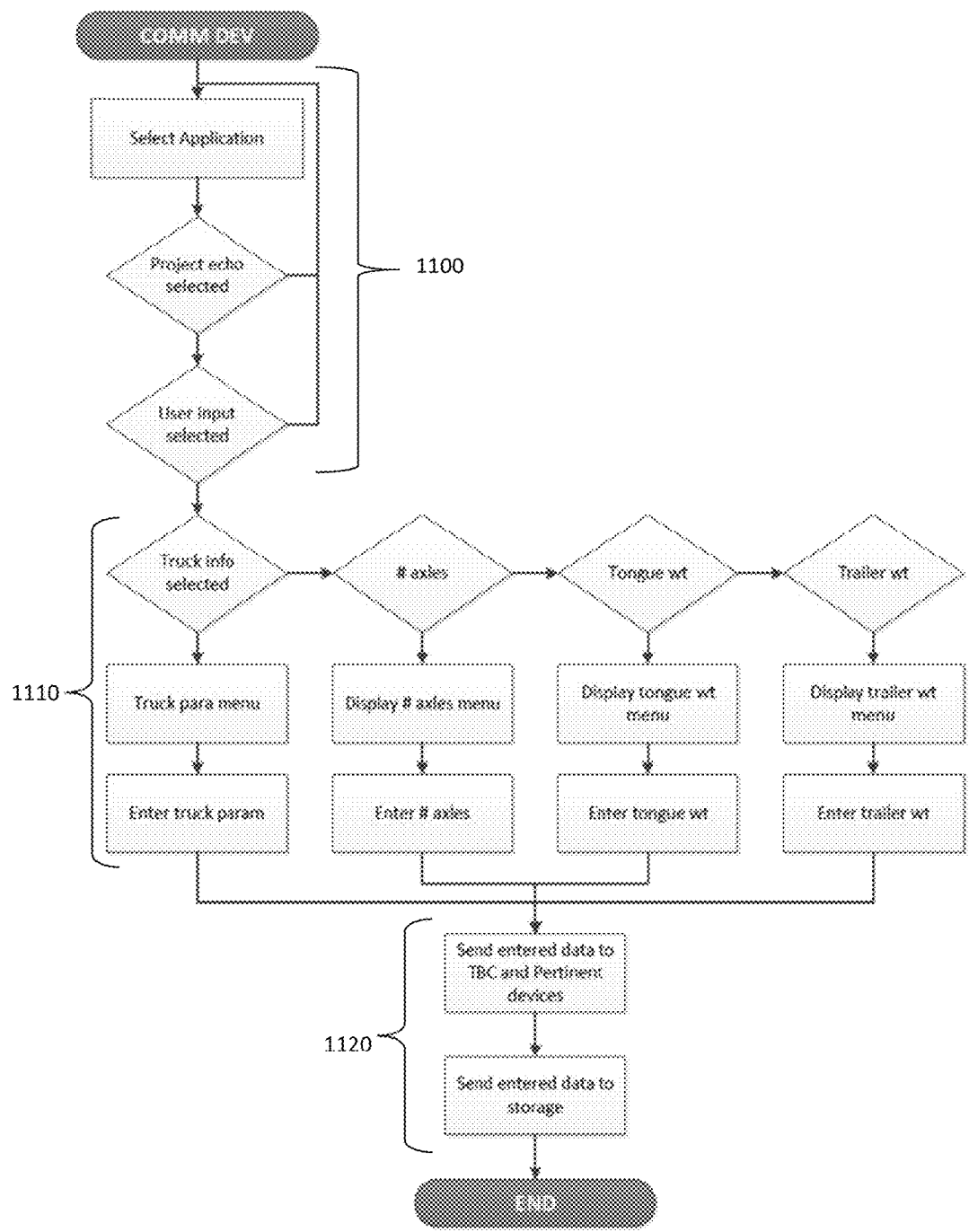
FIG. 11 is a flowchart indicating user data interactions between the communications (COMM DEV) and possibly other components of the invention according to certain embodiments contemplated herein.

FIG. 11 illustrates potential ways in which the communications device COMM DEV of the system may be utilized, particularly with respect to setting up the system (possibly including default settings for a variety of components). Preliminary inputs are verified in step 1100, including the selection of the application and other user inputs. Information about the vehicle, the number of axles, the tongue weight of the trailer, the overall trailer weight, and other pertinent information is solicited and entered through a corresponding number of different menus in step 1110. It will be understood that additional information can be input in this manner.

Based at least in part upon the data entries from step 1110, the communications device COMM DEV generates appropriate outputs to the trailer brake controller TBC and other system components, preferably via a wireless connection, in step 1120. Also, this data may be output to the memory inherent to any component(s) and/or information storage device associated with the system and/or internet or third party based service or server that is external to the system.

The storage device may compile data from several different trailers to come up with statistical information. It can identify parameters out of normal values and send messages/warnings/cautions to the pertinent towing systems and to the manufacturer. For example, if the gain is too low for the weight of a trailer being towed by a relatively lightweight vehicle/truck, that may act as a warning to the driver about incorrect gain setting. While shown in this particular example, this approach applies equally to all embodiments contemplated and described herein.

Example 2D

Figure 12:
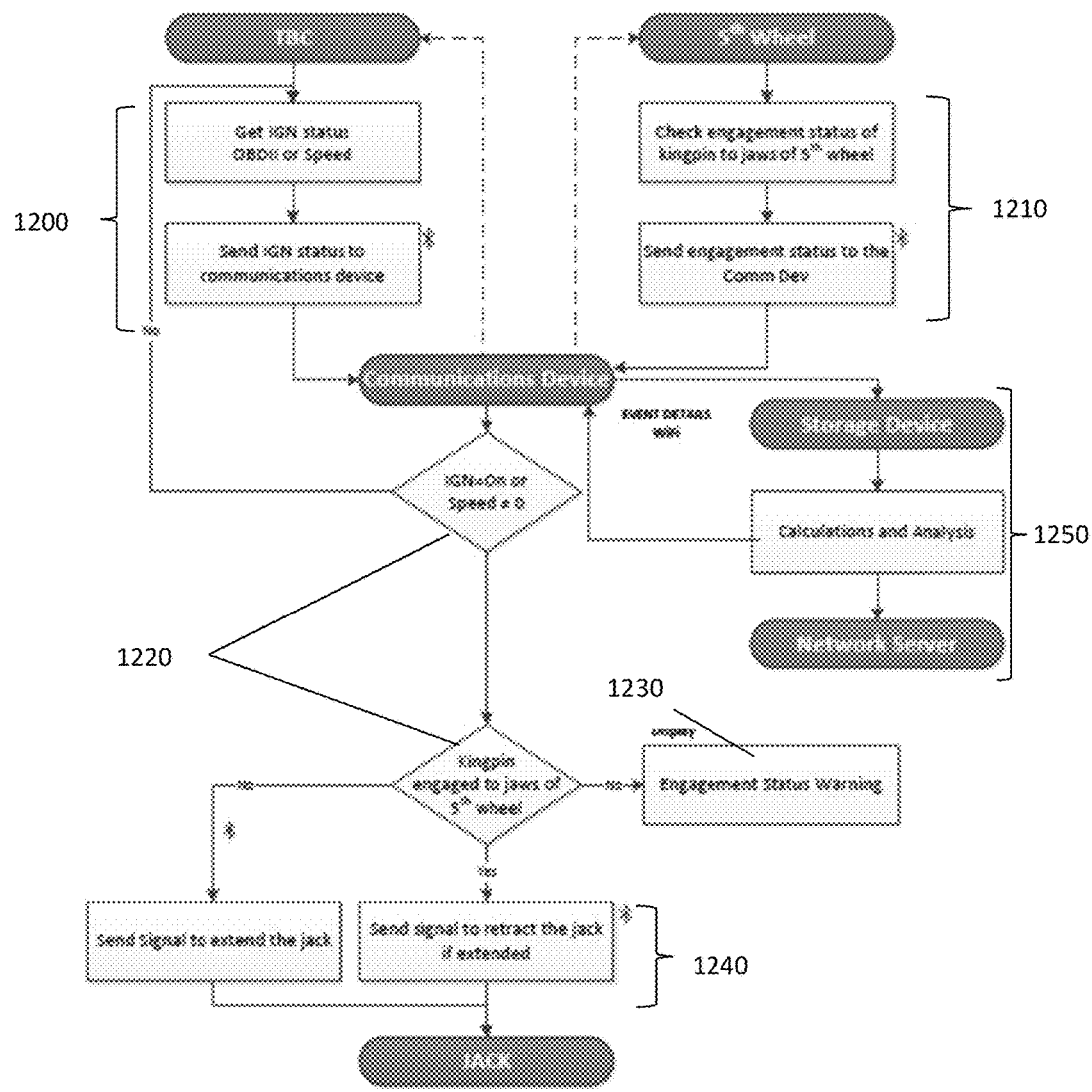
FIG. 12 is a flowchart indicating interactions between the trailer brake controller (TBC), the fifth wheel hitch ($5^{th}$ Wheel), the jack, the communications device, the information storage device, and possibly other components of the invention according to certain embodiments contemplated herein.

FIG. 12 illustrates how a variety of components may integrate in certain embodiments. Here, the interactions of trailer brake controller TBC, fifth wheel hitch $5^{th}$ Wheel, Communications Device, Storage Device, and Jack are shown. As noted above, wireless communication protocols will simplify the installation and operation of these disparate components.

As seen in step 1200, trailer brake controller TBC obtains the ignition status, speed, and other information from the vehicle's on board diagnostics system II (OBDII). This information is then output to the communications device.

In parallel operation 1210 (i.e., the steps are independent of one another, although the information or subsequent operation of the components may be iterative or interconnected), the fifth wheel hitch checks for engagement status of its kingpin to its jaws. This sensed data is output to the communications device.

As indicated by parallel and/or responsive operation 1250, the communications device may, for all steps in this process, wirelessly transmit event details, data, and/or operational logs to a storage device for immediate or future action, as well as to gather macro-scale data to establish norms, warnings, caution signals, and/or status reports for this single system or across a large number of independent systems. In step 1220, the received inputs regarding vehicle movement (e.g., via ignition status and/or speed) and kingpin engagement may result in a display output 1230 indicating a warning as to the fifth wheel engagement status. Step 1230 creates appropriate outputs with respect to extending or retracting the jack (thereby preventing the towed product from being dropped into the vehicle). As such, FIG. 12 further informs the processes contemplated by FIG. 9 above. As with other examples, FIG. 12 is a type of mesh network.

Particularly in FIG. 12 (but also as noted throughout this disclosure), the illustration of a fifth wheel hitch is exemplary. Other connections devices, including but not limited to a gooseneck and the like, could be substituted with minimal alterations to the overall process shown herein. These examples also illustrate how the data and status of the different components of the distributed system (in towed and towing vehicles) can be communicated to each other to improve the safety and efficacy of each component and the overall system.

Example 2E

Figure 13A:
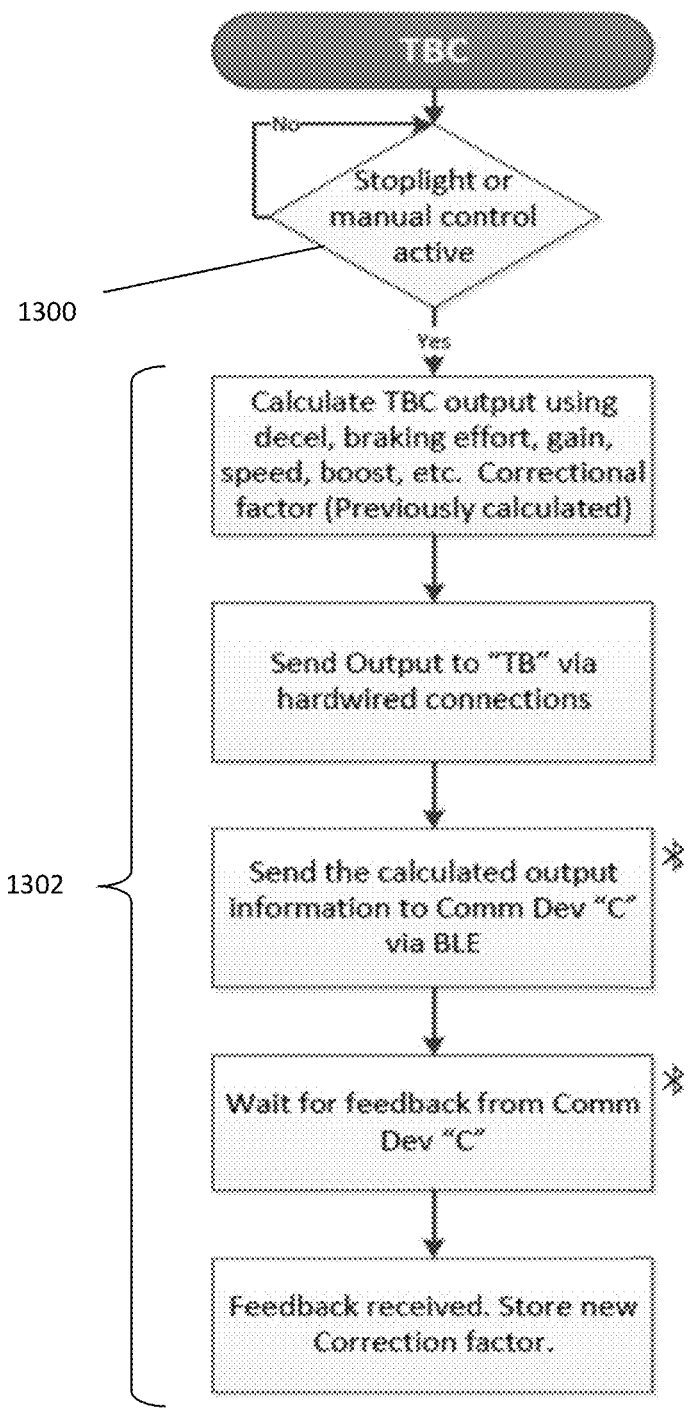
FIGS. 13A through 13C is a flowchart indicating interactions between the trailer brake controller (TBC), the trailer brakes (TB), the communications device, and possibly other components of the invention according to certain embodiments contemplated herein.
Figure 13B:
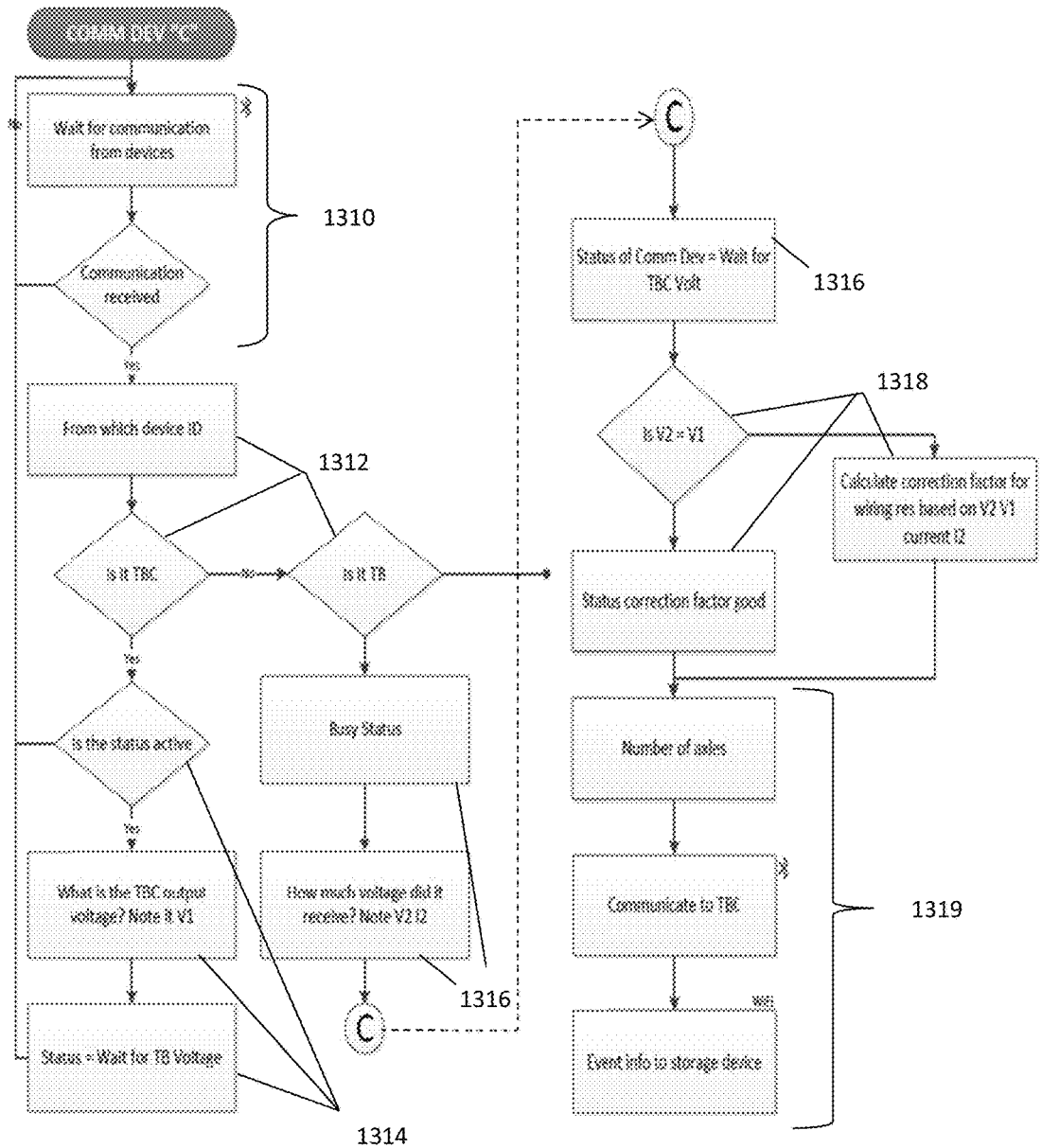
Figure 13C:
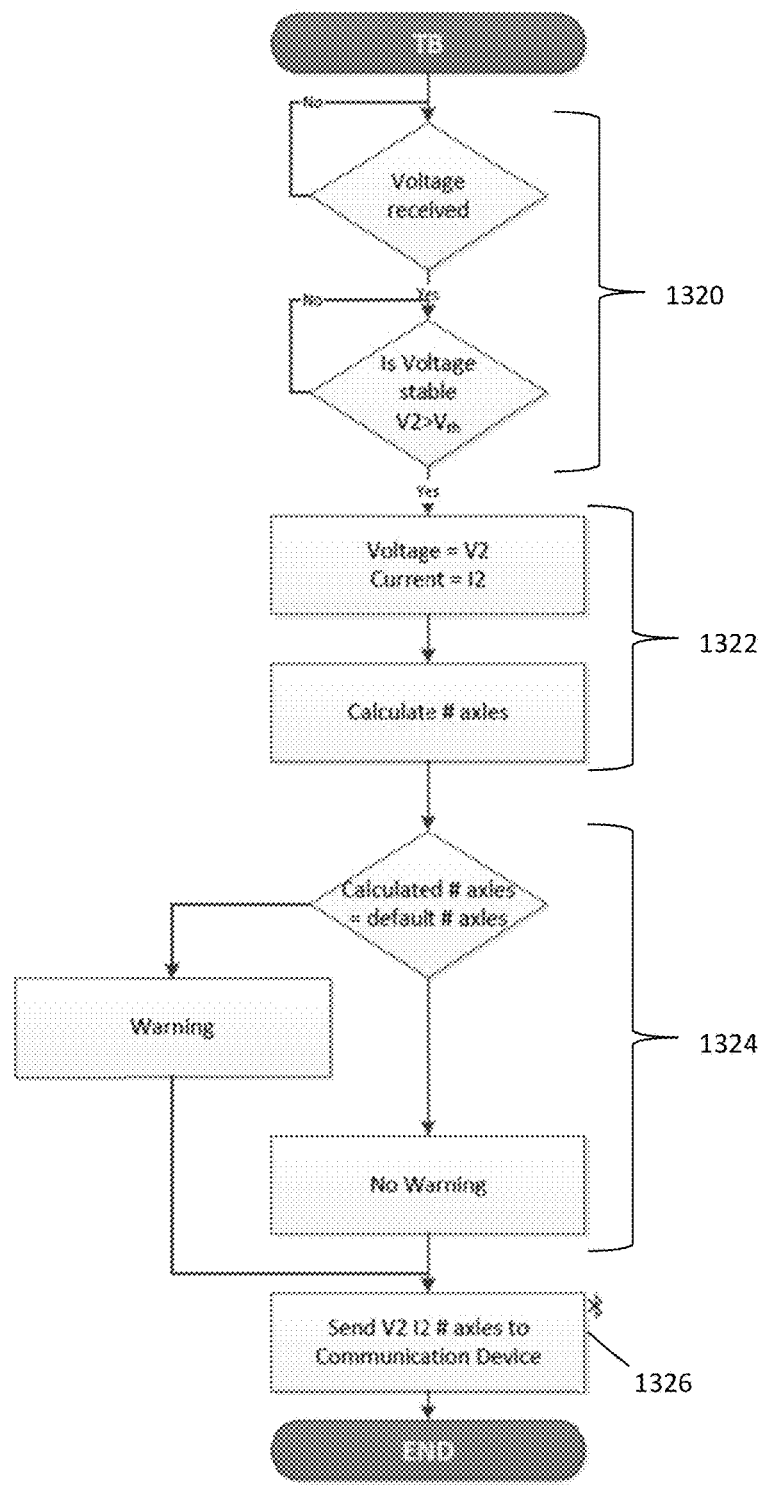

FIGS. 13A through 13C illustrate various inter-related actions of the trailer brake controller TBC, the communications device, and the trailer brakes. These figures further inform the discussion of FIG. 10 above and also provide an example of a mesh network.

As seen in FIG. 13A, the trailer brake controller TBC determines whether the stoplight or manual control is active in step 1300. If these items are inactive, the system will function on a continual loop until such action is verified, resulting in a seamless, continuous approach to operation. Step 1302 calculates a trailer brake controller output based on a variety of factors, and this output may be transmitted directly to the brakes, preferably via a hardwired connection.

Alternatively, in order to avoid potential voltage drop across the wire, the TBC may send the calculated PWM signal to the brake unit, which then generates the appropriate PWM braking signals. This requires the use of trailer battery to power the brakes. Also in this step, wireless (or other) communication of the output may be sent to the communications device with corresponding inputs received from the communications device to further inform the calculations in this step. As such, step 1302 may be iterative and continuously performed during operation of the trailer brake controller.

FIG. 13B illustrates portions of the operation of the communications device. Step 1310 awaits inputs, preferably received wirelessly, from other system components. Once received, step 1312 determines the origin of the input, with particular distinctions made between trailer brake controller TBC and trailer braking unit TB (additional units could be recognized in this step, as acknowledged by the terminating line extending from the right of these sequences). If the TBC is indicated as active, step 1314 notes the TBC output voltage as V1 and further a status to wait for input from the trailer brakes TB is indicated, with the operation returning to step 1310 until that TB input is received.

If the input from step 1312 is associated with the trailer brakes TB, busy status is established in step 1316 (this status may be generated and used at any step in this other operations disclosed herein which cannot be interrupted). Also, the received voltage and current by the trailer brakes are noted, respectively, as V2 and I2. Lastly, the status of the communications device is set to wait for the TBC voltage to be received.

The voltages V1 and V2 are then checked for equivalence in step 1318 in order to determine if the correction factor is appropriate. An updated correction factor may be calculated, if needed, based on V1, V2, and I2. Finally, in step 1319, the number of axles is verified and wireless communications, via Bluetooth and/or traditional Wi-Fi signals, inform the trailer brake controller TBC and provide representative data (e.g., event information, data, etc.) to the memory or information storage device in order to allow for immediate or future actions, as well as to gather macro-scale data to establish norms, warnings, caution signals, and/or status reports for this single system or across a large number of independent systems. This macro-scale data and system actions can also relate to preventive maintenance, software status, and other similar functions.

Finally, with reference to FIG. 13C, trailer brakes TB establish the nature of voltage in step 1320, with return loops to see if voltage is received and, if so, if that voltage has yet stabilized (i.e., V2>than $V_{th}$). In this context, $V_{th}$ is a threshold voltage when the voltage at the brakes is stable. Typically, $V_{th}$ should be greater than the first three measurements, with ~0.7 seconds of delay providing enough time for stabilizations (although any type of delay may be utilized, those disclosed here are merely exemplary). Alternatively, these three measurements could be used as $V_{th}$. This looped approach effectively establishes a feedback loop to make sure that the voltage reading used is not taken at a point when the voltage is still rising. Once the voltage is received and stable, settings for voltage V2 and current I2 are established and the number of axles is calculated in step 1322. Step 1324 compares the calculated number of axles against a default input and an appropriate warning output may be produced. In either instance, V2, I2, and the number of calculated axles are output, preferably wirelessly, to the communication device in step 1326.

Example 3

Figure 14:
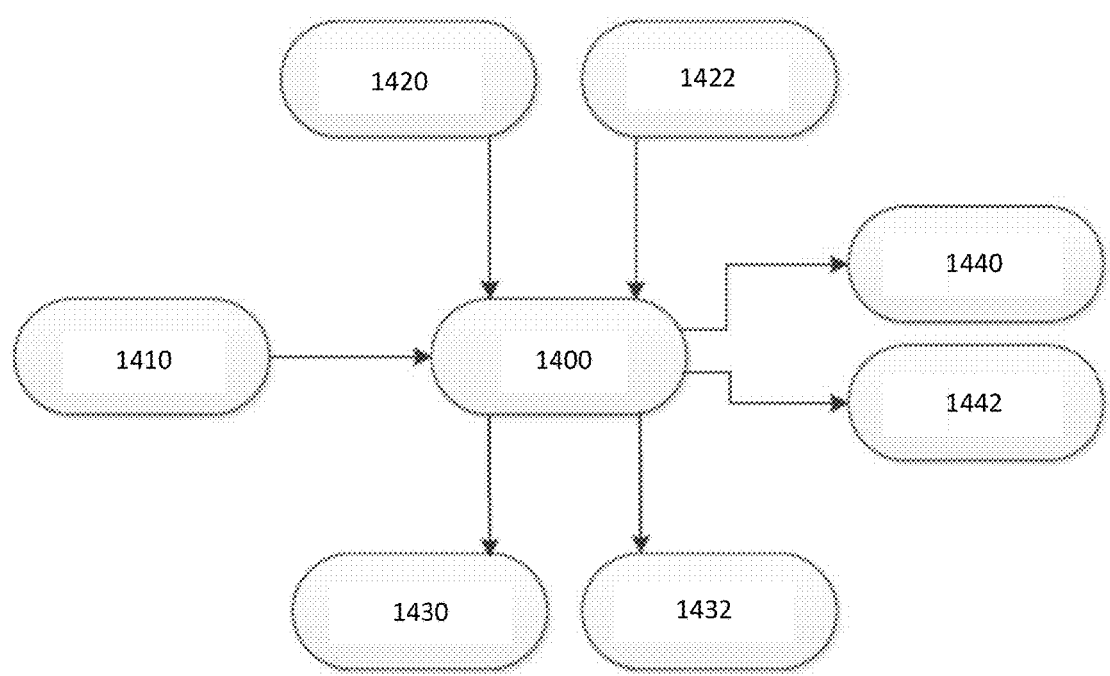
FIG. 14 is a schematic plan view of how a discrete component in the inventive system accomplishes certain functions according to the embodiments of the invention contemplated herein.

FIG. 14 provides a generic schematic indicating the relationship of a component 1400 within the system. Component 1400 may be anyone of the components identified above, including those associated with the electronics, connection, accessories, and/or the master controller. Power is received by component 1400 from a power supply 1410, such as a battery or other power supply as noted herein.

Sensors/inputs 1420 and 1422 may originate from sensors and/or user interfaces. These inputs are received by the component 1400 for further use by the system. While only two are illustrated, any number of inputs could be generated by any number of sensors or interfaces. The sensors may be selected from those identified herein, with particular attention given to the desired functionality of component 1400.

Component 1400 generates outputs 1430, 1432 that may be transmitted to any combination of other components (not shown) within the system. While only two are illustrated, any number of outputs could be generated by any number of sensors or interfaces. These outputs may simply pass through the data received as sensors/inputs 1420, 1422. In the alternative, component 1400 may include logic manipulation of the data prior to generating outputs 1430, 1432. Also, the outputs may be provided as wired or wireless signals. In the event the latter are produce, such signals would not necessarily be connected or directed at any single component or direction, whereas wired connections must necessarily lead to another component (not shown).

Separately, component 1400 is configured to provide data to one or more communications devices 1440, 1442. As with outputs 1430, 1432, these data signals may be transmitted to the communications devices 1440, 1442 via wired or wireless connections. Also, any numbers of communications devices are contemplated even though two are shown. Communications devices 1440, 1442 represent devices that are external to the system, such as internet or third-party based servers and services.

The system and components described above allows a plurality of towing accessory devices to work in concert with our without human intervention. Moreover, the system allows the gathering of information regarding the operation of such towing accessory devices. The system may not provide a master slave type of control. Instead, it is a dynamic system that takes information from the various towing accessory devices as well as other sources (available information, user information or a combination of such) to generate actions by the various towing accessory devices. The plurality of towing accessory devices may communicate directly with one another (such as in a mesh network), through a communication device and/or through an electronic storage device. The system provides this communication to cause the towing accessory devices to act, not just as a warning system or status indicator. While those may occur, the action generated is part of the system. The components of the system may include at least one or a plurality of towing accessory devices, a master controller, communication device, user interface and an electronic storage device. However, some of these components may be combined in a single device or split among multiple devices. The system is expandable—different towing accessory devices may be added or towing accessory devices may be replaced with the system. The new towing accessory devices may be easily integrated into the system. The system also allows software, system settings or other information to be updated such as through the electronic storage device, master controller, communication device, or a combination of such devices.

Further, the master controller or controller could be a more powerful device, e.g., a trailer brake controller. However, it is not limited to such.

Further still, the electronic storage device may take collective information and send directions to select towing accessory devices to act on it. The electronic storage device may create profile data and help with optimization of designs of the towing accessory devices. This user profile information may provide information to the user and to the manufacturer of the system and/or the towing accessory devices. The system may also act as a theft deterrent device. The system may prevent all actions on the towing accessory devices if a biometric sensor on the system does not identify a predetermined user, such as by way of a non-limiting example, through a retinal detector and/or finger print detector.

The date obtained from the system may permit the manufacturer to be more in touch with the end user. It may allow the manufacturer to provide users with recommendations as to the settings of the various towing accessory devices or uses of the towing accessory devices.

As used herein, the terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the likes. In another aspect, such terms may include both an application running on a processor and a processor. Moreover, such terms may be localized to one computer and/or may be distributed across multiple computers.

While methods may be shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

What is claimed is:

1. A control system comprising:
a trailer brake controller;
a wheel speed sensor operatively coupled with the trailer brake controller; and
a controller in operative communication with either or both of the wheel speed sensor and the trailer brake controller, wherein the controller receives data with respect to the trailer brake controller and wherein the controller processes the data and sends a direction to act to the trailer brake controller.

2. The control system of claim 1, wherein the controller is integrated into the trailer brake controller.

3. The control system of claim 1 further comprising a user interface operatively coupled with the trailer brake controller.

4. The control system of claim 1, further comprising a user interface, wherein the user interface comprises at least one of the following: a smartphone, tablet, computer, and user interface of a trailer brake controller.

5. The control system of claim 1, wherein the wheel speed sensor is selected from the group consisting of a Hall Effect sensor, accelerometer, and gyroscope.

6. The control system of claim 1, wherein the controller is in operative communication with both the wheel speed sensor and the trailer brake controller and the operative communication is wireless.

7. The control system of claim 1, wherein the controller receives information wirelessly from at least one of an internet-based data server and a private party data server.

8. The control system of claim 7, wherein the information received by the controller relates to environmental conditions.

9. The control system of claim 1, wherein the controller sends information wirelessly to at least one of an internet-based data server and a private party data server.

10. The control system of claim 9, wherein the information sent by the controller relates to diagnostic information of the trailer brake controller.

11. The control system of claim 10, wherein the at least one of the internet-based data server and the private party data server modifies an operating condition of the trailer brake controller.

12. A control system comprising:
a trailer brake controller;
a sensor operatively coupled with the trailer brake controller; and
a controller in operative communication with either or both of the sensor and the trailer brake controller, wherein the controller receives data regarding the trailer brake controller and wherein the controller processes the data and sends a direction to adjust either of a boost or a gain on the trailer brake controller.

13. The control system of claim 12, wherein adjustment of either of the boost or gain on the trailer brake controller is done without human intervention.

14. The control system of claim 12, wherein the trailer brake controller increases or decreases the boost.

15. The control system of claim 12, wherein the trailer brake controller increases or decreases the gain.

16. The control system of claim 12, wherein the controller receives information wirelessly from at least one of an internet-based data server and a private party data server.

17. The control system of claim 13, wherein the information received relates to weather conditions and adjustment of either the boost or gain relates to the weather condition.

18. A system comprising:
a trailer brake controller comprising a wheel speed sensor operatively and wirelessly coupled with the trailer brake controller;
a towing accessory device comprising a second sensor, the trailer brake controller and towing accessory devices in operative communication; and
a communication device in operative communication with the wheel speed sensor, wherein data from the wheel speed sensor is communicated to the communication device and the communication device sends instructions to the towing accessory to generate an action for the towing accessory device.

19. The system of claim 18, wherein the second towing accessory device comprises a sway control device.

20. The system of claim 19, wherein the sway control device moves to a sleep mode.

* * * * *